(12) United States Patent
Harsh et al.

(10) Patent No.: US 8,606,624 B2
(45) Date of Patent: Dec. 10, 2013

(54) RISK REPORTS FOR PRODUCT QUALITY PLANNING AND MANAGEMENT

(75) Inventors: Jasmeen K. Harsh, Peoria, IL (US); Deric E. Walsh, Morton, IL (US); Erin M. Miller, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/435,486

(22) Filed: Mar. 30, 2012

(65) Prior Publication Data

US 2012/0253875 A1 Oct. 4, 2012

Related U.S. Application Data

(60) Provisional application No. 61/470,744, filed on Apr. 1, 2011, provisional application No. 61/470,715, filed on Apr. 1, 2011.

(51) Int. Cl.
*G06Q 10/00* (2012.01)
*G06Q 10/06* (2012.01)

(52) U.S. Cl.
CPC .............................. *G06Q 10/06395* (2013.01)
USPC ....... 705/7.41; 705/7.28; 705/7.36; 705/7.38; 705/7.39

(58) Field of Classification Search
None
See application file for complete search history.

(56) References Cited

U.S. PATENT DOCUMENTS

| | | | |
|---|---|---|---|
| 6,876,992 B1 * | 4/2005 | Sullivan | 706/47 |
| 7,103,434 B2 * | 9/2006 | Chernyak et al. | 700/98 |
| 7,698,148 B2 * | 4/2010 | Lavu et al. | 705/1.1 |
| 8,001,013 B2 * | 8/2011 | Serbanescu | 705/26.4 |
| 8,005,706 B1 * | 8/2011 | Cassone et al. | 705/7.28 |
| 8,244,644 B2 * | 8/2012 | Knipfer et al. | 705/303 |
| 2002/0129001 A1 * | 9/2002 | Levkoff et al. | 707/1 |
| 2002/0188597 A1 * | 12/2002 | Kern et al. | 707/1 |
| 2003/0033191 A1 * | 2/2003 | Davies et al. | 705/10 |
| 2003/0188290 A1 * | 10/2003 | Corral | 717/101 |
| 2004/0059588 A1 * | 3/2004 | Burritt et al. | 705/1 |
| 2004/0059589 A1 * | 3/2004 | Moore et al. | 705/1 |
| 2005/0060213 A1 * | 3/2005 | Lavu et al. | 705/7 |
| 2005/0080502 A1 * | 4/2005 | Chernyak et al. | 700/97 |
| 2005/0114829 A1 * | 5/2005 | Robin et al. | 717/101 |
| 2006/0173762 A1 * | 8/2006 | Clater | 705/35 |
| 2007/0203912 A1 * | 8/2007 | Thuve et al. | 707/10 |
| 2008/0077608 A1 * | 3/2008 | Kaag et al. | 707/102 |
| 2008/0189150 A1 * | 8/2008 | Knipfer et al. | 705/7 |
| 2009/0113427 A1 * | 4/2009 | Brady et al. | 718/100 |
| 2010/0169143 A1 * | 7/2010 | Carr et al. | 705/9 |
| 2011/0054968 A1 * | 3/2011 | Galaviz | 705/7.28 |
| 2012/0311525 A1 * | 12/2012 | Xoual et al. | 717/104 |

OTHER PUBLICATIONS

U.S. Patent Application of Jason W. Flanagan et al, entitled "Graphical User Inerface for Failure Mode and Effect Analysis" filed Mar. 30, 2012.
U.S. Patent Application of Jasmeen K. Harsh et al, entitled "Graphical User Inerface for Product Planning and Management" filed Mar. 30, 2012.
U.S. Patent Application of Jason W. Flanagan et al, entitled "Risk Charts for Failure Mode and Effect Analysis" filed Mar. 30, 2012.

* cited by examiner

*Primary Examiner* — Brett Feeney

(57) ABSTRACT

A method to facilitate a Product Quality Planning and Management (PQPM) project associated with a product development cycle is provided. The method includes displaying on a user interface one or more activities to be executed for the PQPM project. The method further includes receiving, with an aid of the user interface, textual inputs indicative of a measurement criterion associated with an execution status the one or more activities. The method further includes developing a report to monitor a risk associated with the PQPM project, the report is based on the measurement criterion associated with the execution status of the one or more activities.

22 Claims, 44 Drawing Sheets

EDS Part Search    ✕

Search By: ○ Part Number    ⦿ Part Name    [turbo] 🔍

⇐ Previous    ⇒ Next

Search Results

| Part Number | Part Name | Change Level |
|---|---|---|
| 1234 | TURBO 1 | 00 |
| 7658 | TURBO 2 | 00 |
| 1086 | TURBOCHARGER 1 | 01 |
| 9576 | TURBO GP 1 | 00 |

⊘ OK    ⊗ Cancel

Supplier Search

Search By: ○ Supplier Code  ● Supplier Name   [tenneco] 🔍

[← Previous]  [→ Next]

Search Results

| Supplier Code | Supplier Name |
|---|---|
| C0124T1 | TENNECO ING |
| J23371I4 | TENNECO AUTOMOTIVE ORIGINAL EQUIPMENT |
| Q0056B1 | TENNECO AUTOMOTIVE BRAKES |

[✓ OK]  [✗ Cancel]

NPI Program Search

Search By: ○ Program Number  ● Program Name  Cab  🔍

← Previous  → Next

Search Results

| NPI Id | NPI Title |
|---|---|
| 2167 | D6E ABCD ELECTRONICS CAB |
| 2179 | MWLH TIER 3A CAB |
| 2268 | NML TIER 4A CAB |
| 2778 | M2 MG CAB |
| 2851 | AT TIER IVA CAB |

OK  Cancel

| PQPM Tool | | | | | Welcome: Jasmeen  > Logout | | | 🔍 Search | A 12px |
|---|---|---|---|---|---|---|---|---|---|

| Home | Reports | Advanced Search | Help & Support | Admin | Preferences |
|---|---|---|---|---|---|
| Overview | Summary | Details | Attachments | Issue | Team | Sessions |

Project ID: 25262
Project Title: Test Project 1
Project Lead: Jasmeen

NPI Program ID:
NPI Program Title:

Part Number:
Part Name:

Change Level:
Version:

NPI Gateway Dates

☐ GW1  ☐ GW2  ☐ GW3  ☐ GW4  ☐ GW5  ☐ GW6

✏ Edit    Summary  Activity Notes

PQPM Activities

☐ 1 Requirements Management
☐ 2 Quality History
☐ 3 Design FMEA
☐ 4 Drawings & Specifications
△ 5 Design Verification Plan & Report
△ 6 Design/Manufacturing Review(s)
△ 7 Team Feas. / Management Commitment Total Possible =
Gateway Score =
% Score =
Cumulative PQPM Status % Score =

1500
112

Search Team Members

Search By: ● Name  ○ Login ID  ○ Emp. ID        Jasmeen  🔍

⇐ Previous    ⇒ Next

Search Results

| Name | Login ID | Email | Telephone |
|---|---|---|---|
| Jasmeen | Harsh.Jasmeen@abc.com | contact_Jasmeen@abc.com | 80116394385 |

⊕ Add        ⊘ OK    ⊗ Cancel

*FIG. 17*

| PQPM Tool | | | | | Welcome: Jasmeen  >Logout | | 🔍 Search | A 12px |
|---|---|---|---|---|---|---|---|---|
| Home | Reports | Advanced Search | Help & Support | Admin | Preferences | | | |

Open PQPM Projects
25262: Test Project 1

| Overview | Summary | Details | Attachments | Issue | Team | Sessions |
|---|---|---|---|---|---|---|

✉ Send Email  🖶

⊕ Add Team Member | ⊕ Add From Address Book | | | | ☐ Save

| Name | User Id | Role | Designation | Email | Phone | Sub Activities Owned - Jasmeen |
|---|---|---|---|---|---|---|
| Jasmeen | 135426 | Team Lead | Team Lead | | 345678 | 5.1 Develop DVP&R |
| Deric | 353455 | Team Member | Team Member | | 462557 | 5.2 Complete DVP&R |
| Erin | 547252 | Team Member | Team Member | | 689345 | 5.3 Update Validation Plan |
| | | | | | | ✓ 6.1 Conduct Design Review 1 |
| | | | | | | ✓ 6.2 Conduct Design Review 2 & 3 |
| | | | | | | ✓ 6.3 Conduct Design Review 4 |

| Overview | Summary | Details | Attachments | Issue | Team | Sessions |

⊕ Add Attachment

| | Type | Title | Description | Filename / URL | Creation Date | Activity Association |
|---|---|---|---|---|---|---|
| ⊘⊗ | File | License Form | License Form | License Form.doc | mm dd yyyy | 3.2 Complete FMEAs |
| ⊘⊗ | File | Project Plan | Project Plan | Project Plan.xls | mm dd yyyy | 1.3 Develop Project Plan |

PQPM Project Search

Search By: ○ Project Id   ⦿ Project Title   [test project] 🔍

← Previous   → Next

Search Results

| Id | Title |
|---|---|
| 9152 | Test Project 1 |
| 9078 | Test Project 2 |
| 80141 | Test Project 3 |

⊘ OK   ⊗ Cancel

PQPM Tool

Welcome: Jasmeen  > Logout          [Search]   A 12px

| Home | Reports | Advanced Search | Help & Support | Admin | Preferences |

Open PQPM Projects
25262: Test Project 1

| My Projects | My Action Items | Team Action Items | My Address Book |

Filter Owner [All ▾]   [🔍] [✕]   ○ Gateway Before   [▦]
                                  ○ Gateway After

[Export]

| Project Id / Project Title | Part Number | Change Level | Supplier Name | Gateway Score | Num | Activity | Subactivity | Date Required By / Gateway Due |
|---|---|---|---|---|---|---|---|---|
| Project Id 1 | | | Supplier 1 | | 5.1 | Design Verification Plan & Report | Develop DVP & R | mm dd yyyy / mm dd yyyy |
| Project Id 2 | | | Supplier 2 | | 5.2 | Design Verification Plan & Report | Complete DVP & R | mm dd yyyy / mm dd yyyy |
| Project Id 3 | | | Supplier 3 | | 5.3 | Design Verification Plan & Report | Update Verification Plan | mm dd yyyy / mm dd yyyy |

| | | | | | | | | | | | | | |
|---|---|---|---|---|---|---|---|---|---|---|---|---|---|
| PQPM Tool | | | | | | Welcome: Jasmeen  > Logout | | | | ☒ | Q Search | A 12px | ▶ |
| Home | Reports | Advanced Search | Help & Support | Admin | Preferences | | | | | | | | |
| | | | | | | Open PQPM Projects | | | | | | | |
| NPI Project View | | | | | | | | | | | | | |
| Back | NPI ID: 2624 | | | | | | | | | | | | |
| Part Number | Part Name | Risk | Change Level | NPI Id | Project Id | Project Title | Team Lead | Supplier Code | Supplier Name | GW1 0.00 ☐ | GW2 61.80 ☐ | GW3 52.31 ☐ | GW4 48.61 ☐ GW5 47.10 ☐ |
| 6C0001 | General AR | C | 03 | 2624 | 8020 | Test Project 7 | Jasmeen | A1727G0 | xxx Casting Foundry | | 27.78 | | |
| 5C0131 | END-ROD | | 02 | 2624 | 8022 | Test Project 7 | Jasmeen | D4757G0 | yyy Manufact-uring company | | 33.33 | 12.96 | 8.33    4.35 |
| 1867A | Swivel-CL Shift | | 04 | 2624 | 25282 | Test Project 9 | Deric | F1232V1 | zzz Turbo Technol-ogies | | | 7.41 | |
| Average overall cumulative score | | | | | | | | | | 2.08 | 14.48 | 8.12 | 6.60    4.76 |

FIG. 37

| PQPM Tool | | | | | | | PQPM Risk Report Welcome: Jasmeen  > Logout | | | | | | | A 12px |
|---|---|---|---|---|---|---|---|---|---|---|---|---|---|---|
| Part Number | Part Name | Change Level | Project Id | Project Title | Supplier Code | Supplier Name | Activity Description | Subactivity Description | Gateway | Required Date | Target Date | Forecast Value | Assessment Value | Gateway Status |
| 3333333 | THREE PART | 00 | 221 | Test Project 4 | D1354A0 | ABC Industries | 7. Team Feas. / Management Commitment | 7.2 Complete start of development team feasibility | Gateway 3 | mm dd yyyy | mm dd yyyy | 3 | 0 | |
| 215677 | SETTING | 00 | 782 | Test Project 2 | A2006Z0 | DEF Industries | 1. Requirement Management | 1.3 Develop Project Plan | Gateway 2 | mm dd yyyy | mm dd yyyy | 3 | 0 | |
| 215677 | SETTING | 00 | 782 | Test Project 2 | A2006Z0 | DEF Industries | 3. Design FMEA | 3.2 Complete FMEAs | Gateway 3 | mm dd yyyy | mm dd yyyy | 100 | 0 | C |
| 2374873248 | PART 5 | | 2572 | Test Project 6 | W1332MO | TVI Industries | 18. Production trial run (Pilot Build) | 18. Complete Production Readiness assessment | Gateway 4 | mm dd yyyy | mm dd yyyy | 100 | 0 | C |
| 2374873248 | PART 5 | | 2572 | Test Project 6 | W1332MO | TVI Industries | 18. Production trial run (Pilot Build) | 18. Complete Production Readiness assessment | Gateway 5 | mm dd yyyy | mm dd yyyy | 3 | 0 | |

FIG. 39

| NPI Conformance Report | |
|---|---|
| Visible | Name |
| ✓ | PQPM ID |
| ✓ | NPI Program ID |
| ✓ | NPI Program Name |
| ✓ | Part Number |
| ✓ | Part Name |
| ✓ | Part Change Level |
| ✓ | Design Control |
| ✓ | Design Engineer |
| ✓ | PCE |
| ✓ | Buyer |
| ✓ | Team Members |
| ✓ | Supplier Code |
| ✓ | Supplier Name |
| ✓ | PQPM Risk |
| ✓ | Tier |
| ✓ | Machine |
| ✓ | Ref. part No. |

FIG. 41

PQPM NPI Gateway Conformance Report

| Tier | Machine | Ref. Part No. | Component Type | Supplier Tooling | Project Status | Feasibility Status | Feasibility Finalized Date | 1.1 Generate capacity volume assumptions | 1.2 Develop critical customer and business requirements | 1.3 Project Plan | 2.1 Upgrade carry over Quality | 3.1 Plan product and system FMEAs | 4.1 Plan the Bill of Material | 6.1 Conduct Design Review 1 | 8.1 Develop Preliminary Characteristics | 10.1 Work plan for identifying where prototype (Power Design) build control plans are required | 12.1 Plan the Process Flow Charts | 13.1 Plan Manufacturing Process FMEAs |
|---|---|---|---|---|---|---|---|---|---|---|---|---|---|---|---|---|---|---|
| Tier 3 | | | Electronics | | Active | | | c | c | c | c | c | c | c | c | c | c | c |
| Tier 4 | | | Machines | | Active | | | c | c | c | c | c | c | c | c | c | c | c |

FIG. 42

RISK REPORTS FOR PRODUCT QUALITY PLANNING AND MANAGEMENT

RELATED APPLICATIONS

This application is based upon and claims the benefit of priority from U.S. Provisional Applications No. 61/470,744 by Jason Wayne Flanagan et al., filed Apr. 1, 2011, and U.S. Provisional Application No. 61/470,715 by Jasmeen K. Harsh et al., filed Apr. 1, 2011, the contents of which are expressly incorporated herein by reference.

TECHNICAL FIELD

The present disclosure generally relates to Product Quality Planning and Management (PQPM) and more particularly to use of reports for risk mitigation in the PQPM projects.

BACKGROUND

Organizations depend largely on their products and their manufacturing methods. It is very important to continuously monitor the manufacturing process and in turn the complete product development lifecycle to ensure that the quality standards and cost expectations are met efficiently. Any lack in quality standards and cost expectations may result in huge losses to the organization.

Generally, the organizations utilize various Product Quality Planning and Management (PQPM) processes to ensure that every part within the entire product meet the desired quality standards and cost expectations. There may be a plurality of activities and sub-activities to be executed by a team member to successfully complete the PQPM process. These activities and sub-activities may be tracked to monitor the progress of the PQPM process. However, the organizations use manual methods for monitoring the PQPM processes. These manual methods involve usage of various forms of excel spreadsheets. However, these manual methods prove to be very cumbersome, time consuming and are highly prone to human errors. Moreover, in some instances, manually monitoring the progress of the PQPM process, tracking the progress of activities and sub-activities or evaluating the success of the PQPM process may be difficult and challenging.

Therefore, there is a need for an automated system and method for performing the PQPM process and enabling a team member to monitor and track the progress of the PQPM process.

SUMMARY OF THE DISCLOSURE

In an aspect of the present disclosure, a computer-implemented method is provided to facilitate a Product Quality Planning and Management (PQPM) project associated with a product development cycle. The method includes displaying on the user interface one or more activities to be executed for the PQPM project. The method further includes receiving, with an aid of the user interface, textual inputs indicative of a measurement criterion associated with an execution status the one or more activities. The method further includes developing a report to monitor a risk associated with the PQPM project, the report is based on the measurement criterion associated with the execution status of the one or more activities.

In another aspect of the present disclosure, a system is provided that includes a processor for facilitating a PQPM project associated with the product development cycle. The system also includes a tangible, non-transitory memory configured to communicate with the processor, the tangible, non-transitory memory having instructions stored thereon that, in response to execution by the processor. The processor further performs the operation of displaying on the user interface one or more activities to be executed for the PQPM project. The processor further performs the operation of receiving, with an aid of the user interface, textual inputs indicative of a measurement criterion associated with an execution status the one or more activities. The processor further performs the operation of developing a report to monitor a risk associated with the PQPM project, the report is based on the measurement criterion associated with the execution status of the one or more activities.

In yet another aspect of the present disclosure, an article of manufacture is provided that include a non-transitory, tangible computer readable medium having instructions stored thereon that, in response to execution by a computer-based system for facilitating the PQPM project associated with the product development cycle. The computer-based system is further configured to perform operation of displaying on the user interface one or more activities to be executed for the PQPM project. The computer-based system is further configured to perform operation of receiving, with an aid of the user interface, textual inputs indicative of a measurement criterion associated with an execution status the one or more activities. The computer-based system is further configured to perform operation of developing a report to monitor a risk associated with the PQPM project, the report is based on the measurement criterion associated with the execution status of the one or more activities.

Other features and aspects of this disclosure will be apparent from the following description and the accompanying drawings.

BRIEF DESCRIPTION OF THE DRAWINGS

FIG. 5 is an exemplary user interface window for receiving information associated with the PQPM project, according to an example embodiment of the present disclosure;

FIG. 6 is an exemplary user interface for displaying the information associated with the new PQPM project, according to an example embodiment of the present disclosure.

Figure 7:
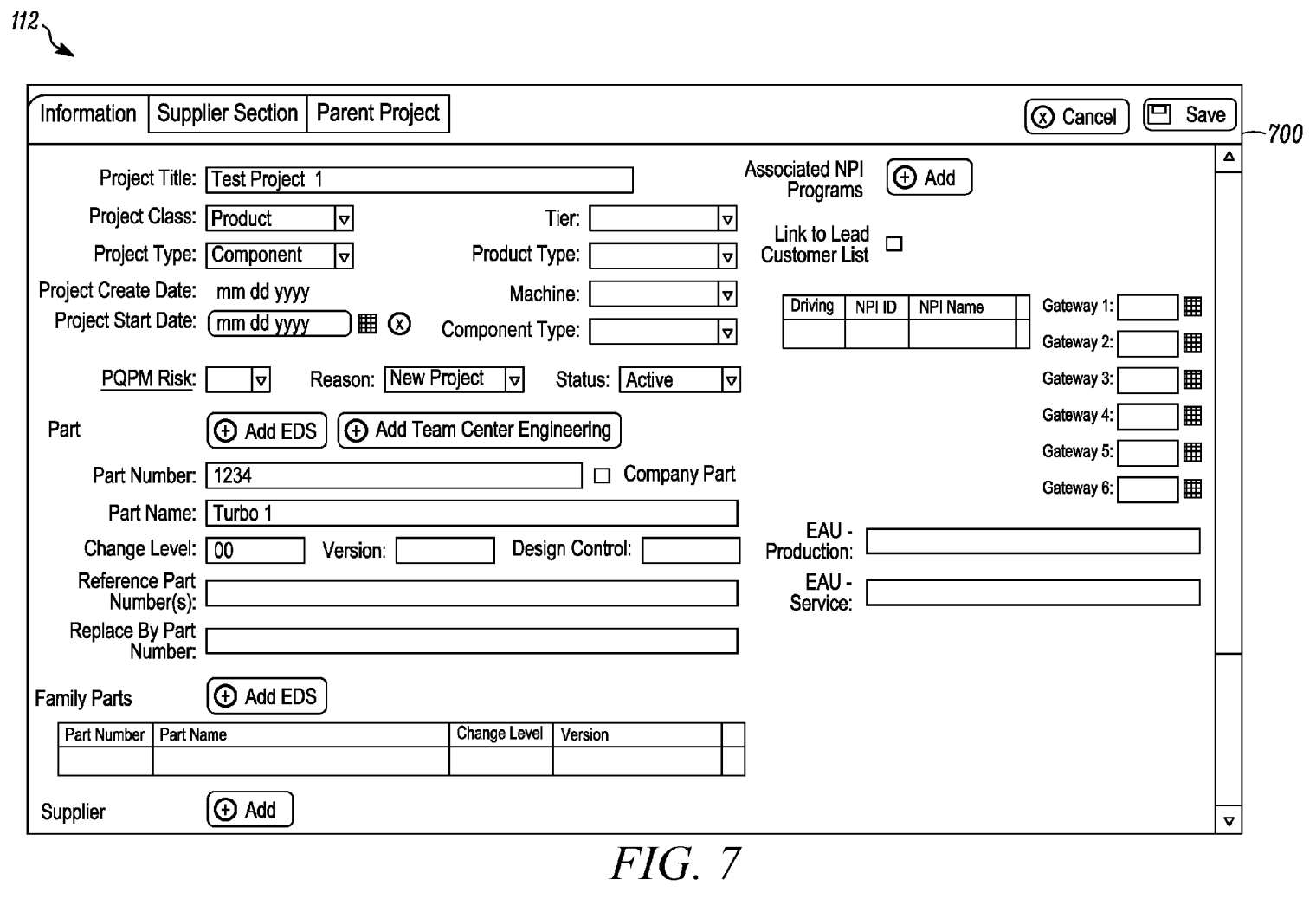

FIG. 7 is an exemplary user interface window for editing information associated with the PQPM project, according to an example embodiment of the present disclosure;

FIG. 8 is an exemplary user interface window to add part information from an engineering data system, for the PQPM project, according to an example embodiment of the present disclosure;

FIG. 9 is an exemplary user interface window to add part information from a team center, for the PQPM project, according to an example embodiment of the present disclosure;

FIG. 10 is an exemplary user interface window add supplier information for the PQPM project, according to an example embodiment of the present disclosure;

FIG. 11 is an exemplary user interface window to add a New Product Information (NPI) program associated with the PQPM project, according to an example embodiment of the present disclosure;

FIG. 12 is an exemplary user interface window for displaying the added NPI program to the PQPM project, according to an example embodiment of the present disclosure;

FIG. 14 is an exemplary user interface window for displaying a summary of the PQPM project with expanded sub-activities for PQPM activities within the PQPM project, according to an example embodiment of the present disclosure;

FIG. 15 is an exemplary user interface window for displaying a summary of the PQPM project with collapsed sub-activities for the PQPM activities within the PQPM project, according to an example embodiment of the present disclosure;

FIG. 17 is an exemplary user interface window for searching the team member for the PQPM project, according to an example embodiment of the present disclosure;

FIG. 18 is an exemplary user interface window for linking sub-activities to the team member for the PQPM project, according to an example embodiment of the present disclosure;

FIG. 19 is an exemplary user interface window for displaying information associated with one or more activities associated with the PQPM project, according to an example embodiment of the present disclosure;

FIGS. 20-24 are exemplary user interface windows for receiving information associated with one or more sub-activities associated with the PQPM project, according to an example embodiment of the present disclosure;

FIG. 25 is an exemplary user interface window for adding an issue for one or more sub-activities within the PQPM project, according to an example embodiment of the present disclosure;

FIG. 26 is an exemplary user interface window for adding an attachment for one or more sub-activities within the PQPM project, according to an example embodiment of the present disclosure;

FIG. 27 is an exemplary user interface window for displaying real time updated summary of the PQPM project, according to an example embodiment of the present disclosure;

Figure 28:
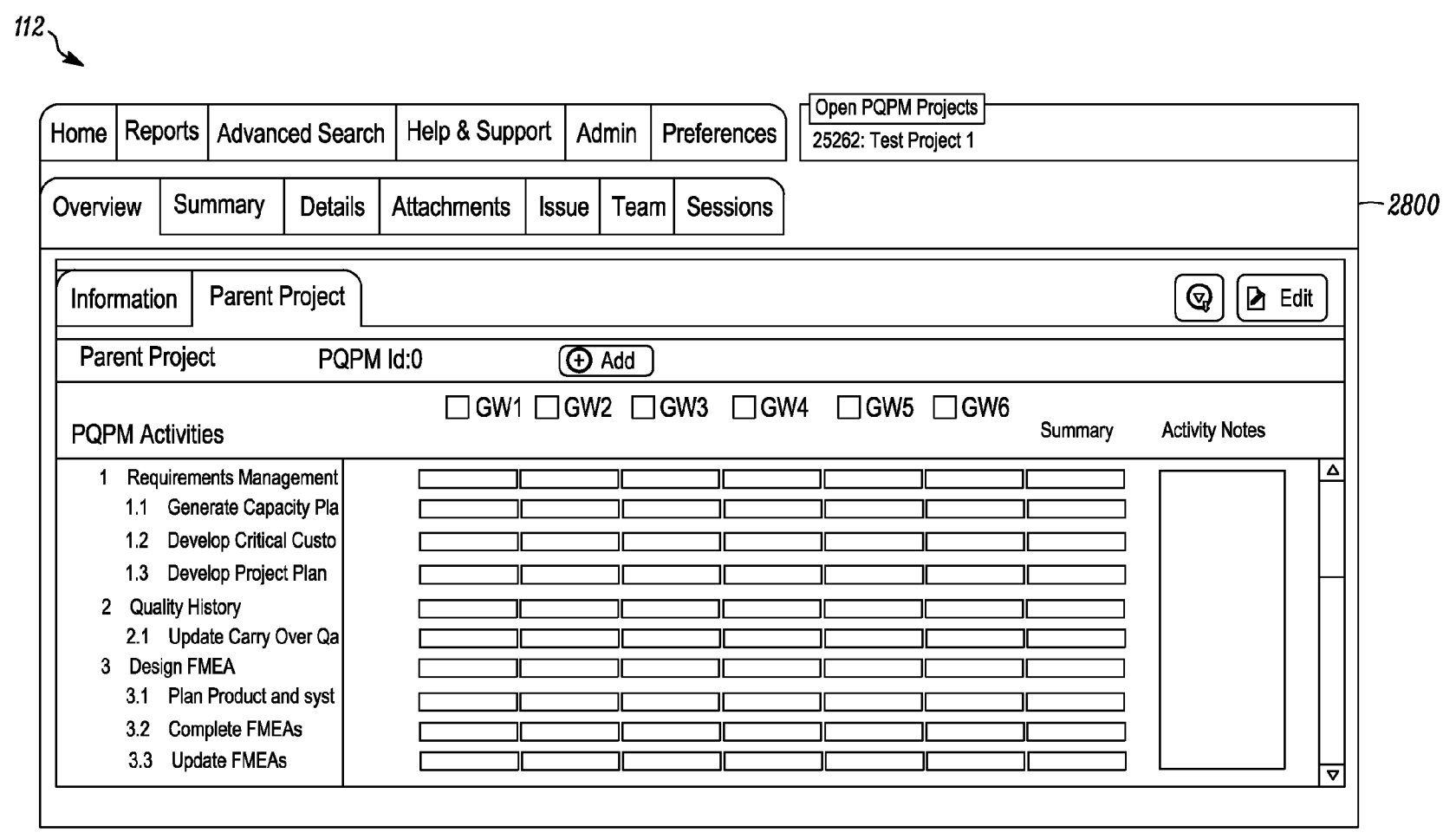

FIG. 28 is an exemplary user interface window for adding a parent project to the PQPM project, according to an example embodiment of the present disclosure;

FIG. 29 is an exemplary user interface window for searching the parent project for the PQPM project, according to an example embodiment of the present disclosure;

FIG. 30 is an exemplary user interface window for linking one or more sub-activities to the parent project for the PQPM project, according to an example embodiment of the present disclosure;

FIG. 32 is an exemplary user interface window for displaying one or more sub-activities within one or more PQPM projects associated with a team member, according to an example embodiment of the present disclosure;

FIG. 36 is an exemplary user interface window for receiving information from the team member to generate an NPI project view report for one or more PQPM projects within an NPI program, in accordance with an example embodiment of the disclosure.

FIG. 37 is an exemplary user interface window to display the NPI project view report, in accordance with an example embodiment of the disclosure.

FIG. 39 is an exemplary user interface window to display the PQPM risk report, in accordance with an example embodiment of the disclosure.

FIG. 41 is an exemplary user interface window for receiving additional information from the team member to generate the PQPM NPI gateway report for one or more PQPM projects within an NPI program, in accordance with an example embodiment of the disclosure.

FIG. 42 is an exemplary user interface window to display the PQPM NPI gateway report, in accordance with an example embodiment of the disclosure.

DETAILED DESCRIPTION

Figure 1:
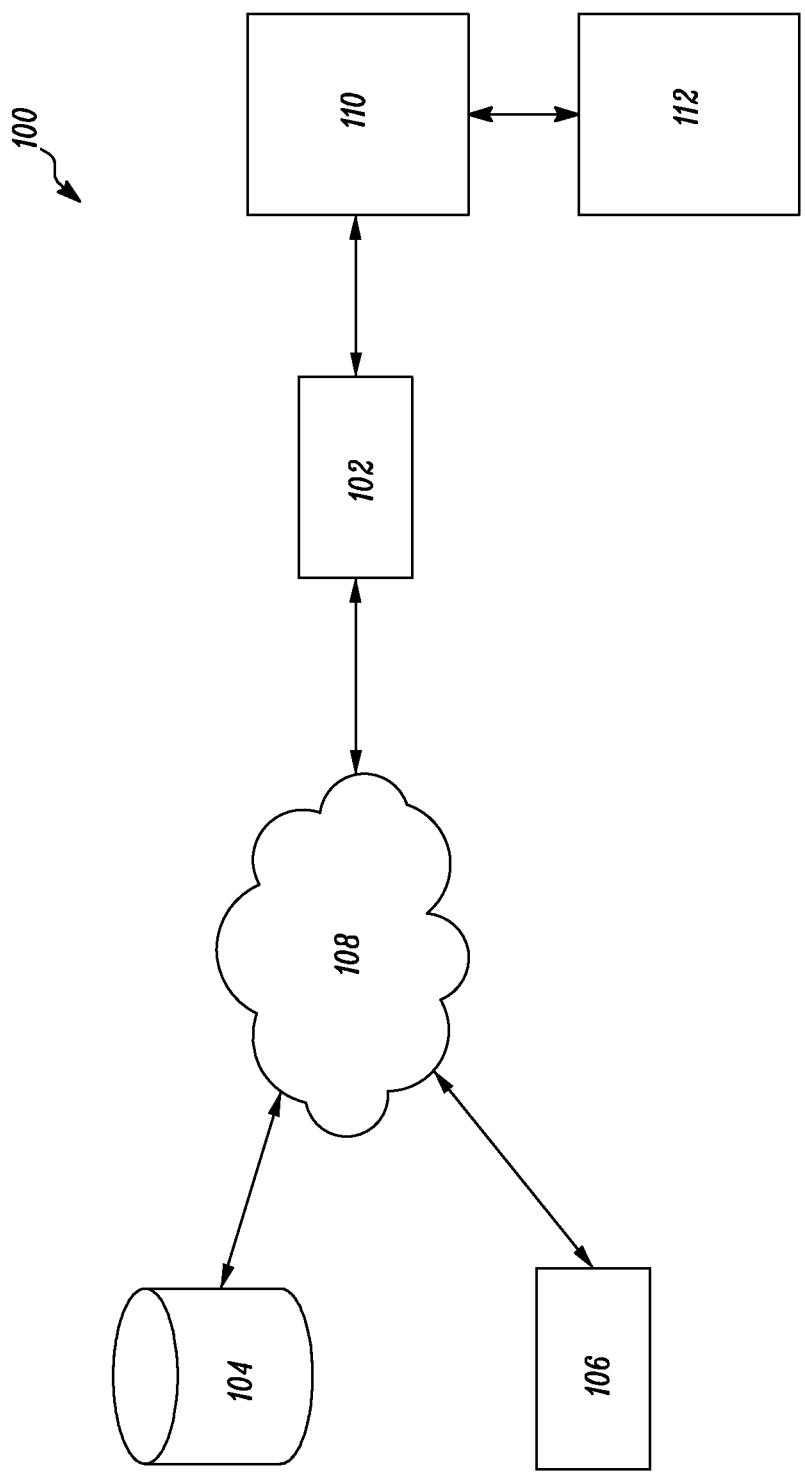
FIG. 1 is an overview of an exemplary environment in which a Graphical User Interface (GUI) module to facilitate a Product Quality Planning and Management (PQPM) project may be deployed, in accordance with various embodiments of the present disclosure.

The detailed description of exemplary embodiments in the disclosure herein makes reference to the accompanying drawings and figures, which show the exemplary embodiments by way of illustration only. While these exemplary embodiments are described in sufficient detail to enable those skilled in the art to practice the disclosure, it should be understood that other embodiments may be realized and that logical and mechanical changes may be made without departing from the spirit and scope of the disclosure. It will be apparent to a person skilled in the pertinent art that this system can also be employed in a variety of other applications. Thus, the detailed description herein is presented for purposes of illustration only and not of limitation. For example, the steps recited in any of the method or process descriptions may be executed in any order and are not limited to the order presented.

The present disclosure is described herein with reference to block diagrams and flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, prompts, etc. Practitioners will appreciate that the illustrated steps described herein may comprise in any number of configurations including the use of windows, hypertexts, hyperlinks, popup windows, prompts and the like. It should be further appreciated that the multiple steps as illustrated and described may be combined into single windows but have been expanded for the sake of simplicity. In other cases, steps illustrated and described as single process steps may be separated into multiple windows but have been combined for simplicity.

It is further noted that a "user device" may include, for example, any of computer, laptop, mobile phone, cellular telephones, beepers, pagers, iPods®, personal digital assistants (PDAs), Blackberry® type devices and/or any device capable of receiving and presenting emails.

The systems, methods and computer program products disclosed in conjunction with various embodiments of the present disclosure are embodied in systems and methods for facilitating Product Quality Planning and Management (PQPM) during a product development cycle.

The present disclosure is described in more detail herein in terms of the above disclosed exemplary embodiments of system, processes and computer program products. This is for convenience only and is not intended to limit the application of the disclosure. In fact, after reading the following description, it will be apparent to one skilled in the relevant art(s) how to implement the following system in alternative embodiments.

FIG. 1 is an overview of an exemplary environment 100 for facilitating a PQPM project, in accordance with various embodiments of the present disclosure. The environment 100 includes a server 102, a repository 104, a user device 106, a communication network 108 and a Graphical User Interface (GUI) module 110. The server 102, the repository 104, the user device 106 and the GUI module 110 may communicate with each other over the communication network 108. Examples of the communication network 108 may include a wide area communication network (WAN), a local area communication network (LAN), an Ethernet, Internet, an Intranet, a cellular communication network, a satellite communication network, or any other suitable communication network for transmitting data. The communication network 108 may be implemented as a wired communication network, a wireless communication network or a combination thereof. In an embodiment, the GUI module 110 may be accessed through the server 102, by the user device 106 for facilitating the PQPM project associated with one or more parts or components of a product in the product development cycle.

User device 106 may be any device capable of communicating with the server 102 and the GUI module 110. In one embodiment, a user (herein after referred to as a team member) may have the user device 106 to communicate with the server 102 of an organization, on which the GUI module 110 may be deployed. In one example, the user device 106 may be a data processing system such as, for example, a mobile device, any suitable personal computer, a laptop, minicomputer, Personal Digital Assistant (PDA), or the like. Those skilled in art can appreciate that user device 106 includes an operating system (e.g., Windows NT, 95/98/2000, OS2, UNIX, Linux, Solaris, MacOS, etc.) as well as various conventional support software and drivers typically associated with computer. The user device 106 may also include an internal memory, an external memory and a cache. The user device 106 may also include one or more browsers (e.g., Microsoft® Internet explorer, Mozilla® Firefox, etc.) through which an email server may be accessed. Alternatively, the user device 106 may include a user email program such as a Microsoft® Outlook, Mozilla® Thunderbird, Pegasus® Mail, and the like, for downloading, reading, replying and/or forwarding the email. Although, a single user device 106 is illustrated herein for exemplary purposes, one skilled in art can appreciate that there can be more than one user device.

The repository 104 and/or one or more databases associated with the GUI module 110 may employ any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the system, any suitable data storage technique may be utilized to store data without a standard format. Data sets may be stored using any suitable technique, including, for example, storing individual files using an ISO/DEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. The BLOB method may store data sets as ungrouped data elements formatted as a block of binary via a fixed memory offset using one of fixed storage allocation, circular queue techniques, or best practices with respect to memory management (e.g., paged memory, least recently used, etc.). By using BLOB methods, the ability to store various data sets that have different formats facilitates the storage of data associated with the system by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

In one embodiment, a team member may create a PQPM project on a user interface 112 and subsequently, the GUI module 110 may display the activities that need to be executed by the team members assigned to the PQPM project. The activities may include sub-activities that need to be executed for a successful completion of the PQPM project. The team members assigned to the PQPM project may review the various expectations associated with each of the sub-activities within the corresponding activities and execute various tasks required to reach those expectations. In an embodiment, the activities and associated sub-activities may be standard PQPM activities as listed in the foregoing paragraphs. In an embodiment, the GUI module 110 may receive textual inputs indicative of a measurement criterion associated with an execution status of the activities. Subsequently, The GUI module 110 may enable the team members to track a progress of the PQPM project based on the measurement criterion associated with the execution status of the activities. Further, the GUI module 110 may enable the team members to visually monitor a risk associated with the PQPM project and the associated NPI program. The GUI module 110 may develop plurality of risk charts to provide a risk status associated with the various components of the product during the product development cycle. In an embodiment, the risk charts are developed based on the measurement criterion indicative of the execution status of the activities.

Figure 2:
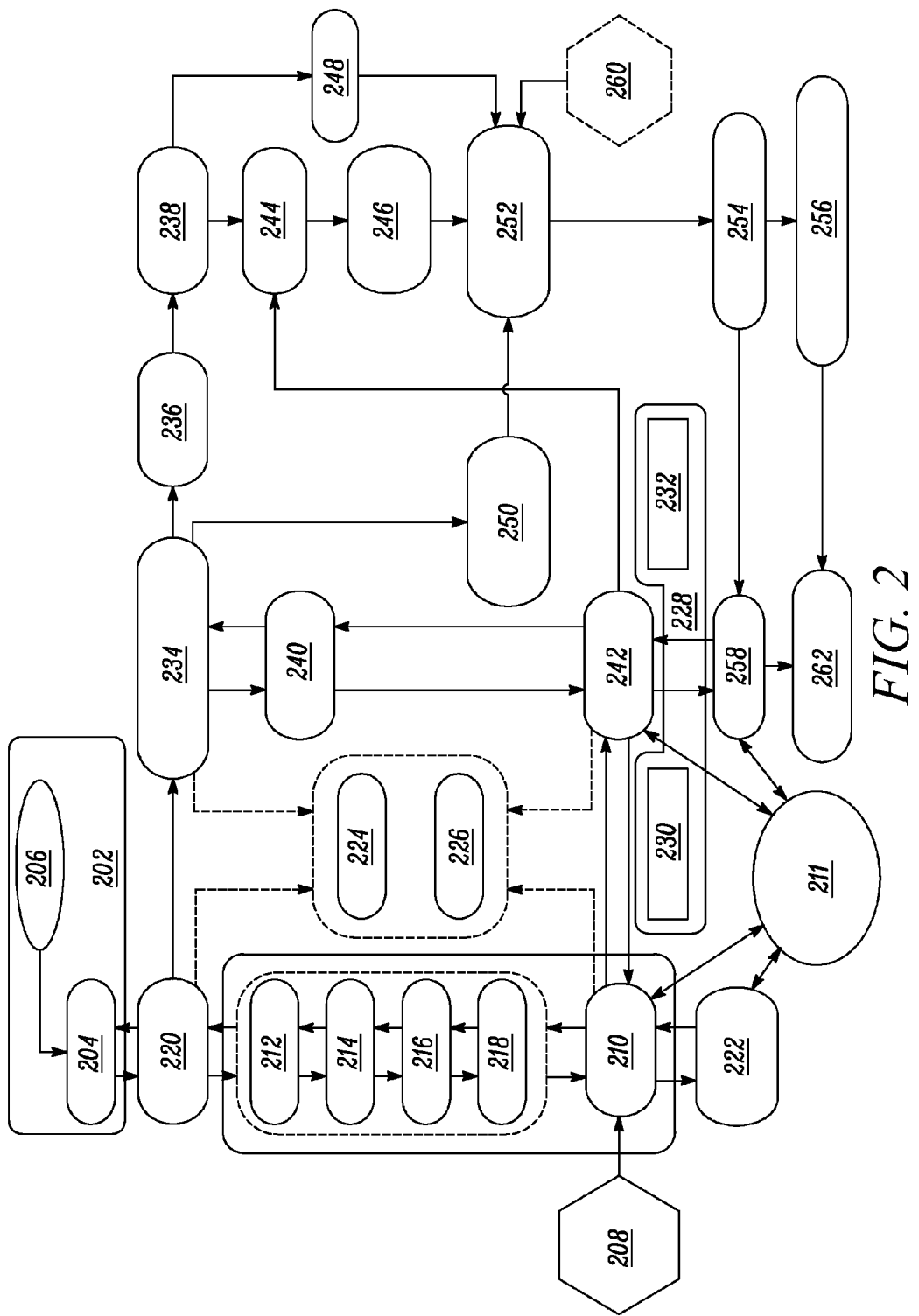
FIG. 2 is an exemplary implementation of a series of activities performed for the PQPM project, according to an embodiment of the present disclosure.

As illustrated in FIG. 2, the team members may execute the activities in an independent manner or in a dependent manner as required, when one or more activities are linked together. In one embodiment, these activities may be related to different stages and processes performed during the development cycle of every part or component of a product. It may be apparent to a person of ordinary skill in the art that the activities and associated sub-activities described in FIG. 2 are merely exemplary and do not limit the scope of the disclosure.

As illustrated in FIG. 2, the team member may execute a requirements management activity 202 for the PQPM project. For example, the requirements management activity 202 may be understood as the design criteria and the program requirements necessary to initiate the PQPM project. Further, the design criteria and the program requirements may include design goals, reliability and quality goals, program timing, affordable cost targets, capacity planning volumes, key contact personnel, and input requested from and supplied by one or more involved manufacturing facilities. As will be understood by a person having ordinary skill in the art, the requirements management activity 202 is performed to assure that any existing manufacturing and process issues are addressed appropriately by the new design and process, early in the product development cycle.

In one embodiment, the requirement management activity 202 may utilize a Quality Function Deployment (QFD) 204 for performing the requirements management 202 activity. The QFD 204 may be understood as a process that defines, organizes, analyzes and evaluates customer and business needs in the form of the Voice Of Customer (VOC) 206 and Voice Of Business (VOB) 206. Further, the QFD 204 may convert the customer and business needs, into system design requirements, the system design requirements into part characteristics, subsequently converts part characteristics into production requirements and production requirements into production operations.

In one embodiment, the requirements management activity 202 may further include a plurality of sub-activities to be executed. As will be understood by a person having ordinary skill in the art, the sub-activities may include a predefined expectation that defines the expected result of the sub-activity execution. The requirements management activity 202 may include a generate capacity planning volume assumptions sub-activity. In an exemplary embodiment, the expectations associated with the generate capacity planning volume assumptions sub-activity may include "the New Product Introduction (NPI) team has generated capacity planning volume assumptions and have contingencies in place for any deviations from these volumes."

Further, the requirements management activity 202 may include a develop critical customer and business requirements sub-activity. In an exemplary embodiment, the expectations associated with this sub-activity may include "all the critical customer requirements have been established and then translated into specific technical objectives, product objectives, or technical specifications. These specifications list the things, which the part under development needs to comply with."

Furthermore, the requirements management activity 202 may include a develop project plan sub-activity. In an exemplary embodiment, the expectation associated with this sub-activity may include "that a project plan has been developed which supports the design & development of the part of the product. It is detailed to illustrate key milestones and activities around specific build events (prototype & pilot builds), drawing release dates, Material Required by Date (MRD), validation testing, etc. The project plan may be reviewed on regular basis to ensure that the design & development process timing is kept on track."

Further, the team member may execute a quality history & lessons learned activity 208. The quality history & lessons learned activity 208 may be understood as a list of all historical quality information that may be gathered to assess the potential for the existing issues to reoccur during at any stage during the design, manufacturing installation and use of the product under development. As will be understood by a person having ordinary skill in the art, it is important that the issues are not carried through to the new version/design of the product.

In one embodiment, the quality history & lessons learned activity 208 may include an update carry over quality sub-activity. In an exemplary embodiment, the expectations associated with the update carry over quality sub-activity may include "that a list of all historical quality concern/issues be prepared by a design authority to assess the potential for reoccurrence during the design, manufacture, installation and use of the product. The list may include, warranty information, internal quality indicators for current product, supplier quality reports, field return product analysis, etc."

In various embodiments of the disclosure, an activity may be linked with each other and may be executed based on inputs and outputs from the execution of other activities. For example, the Design Failure Mode and Effect Analysis (DFMEA) activity 210 may receive an input from the execution of the quality history & lessons learned activity 208 and from a pro-active reliability 211. The linkages of all the activities are illustrated in FIG. 2 with the relevant arrow heads.

Subsequently, the team member may perform a design failure mode and effect analysis (DFMEA) activity 210. The DFMEA activity 210 may be understood as a systematic approach, used by a design responsible team, to assure that potential design failure modes and their associated causes have been considered and addressed. DFMEAs are to be done concurrently with the design process to allow the determined recommended actions to positively affect the design.

In one embodiment, the DFMEA activity 210 may utilize a boundary diagram 212, an interface analysis 214, a P-diagram 216, and a noise factor management 218 for performing the DFMEA activity 210. As will be understood by a person having ordinary skill in the art, the boundary diagram 212 is a graphical representation of a system, sub-system or a component illustrating the physical relationships and interactions between them and the surroundings. The surrounding may include the environment, end-user, other sub-systems and components. Further, the boundary diagrams 212 help in defining the scope of the DFMEA activity 210.

Further, the interface analysis 214 may be performed to analyze and manage the interfaces between a system and its surrounding systems. The interface analysis 214 may identify system interfaces and the effects of these interfaces on the system of focus and the interfacing systems. The interface analysis 214 may document, quantify, and prioritize system interface details. Further, a P-diagram 216 may be a tool used to support the development of transfer functions, noise factor, management strategies, FMEAs and verification methods. The P-Diagram 216 provides a structured method to identify intended outputs (output signals), intended inputs (input signals), ideal relationship between input and output, uncontrolled (or uncontrollable) factors that impact output (Noises), unintended outputs (error states or failure modes) and design control factors. Further, the noise factor management 218 may be understood as the management of the factors that affect the output, such that the noise factor is minimized or eliminated.

Further, the team member may need to execute a plurality of sub-activities associated with the DFMEA activity 210. The team member may execute a plan product and system FMEAs sub-activity within the DFMEA activity 210. In an exemplary embodiment, the expectations associated with the plan product and system FMEAs sub-activity may include, "that a plan to be developed to execute product and system FMEAs based on high risk systems and components. The sub-activity may define the overall responsibilities for the DFMEA plan. The DFMEAs may be selected to be completed using a method for focusing on the changes in the design, and the corresponding effects on the entire system, and not the entire design."

Further, the team member may execute a Complete FMEAs sub-activity within the DFMEA activity 210. In an exemplary embodiment, the expectations associated with the Complete FMEAs sub-activity may include "preparing an initial design FMEA using the standard guidelines, such as Automotive Industry Action Group (AIAG) standard, and using the appropriate inputs from other quality tools. Also, the DFMEA should address all lessons learned and known quality and warranty issues. As explained previously, the Complete FMEAs sub-activity may utilize the QFD 204, the boundary diagrams 212, the interface analysis 214, the internal/external quality history 208, P-diagram 216, pass through characteristics and robustness evaluation. In a further embodiment, the output of the sub-activity may be a DFMEA that lists and details all the potential failure modes associated with the component under development and the recommended or preventative or corrective actions which have been prioritize by high severity, impacting government regulation or safety issues, or high criticality or a Risk Priority Number (RPN) value. Further, the recommended actions may include the responsible lead, timing for completion, identification of the special characteristics that need to be taken into consideration for a Process FMEA (PFMEA) and the corresponding control plans, etc.

Subsequently, the team member may execute an update FMEAs stage 1 sub-activity. In an exemplary embodiment, the expectations associated with the update FMEAs stage 1, may include "revisiting the initial Design FMEA based upon updates from the component development process using the latest AIAG guidelines." Furthermore, the team member may execute an update FMEAs stage 2 sub-activity. In an exemplary embodiment, the expectations associated with the update FMEAs stage 2 sub-activity may include revisiting the initial Design FMEA based upon updates from the completion of design validation testing, and prototype testing using the latest AIAG guidelines.

Further, the team member may execute a drawings & specifications activity 220, as illustrated in FIG. 2. In one embodiment, the drawings & specifications activity 220 may evaluate the development of targets and specifications as they are defined to be input to the design process, and to the drawings (including all engineering drawings, CAD data, material specifications and engineering specifications). In an embodiment the DFMEA activity 210 receives an input from the execution of the drawings & specifications activity 220.

Further, the team member may execute a plurality of sub-activities associated with the drawings & specifications activity 220. The drawings & specifications activity 220 may include a plan the Bill of Material (BOM) sub-activity. In an exemplary embodiment, the expectations associated with the plan the bill of material sub-activity may include that a plan has been developed that identifies the requirements for drawings and specifications that support program milestones and required design target dates. Further the overall responsibility for the design plan may be clearly defined.

Further, the team member may execute a complete the Bill of Material (BOM) sub-activity within the drawings & specifications activity 220. In an exemplary embodiment, the expectations associated with the complete the BOM sub-activity may specify that the BOM is completed and released in time to support prototype builds and/or validation activities. Subsequently, the team member may execute an update drawings & specifications sub-activity. For example, the expectations associated with the update drawings & specifications sub-activity may specify that the released drawings may include the appropriate Special Characteristics, 1E Specifications and special notes, as required. Additionally, the drawings may also conform to general drawing standards of the organization.

Furthermore, the team member may execute a production release the product design sub-activity. In an example, the expectations associated with the production release the product design sub-activity may indicate that all the drawings are production released in time to support the production trial run (pilot build).

The team member may further execute a Design Verification Plan and Report (DVP&R) activity 222 that may list the engineering evaluations and tests required to establish that the design is fit for use in its intended environment. In one embodiment, the DVP&R activity 222 may include a one or more sub-activities that may be executed to complete the execution of the DVP&R activity 222. The team member may execute a develop DVP&R sub-activity. For example, the expectations associated with the develop DVP&R sub-activity may specify that a Design Verification Plan (DVP) has been developed to support the program requirements identified through the DFMEA (e.g., functional requirements, regulatory requirements, etc.). Further, the overall responsibility for the plan is clearly defined and has been communicated to the appropriate personnel. Furthermore, the DVP&R lists the detection and prevention controls corresponding to the failure modes identified in the DFMEA.

Further, the team member may execute a complete DVP&R sub-activity. In an exemplary embodiment, the expectations associated with the complete DVP&R sub-activity may specify that the roles and responsibilities within the DVP have been agreed to ensure that each test requirement is completed to support the customer development program. Subsequently, the team member may execute an update validation plan. For example, the expectations associated with the update validation plan may indicate that the DVP&R lists the methods, equipment, design level, statistical acceptance criteria, sample sizes, and results of all the engineering evaluations and tests, and completed by the gateway 5.

The team member may further execute a design/manufacturing review(s) activity 224 that may indicate that for suppliers, design reviews are regularly scheduled meetings led by a supplier's design activity and must include other affected areas. Further manufacturing reviews are regularly scheduled meetings used to monitor the status of the manufacturing process development. The design reviews may be held by a program team. Manufacturing Reviews are reviews of the manufacturing design, tooling, equipment & facilities.

In one embodiment, the design/manufacturing review(s) activity 224 may include a one or more sub-activities that may be executed to complete the execution of the design/manufacturing review(s) activity 224. The team member may execute a conduct design review 1 sub-activity. For example, the expectations associated with the conduct design review 1 sub-activity may specify that a plan has been developed to establish regular reviews with the appropriate cross-functional team. Further, participation may include design engineering, technical leads, manufacturing engineering, product support, appropriate levels of management, etc., as applicable. Additionally the overall responsibility for the plan may be clearly defined.

The team member may execute a conduct design review 2&3 sub-activity. For example, the expectations associated with the conduct design review 2&3 sub-activity may specify that the teams may meet at least once before the gateway 3 review, to ensure all the existing issues are understood and the mitigating actions are associated with them, as the output from these reviews are often used to support next level NPI review. Subsequently, the team member may execute a conduct design review 4 sub-activity. For example, the expectations associated with the conduct design review 4 sub-activity may specify that the teams may meet again at least once before the gateway 4 review, to ensure all the issues are understood and the corresponding mitigating actions are associated with them, as the output from these reviews are often used to support next level NPI review. Similarly, the team member may execute a conduct design review 5 sub-activity. For example, the expectations associated with the conduct design review 5 sub-activity may specify that the teams may meet at least once before the gateway 5 review, to ensure all the issues are understood and the mitigating actions are associated with them, as the output from these reviews are often used to support next level NPI review. Furthermore, the team member may be configured to execute a conduct design review 6 sub-activity. For example, the expectations associated with the conduct design review 6 sub-activity may specify that the teams may meet at least once before the gateway 6 review, to ensure all the existing issues are understood and the mitigating actions are associated with them, as the output from these reviews are often used to support next level NPI review The team member may further execute a team feasibility and management commitment activity 226 that may determine whether the proposed design can be manufactured within the guidelines and specifications. For example, a cross-functional design/manufacturing review team is charged with assessing design feasibility. Once the feasibility is established, the program organization undertakes the responsibility for the design/manufacturing review process and reassessing feasibility for any design/part change that may occur.

In one embodiment, the team feasibility and management commitment activity 226 may include a one or more sub-activities that may be executed to complete the execution of the team feasibility and management commitment activity 226. The team member may execute a team feasibility review sub-activity. For example, the expectations associated with the team feasibility review sub-activity may specify that team feasibility meetings should be held at regular intervals, in order for the team to come to a consensus that the product under review can continue to the next gateway, either with or without management review. A plan may be developed that defines when the team will meet in order to sign off the team feasibility documents. Further, the team feasibility documents may be in line with higher level NPI program meetings.

The team member may further execute a complete start of development team feasibility sub-activity. For example, the expectations associated with the complete start of development team feasibility sub-activity may specify that once the supplier selection process has been completed and a supplier has been nominated, then the start of development team feasibility should be completed. This is to ensure the all aspects of the product under development are considered.

The team member may further execute a complete team feasibility agreement sub-activity. For example, the expectations associated with the complete team feasibility agreement sub-activity may specify that in support of the higher level NPI program the team may review the PQPM Workbook, and declare a status associated with the development process on the team feasibility document associated with the gateway 3. The team may continue if there are no issues with the development process, and therefore it is on plan to deliver all the customer expectations. Further, the team may mark the status as "Feasible" if there are a number of issues, which have mitigating action identified, and the development process can continue without the need for management review. Furthermore, the team may mark the status as "Not Feasible", if there are a number of issues, which may have mitigating actions, however, the development process may be held until management review.

The team member may further execute a status review for team feasibility GW4 sub-activity. For example, the expectations associated with the status review for team feasibility GW4 sub-activity may specify that in support of a higher level NPI program the team may review the PQPM workbook, and declare a status associated with the development process on the team feasibility document GW4, as illustrated for Complete Team Feasibility Agreement sub-activity.

The team member may further execute a status review for team feasibility GW5 sub-activity. For example, the expectations associated with the status review for team feasibility GW5 sub-activity may specify that in support of a higher level NPI program the team may review the PQPM workbook, and declare a status associated with the development process on the team feasibility document GW5, as illustrated for complete team feasibility agreement sub-activity.

The team member may further execute a status review for team feasibility GW6 sub-activity. For example, the expectations associated with the status review for team feasibility GW6 sub-activity may specify that in support of a higher level NPI program the team may review the PQPM workbook, and declare a status associated with the development process on the team feasibility document GW6, as illustrated for complete team feasibility agreement sub-activity.

The team member may further execute a special characteristics activity 228 that may identify all the product and process special characteristics. The team may either eliminate them by designing the failure modes out of the product, or by putting the appropriate mitigating controls into the manufacturing process, so that the failure mode is not seen by the customer. As will be understood by a person having ordinary skill in the art, that all the special characteristics be clearly identified throughout the quality documentation, specifically in the control plans of the project.

In one embodiment, the special characteristics activity 228 may include a one or more sub-activities that may be executed to complete the execution of the special characteristics activity 228. The team member may execute a develop preliminary characteristics sub-activity 230. For example, the expectations associated with the develop preliminary characteristics sub-activity 230 may specify that all pass through characteristics and nominated special characteristics (SCs) from the initial Design and process FMEAs are identified and included in the Prototype (Prove Design Build) Control Plan.

The team member may further execute a confirm special characteristics for pilot control plan sub-activity 232. For example, the expectations associated with the confirm special characteristics for pilot control plan sub-activity 232 may specify that all pass through characteristics and nominated Special Characteristics (SCs) from the design and process FMEAs are identified and included in the pre launch (pilot component builds) control plan.

The team member may further execute a confirm special characteristics for production control plan sub-activity. For example, the expectations associated with the confirm special characteristics for production control plan sub-activity may specify that all pass through characteristics and nominated Special Characteristics (SCs) from the Design and Process FMEAs are clearly identified within the documented PFMEA and are also clearly identified within the production control plan.

The team member may further execute a facilities, tools & gauges activity 234 that may indicate that the facilities, tools, and gauges are the additional, new, refurbished, and relocated resources required to produce the product at the customer specified quantity and quality levels. Expectations for this element may include but are not limited to planning, statistical and acceptance criteria, lean manufacturing considerations, qualification of equipment, corrective actions, delivery and setup.

In one embodiment, the facilities, tools & gauges activity 234 may further include a one or more sub-activities that may be executed to complete the execution of the facilities, tools & gauges activity 234. For example, the team member may execute an identify new equipment, tooling and facilities & identify gauge and test requirements sub-activity. For example, the expectations associated with the identify new equipment, tooling and facilities & identify gauge and test requirements sub-activity may specify that a work plan has been developed for all tooling, equipment, test equipment, gauges and fixtures. The plan may include responsible lead, timing, validation methods and respective acceptance criteria. All timing must support availability of production tools/gages for production trial run (pilot build). In addition, the plan has also been agreed to by all parties involved in the project.

Further, the team member may execute an all capital expenses requests have been approved and purchase orders have been released sub-activity. For example, the expectations associated with the all capital expenses requests have been approved and purchase orders have been released sub-activity may specify that all capital expenses requests have been approved and purchase orders have been released.

Further, the team member may execute a validate tooling, equipment, test equipment, gauges and fixtures for production trial run (pilot build) sub-activity. In an exemplary embodiment, the expectations associated with the validate tooling, equipment, test equipment, gauges and fixtures for production trial run (pilot build) sub-activity may specify that all of the component tooling, equipment, test equipment, gauges and fixtures are delivered, validated and commissioned on time to support the production trial run (pilot build).

The team member may further execute a prototype (prove design) build control plan activity 236 that may be a description of the dimensional measurements, material, and functional tests that will occur during the confirmation prototype (prove design) Build. In one embodiment, the prototype (prove design) build control plan activity 236 may include a one or more sub-activities that may be executed to complete the execution of the prototype (prove design) build control plan activity 236.

For example, the team member may execute a "work plan for identifying where prototype (prove design) build control plans are required" sub-activity. For example, the expectations associated with the work plan for identifying where prototype (prove design) build control plans are required sub-activity may specify that a work plan has been developed to identify where prototype (prove design) build control plans are required. Additionally, the plan identifies the responsible lead and supports availability by the start of the prototype (prove design) build.

Further, the team member may execute a "develop manufacturing prototype control plans" sub-activity. For example, the expectations associated with the "develop manufacturing prototype control plans" sub-activity may specify that the prototype (prove design build) control plans have been developed in accordance with standard AIAG format, and have been signed off by all responsible parties. The prototype control Plans may be created with input from the historical control plans, DFMEA, PFMEA, preliminary drawings and specifications, etc.

The team member may further execute a prototype (prove design) build activity 238 that may identify the required manufacture or assembly of components, sub-systems, systems, or assembled machines (e.g. prototype/prove design) that may be supplied to the customer and built prior to the pre-production trial run. In one embodiment, the prototype (prove design) build activity 238 may include a one or more sub-activities that may be executed to complete the execution of the prototype (prove design) build activity 238.

For example, the team member may execute a "develop manufacturing prototype test plan" sub-activity. In an exemplary embodiment, the expectations associated with the "develop manufacturing prototype test plan" sub-activity may specify that a work plan has been developed to define the prototype (prove design) build. The plan may identify responsible leads, and timing and quantity of each individual event in the build. Further, the plan has been agreed to by all parties and communicated to all lower level systems/components to ensure parts availability at the start of the prototype (prove design) build.

Furthermore, the team member may execute a "complete manufacturing prototype testing" sub-activity. In an exemplary embodiment, the expectations associated with the "complete manufacturing prototype testing" sub-activity may specify that the prototype builds are completed with design representative parts, using prototype (prove design) control plans and appropriate gauging as identified in the control plans. Further, all identified issues from the prototype build may be documented, assigned to responsible lead, and communicated to appropriate parties. Additionally, all the identified issues have a plan for full resolution by production trial run (pilot build).

The team member may further execute a manufacturing process flowchart activity 240 that may be a graphic representation of the current or proposed sequence of manufacturing process. In one embodiment, the manufacturing flow chart can be either in the traditional flow chart format, or depicted in cycle line layouts, tooling line layouts, plant layouts, or other appropriate types of layouts, providing all necessary information. In a further embodiment, the manufacturing process flowchart activity 240 may include a one or more sub-activities that may be executed to complete the execution of the manufacturing process flowchart activity 240.

Further, the team member may execute a "plan the process flow charts" sub-activity. In an exemplary embodiment, the expectations associated with the "plan the process flow charts" sub-activity may specify that a plan exists to develop the high-level process flow chart and 100% of the process flow charts identified as high risk processes. Further, the team member may execute a "develop process flowchart" sub-activity. In an exemplary embodiment, the expectations associated with the "develop process flowchart" sub-activity may specify that the manufacturing process flowchart is a complete pictorial representation of all the various processes/operations, covering the entire process from receiving of initial material through to shipping of the finished product. Additionally, it may also include how the material is transported between processes/operations, and any rework and/or repair routings. Furthermore, the flowchart may define the scope of the processes and/or operations under study (similar to a boundary diagram) and may also be used to develop the PFMEA's and control plans (prototype, pilot build and production). The flowchart may be developed using the standard template, such as AIAG template. In a further embodiment, the flowchart may include a description of events occurring at each operation, including the equipment and machine description. The nominated special characteristics from the Design FMEAs and confirmed special characteristics from the Process FMEAs may be identified and included in the Flowchart.

In a further embodiment, the team member may execute an "update process flowcharts for Production Part Approval Process (PPAP) submission" sub-activity. For example, the PPAP may be understood as a process of addresses evaluation and documentation of the effects of a change (to design or process) on the constituent parts and end products. In an exemplary embodiment, the expectations associated with the "update process flowcharts for Production Part Approval Process (PPAP) submission" sub-activity may specify that the manufacturing process flowcharts are updated subsequent to the production trail run (Pilot Builds) and is ready to support the PPAP submission.

In a further embodiment, the team member may be configured to execute a Process FMEA (PFMEA) activity 242 that is a systematic approach used by a manufacturing team to assure that potential process related failure modes and their associated causes have been addressed and resolved. The manufacturing process flow diagrams as well as a plurality of potential special characteristics from the DFMEA activity may be used to ensure that the process is analyzed in the appropriate sequence, with all failure modes addressed. In a further embodiment, the process FMEA activity 242 may include a one or more sub-activities that may be executed to complete the execution of the process FMEA activity 242.

In one embodiment, the team member may execute a "plan manufacturing process FMEAs" sub-activity for the activity 242. In an exemplary embodiment, the expectations associated with the sub-activity may specify that a plan has been developed to execute the process FMEAs and includes all priority processes identified and agreed by appropriate level of management. Further, the overall responsibility for the plan may be defined in the sub-activity.

Subsequently, the team member may execute a "complete manufacturing process FMEAs" sub-activity. In an exemplary embodiment, the expectations associated with the "complete manufacturing process FMEAs" sub-activity may specify that an initial process FMEA may be prepared using the latest AIAG guidelines or standard organizational guidelines. Further, the initial PFMEA may be prepared using the appropriate inputs from other quality tools. Further, the PFMEA may address ALL lessons learned and known CPI, quality, and/or warranty issues. In one embodiment, the typical inputs for preparing the initial PFMEA may be a corresponding DFMEA, QFD 204, Boundary Diagram 212, Interface Analysis 214, Internal/external quality history 208, P-Diagram 216, "pass through" characteristics and robustness evaluation. Further, the output may be a PFMEA that details all the potential failure modes associated with manufacturing process for the part or the component under development and the recommended preventative/corrective actions. In one embodiment, the recommended actions may be prioritized based on a high severity, impacting government regulation or safety issues, high criticality, a risk priority number etc. As will be understood by a person ordinarily skilled in the art, the recommended actions may detail the responsible leader, timing for completion of the sub-activity, the identification of the special characteristics that need to be considered for the control plans for the project.

Furthermore, the team member may execute a "review manufacturing process FMEAs" sub-activity. In an exemplary embodiment, the expectations associated with the "review manufacturing Process FMEAs" sub-activity may specify that the PFMEA may be updated subsequent to the completion of a design verification phase of the development process. Subsequently, the team member may execute an "update manufacturing process FMEAs" sub-activity. In one exemplary embodiment, the expectations associated with the "update manufacturing process FMEAs" sub-activity may specify that the PFMEA has been updated following product under development's pilot build, ready to support the PPAP submission.

In a further embodiment, the team member may execute a pre-launch (pilot build) control plan activity 244 that is a written description of the dimensional measurements and material and functional tests that may occur after the prototype builds and before the production builds. In one embodiment, the plan may include the additional product and/or process controls to be implemented until the production process is validated. Further, the pre-launch (pilot build) control plan activity 244 may include a one or more sub-activities to be executed to complete the execution of the activity 244.

In one embodiment, the team member may execute a "plan the pre-launch (pilot) build control plan" sub-activity. In an exemplary embodiment, the expectations associated with the "plan the pre-launch (pilot) build control plan" sub-activity may include a work plan for each Pre-Launch (Pilot) Build Control Plan that may define the responsible team leader, team members and timing. In one embodiment, the plan may be communicated to all the responsible parties. Further, the team member may execute a "develop manufacturing pilot control plans" sub-activity. In exemplary embodiments, the expectations associated with the "develop manufacturing pilot control plans" sub-activity may specify that the pre-launch (pilot build) control plans have been developed according to the AIAG standards. In one embodiment, the inputs for the control plan development may include, customer specifications, prototype build control plan, DFMEA revisions, PFMEA revisions, DVP Results, drawing/specification changes, measuring system analysis results linked to the process flow diagram, etc. Further, the output of the sub-activity may be a control plan that may be easily understood and utilized by an operator. In one embodiment, the document may contain for each line item/operation, the characteristics to be measured, method for measuring the characteristics, the frequency of measurement, and a reaction plan for any non-conforming items. In addition, all the special characteristics (SCs) may be clearly identified within the control plan.

Further, the team member may execute an operator process instructions activity 246, as shown in FIG. 2. In one embodiment, the operator process instructions activity 246 may describe the details of controls and actions that an operating personnel may perform to produce quality products. As will be understood, the operator process instructions activity 246 may further include a plurality of sub-activities for successful execution.

In one embodiment, the team member may execute a "plan for developing operator/process instructions" sub-activity under the activity 246. In various exemplary embodiments, the expectations associated with the sub-activity may indicate that a plan may specify the development of operator and/or process instructions. In one embodiment, the plan may include a list of operator/process instructions to be completed, the dates of completion of the instructions, the responsible team leader for the completion of the instructions, etc. In a further embodiment, the plan may identify if or when an operator training may be required to be completed for one or more new operations, processes, or sequences.

In a further embodiment, the team member may execute an "assemble production documentation" sub-activity. In an example, the expectations associated with the sub-activity may indicate that the operator instructions may be easy to understand, accessible and be at applicable work station. Further, the document may be determined to be consistent with the organizational guidelines and practices. Additionally, the document may include visual aids, and the work instructions that may be executed to meet the quality and process requirements.

Subsequently, the team member may execute a "complete production documentation" sub-activity. In an example, the expectations associated with the sub-activity may indicate that the team may confirm completion of a training based on a predefined training plan. Further, the team may ensure that all operator training records are updated to indicate that the appropriate training is completed.

In an embodiment, the team member may execute a packaging specifications activity 248, as illustrated in FIG. 2. The packaging specifications activity 248 may execute to facilitate a supplier of a product to ensure that the packaging is designed and developed to provide the protection from normal transportation damage and adverse environmental factors. Further, the activity 248 may use one or more customer packaging standards or generic packaging requirements.

In one embodiment, the team member may execute a "develop packaging specifications plan" sub-activity within the activity 248. In exemplary embodiments, the expectations associated with the "develop packaging specifications plan" sub-activity may indicate that a plan specifies the development of the packaging specifications, for all level of product that is to be supplied (e.g. prototype, pre-production, design verification, and production). In one embodiment, the plan may include a list of preferred suppliers for packaging, list of the packaging specifications that need to be completed, the target dates for completing the packaging specifications, a one or more packaging trial required for completing the packaging specifications, etc. In one embodiment, the packaging specification may additionally identify the responsible team leader.

In a still further embodiment, the team member may execute an "identify packaging standards" sub-activity. In various exemplary embodiments, the "identify packaging standards" sub-activity may indicate that an interim packaging specification for prototype and pre-production product, may be specified based on the customer requirements and/or standards. In one embodiment, the customer requirements and standards may include a level of required protection, ease of disposal of packaging, etc.

In an embodiment, the team member may execute a "finalize packaging requirements" sub-activity. In an example, the expectations associated with the "finalize packaging requirements" sub-activity may indicate that for any revision in the existing packaging specifications or a new packaging specification, the packaging specifications may be developed based on the customer's requirements and standards. In one embodiment, the packaging specification may also be based on environmental requirements of the location of the customer, associated government regulations for the location of the customer. Further, the packaging specification may be documented for consistent application. Additionally, the packaging specification may be made available for the customers pilot build events.

Furthermore, the team member may execute an "evaluate packaging methods" sub-activity. In various examples, the "evaluate packaging methods" sub-activity may indicate that sufficient volumes of the production packaging may be available to support the start of production requirements. However, if the start of production volumes has a low ramp up, then a plan may be executed to manage the introduction of additional packaging base on the volume ramp.

In a further embodiment, the team member may be configured to execute a Measurement Systems Analysis (MSA) activity 250, as shown in FIG. 2. The MSA activity 250 assesses the variation of the measurement system and determines whether the measurement system is acceptable for monitoring the process.

Further, the team member may execute a "plan Measurement System Analysis (MSA) for gauges and test equipment" sub-activity within the MSA activity 250. In exemplary embodiments, the "plan Measurement System Analysis (MSA) for gauges and test equipment" sub-activity may indicate that an existing plan may specify the development of the Measurement System Analysis (MSA) for gauges and test equipment. In one embodiment, the plan may include a list of gauges and test equipment to be validated, a validation plan, acceptance criteria, number of parts, the completion dates for the analysis of gauges and test. Further, the plan may also identify the responsible lead for all MSA requirements.

Further, the team member may execute a "perform measurement systems evaluation" sub-activity within the MSA activity 250. In exemplary embodiments, the "perform measurement systems evaluation" sub-activity may indicate that the measurement and evaluation technique for all the nominated special characteristics and/or special application gage and equipment, identified within the control plans, may undergo a level of evaluation based around the MSA, as defined by the AIAG standards. For example, a gauge study may be performed to ensure that the technique is suitable for the production environment as being used by the production operators, and ready to support the PPAP submission. Additionally, the operator instruction and routine calibration plan may also be documented.

In an embodiment, the team member may execute a production trial run (pilot build) activity 252 The activity 252 is a validation of the effectiveness of the manufacturing and assembly process, using production tooling, equipment, environment (including production operators), facilities and cycle times. In one embodiment, the outputs from the production trial run in the form of parts & documentation are used to generate Production Part Approval (PPAP).

In an embodiment, the team member may execute a "plan production trial run (pilot build) and Production Validation (PV) testing plan" sub-activity within the activity 252. In exemplary embodiments, the expectations associated with the sub-activity may indicate that a plan may be developed for supporting production trial run (pilot build) and PV testing plan. For example, the availability of all production parts, production processes, and facilities may support the production trial run (pilot build) Build timing. Additionally, the responsibilities and timing may be clearly defined within the plan.

Subsequently, the team member may execute a "complete production readiness assessment" sub-activity. In exemplary embodiments, the expectations associated with the sub-activity may indicate that the quality of the production trial run (pilot build) event may demonstrate complete production readiness. Further, an event readiness assessment may be performed prior to the build(s) to indicate that the build(s) are executed with, production approved parts (PPAP or Interim-PPAP), and on production approved processes. Further, the control plans may be available and approved for usage by a responsible engineer. Additionally, production gauging may be available and approved for usage. Further, production packaging and logistics may be available for utilization during the build.

Subsequently, the team member may execute a "complete production trial run (pilot build)" sub-activity. In exemplary embodiments, the expectations associated with the sub-activity may indicate that the production trial run (pilot build) was completed as a coordinated event, utilizing the production facility, components, operators and logistical solutions. Further, the event met all expected quality targets and was in-line with the NPI program timing.

In a further embodiment, the team member may be configured to execute a preliminary process capability study activity 254, as shown in FIG. 2. The activity 254 is a statistical assessment of the ability of the process to produce product within specification. Further, the team member may execute a "verify process designs" sub-activity within the activity 254. In exemplary embodiments, the expectations associated with the sub-activity may specify a developed plan to complete preliminary process capabilities studies including responsibility, timing and required actions. In one embodiment, all timing dates for each study may support GW6 requirements. Additionally, the plan may be communicated to a responsible party.

Subsequently, the team member may execute a "perform process capability study" sub-activity to indicate that a special characteristics (both design & process related, which have been identified from the DFMEA/PFMEA) associated with the finished product/component may demonstrate process capability under production conditions. In one embodiment, the special characteristics (SCs) process capabilities indices may be greater than 1.67 Cpk/Ppk. However, in a further embodiment, the non-capable SCs having indices value of less than 1.67 Cpk/Ppk may have specific additional controls added to the Production Control Plan, until the desired capability is demonstrated.

In a further embodiment, the team member may execute a production control plan activity 256, as shown in FIG. 2. The activity 256 may indicate a written description of the systems for controlling parts and processes during full production. In one embodiment, the document is based on the pre-launch control plan activity 244. Further, the team member may execute a "develop manufacturing production control plans"

sub-activity within the activity 256. In exemplary embodiments, the expectations associated with the sub-activity may specify that a production control plan has been updated using the production trial run (pilot build) control plans with inputs from the items identified during the production trial run (pilot build) that need clarifications and/or confirmation, inspection frequencies requiring modifications based off the preliminary capabilities studies, and the lessons learnt during the development process.

Subsequently, the team member may execute a production validation testing activity 258 to indicate a production control plan has been updated using the production trial run (pilot build) control plans with inputs from the items identified during the production trial run (pilot build) that need clarifications and/or confirmation, inspection frequencies requiring modifications based off the preliminary capabilities studies, and the lessons learnt during the development process.

In one embodiment, the team member may execute a "develop manufacturing production test plan" sub-activity to indicate that a plan has been developed to support the validation of the production components/assemblies, in conjunction with a finished product customer. Further, the validation process may be implemented in a number of forms, such as rig testing, in-application testing, CAE analysis, etc. As will be understood, these are all acceptable forms of validations if the finished product meets all the necessary technical objectives, and the customer approval. Further, the plan may detail, the target dates for the completion of the various forms of validation. Additionally, the plan may be developed to support the validation of the production components and/or assemblies.

Subsequently, the team member may execute a "complete validation of the production components/assemblies" sub-activity within the activity 258. In exemplary embodiments, the sub-activity may indicate completion of a validation testing on a finished product in accordance with a formally agreed validation plan. Further, the results of these tests may be evaluated before releasing of the finished product for production by GW6.

In a further embodiment, the team member may execute an external supplier PPAP status activity 260. The activity 260 may identify and report on the condition of an external supplier or a subcontractor's PQPM process. Further, it is required that internal suppliers (within the organization) & external suppliers cascade PQPM requirements to their sub-suppliers or sub-contractors, and conduct PQPM reviews as appropriate.

Further, the team member may execute a "develop (tier 1) supplier work plan to manage/monitor the development of components/systems" sub-activity within the activity 260. In exemplary embodiments, the expectations associated with the sub-activity may specify that an overall (tier 1) supplier work plan has been prepared to manage and/or monitor the development of components and systems in support of the NPI program deliverables. In one embodiment, this may include a list of suppliers for all high risk systems and components and the responsible team leaders for each system and component. Further, the individual supplier timing plans may support the delivery of PPAP at GW5 (pilot build) and may be confirmed by all interested parties.

Subsequently, the team member may execute a "complete reviews with (tier 1) suppliers on a regular basis in order to manage ongoing PQPM activities" sub-activity. In exemplary embodiments, the expectations associated with the sub-activity may specify completion of the reviews with (tier 1) suppliers on a regular basis in order to manage ongoing PQPM activities. Further, the team member may facilitate summary reporting in order to demonstrate ongoing management of PQPM activities and status. Furthermore, open issues that may be identified in the development of high risk systems/components, may be documented to identify responsible team leaders. Additionally, contingency plans may be made available to mitigate the risk.

Subsequently, the team member may execute a "update supplier summary" sub-activity. In exemplary embodiments, the expectations associated with the sub-activity may specify summary reporting in order to demonstrate ongoing management of PQPM activities and status. Furthermore, open issues that may be identified in the development of high risk systems/components, may be documented to identify responsible team leaders. Additionally, contingency plans may be made available to mitigate the risk.

Subsequently, the team member may execute a "gather review and approve PPAPs" sub-activity. In exemplary embodiments, the expectations associated with the sub-activity may specify receipt of a Part Submission Warrant (PSW) from the 2nd tier supplier(s) to support delivery of material for the production trial run (pilot build). Further, the PSW may be accompanied with the PPAP information at the appropriate submission level.

In an embodiment, the team member may execute a PPAP Status activity 262 to verify that the internal or external supplier meets all engineering design requirements and their process has the capability to meet these requirements during an actual production run at the quoted production rate. Further, the team member may execute a "conduct PQPM risk assessment" sub-activity within the activity 262. In exemplary embodiments, the sub-activity may indicate that the team may establish PPAP requirements for any prototype and/or pre-production and production material which will be supplied as part of the development process. Further, the team may confirm timing for these various PPAP submissions against their Material Requirement Dates (MRD's).

Subsequently, the team member may execute a "submit Part Submission Warrant (PSW) to customers" sub-activity. In exemplary embodiments, the sub-activity may specify that a PSW is delivered to support delivery of material for the customers production trial run (pilot build and/or validation testing) and is accompanied with the PPAP information at the appropriate submission level.

Subsequently, the team member may execute a "production volume readiness" sub-activity. In exemplary embodiments, the sub-activity may specify that the part and/or assembly is ready to support production volume. In one embodiment, the part and/or assembly may be ready once the customers production trial run (pilot build) and subsequent validation testing are completed.

Figure 3:
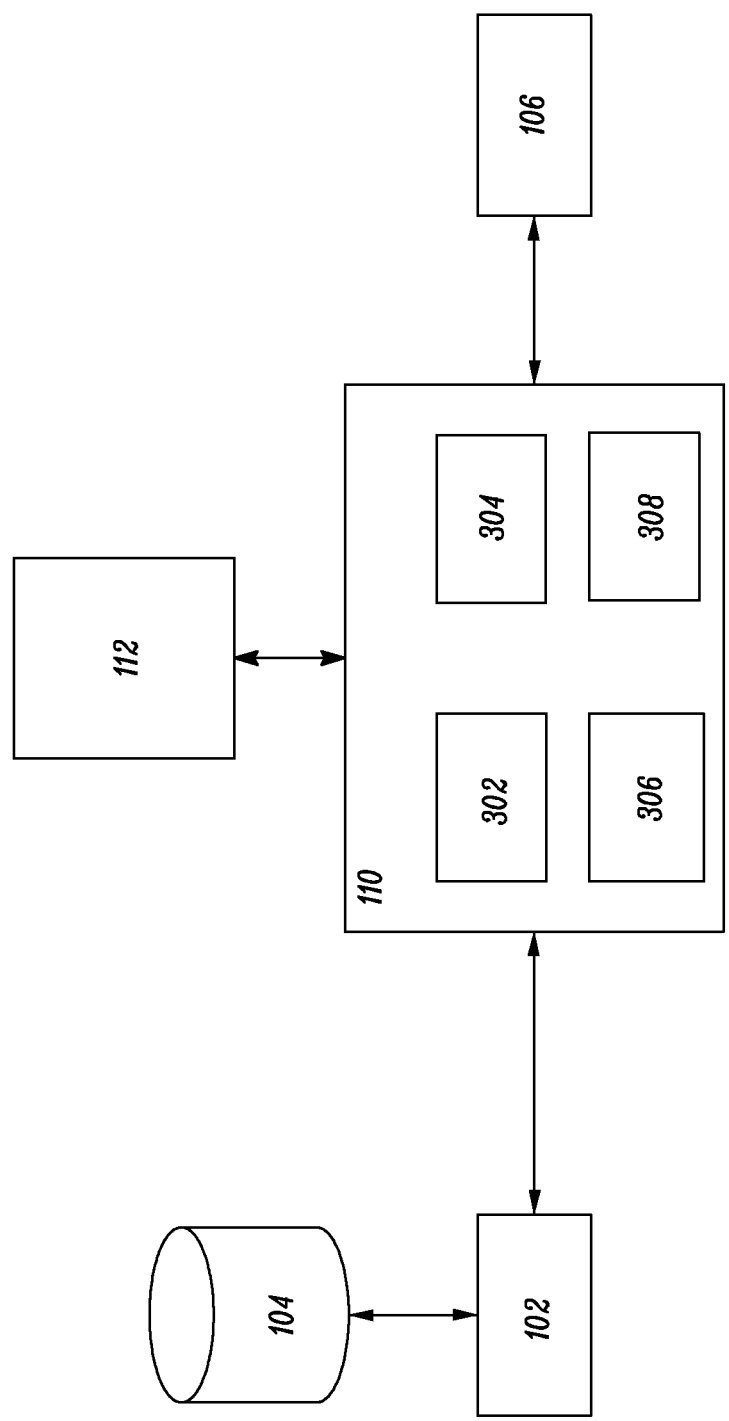
FIG. 3 is an exemplary implementation of the GUI module for facilitating the PQPM project, according to an embodiment of the present disclosure.

Referring to FIG. 3, an exemplary implementation of the GUI module 110 is depicted, according to an embodiment of the disclosure. As illustrated in FIG. 3, the GUI module 110 may be deployed on the server 102 and is communicatively coupled to the repository 104, and the user device 106. In an embodiment, the GUI module 110 may enable a team member to facilitate the PQPM project on the user interface 112. The GUI module 110 may include a display module 302, a receiving module 304, a tracking module 306, and a developing module 308.

Figure 4:
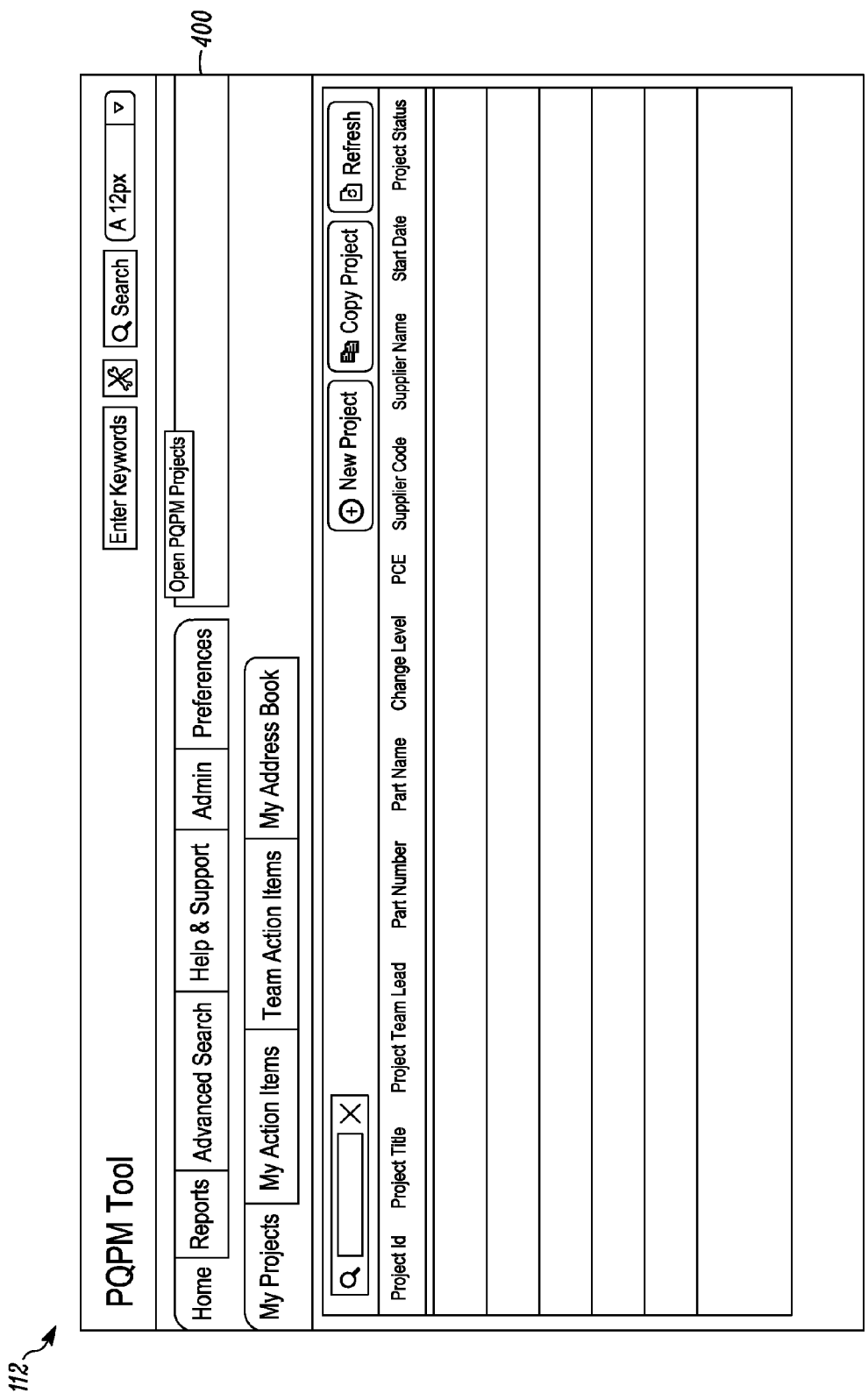
FIG. 4 is an exemplary user interface window for creating a PQPM project, according to an example embodiment of the present disclosure.

In an embodiment, the display module 302 is configured to provide a path on the user interface 112 to create a new PQPM project. In one embodiment, a PQPM project may involve one or more team members for completion of various activities and sub-activities associated with the PQPM project. A team member having valid login credentials may create a new PQPM project. In an embodiment, the team member who creates the PQPM project is by default set as the team leader for the PQPM project. Examples of the team members may include a design engineer, a design team lead, a (New Product introduction) NPI team lead, an NPI engineer, a process control engineer, a quality engineer, a validation engineer etc. As illustrated in FIG. 4, the display module 302 may provide a user interface window 400 to enable the team leader to create a new PQPM project.

Figure 5:
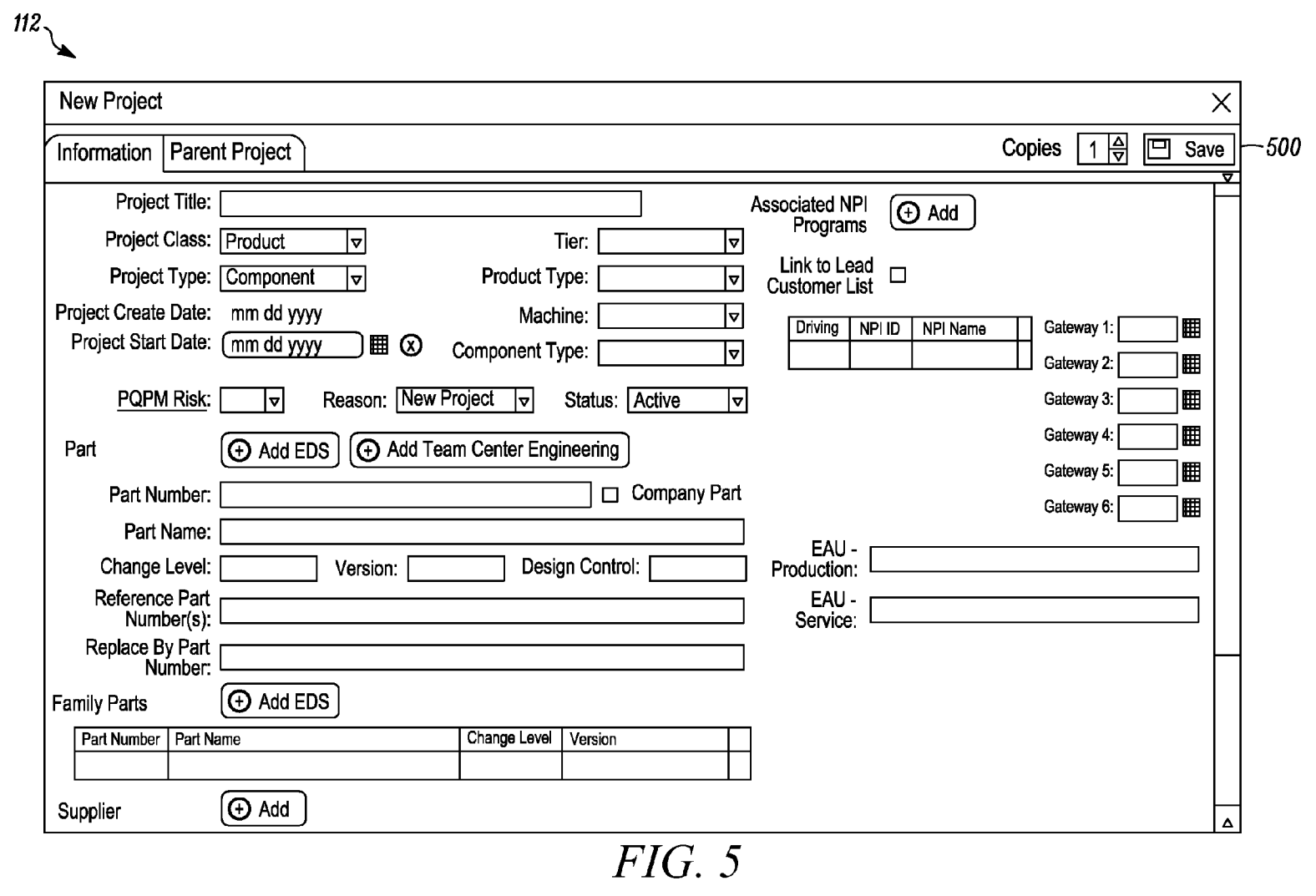

The user interface window 400 may include a "+New Project" tab to facilitate creation of the PQPM project. As illustrated in FIG. 5, the display module 302 may subsequently provide a user interface window 500 for providing information associated with the PQPM project. Further, the receiving module 304 may receive a plurality of required information from the team leader to successfully create the PQPM project. In one embodiment, the required information may include basic key information such as project title, project class, project type, project creation date, start date, etc. Further, the required information may include additional information such as a one or more associated (New product information) NPI programs, Part information, supplier information etc. On successfully receiving the required information from the team leader, the GUI module 110 may assign a PQPM project number to the newly created PQPM project. In one embodiment, the display module 302 may be configured to display a notification message to the team leader if the entered information is stored for a previously existing PQPM project. Subsequently, the GUI module 302 may create a hyperlink to the previously stored PQPM project.

Figure 6:
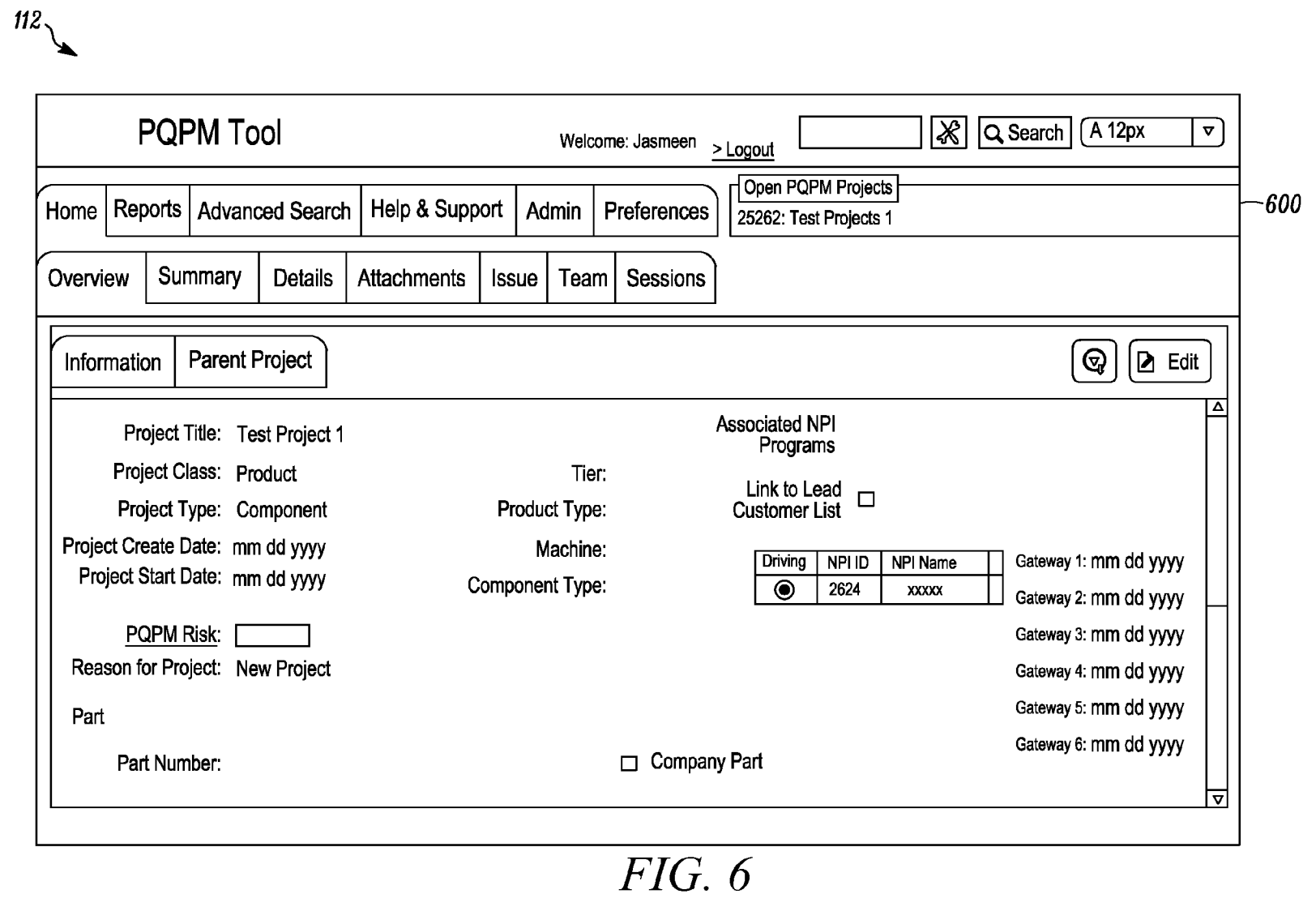

On successful creation of the new PQPM project, the display module 302 may be configured to provide a user interface window 600 under "Information" sub tab, in the "Overview" tab, as illustrated in FIG. 6. The window 600 includes information related to the newly created PQPM project. Further, the information related to the PQPM project may include a PQPM project id, project name, project title, project creation date, project start date etc. Further, the user interface window 600 may include an "Edit" tab to facilitate the team leader to edit the information associated with the PQPM project. Further, on clicking the "Edit" tab in the user interface window 600, the display module 302 may display a user interface window 700 to facilitate the team leader to add additional information associated with the newly created PQPM project. In one embodiment, the additional information may include part information, supplier information, associated NPI project etc.

Subsequently, the receiving module 304 may receive part information associated with the PQPM project, from the team leader. In one embodiment, the team leader may import part information from an (Engineering Data Systems) EDS database by clicking on an "+Add EDS" tab displayed in the user interface window 700. In an alternate embodiment, the team leader may also import part information from a team center engineering database by clicking on an "+Add Team Center Engineering" tab displayed on the user interface window 700. In another embodiment, the team leader may manually enter the part information if the part information is not available in both the EDS database and the team center engineering database. In various embodiments of the disclosure, the databases such as the EDS database, and the team center engineering database may be part of the repository 104 as explained in FIG. 1.

As illustrated in FIG. 8, on clicking the "+Add EDS" tab, the display module 302 may provide an "EDS part Search" user interface window 800 to the team leader for searching and adding the part information related to the PQPM project. For example, the team member may search the part information in the EDS database by clicking on one of a "Part Number Search" and a "Part Name Search" options provided on the user interface window 800. In one embodiment, the GUI module 110 may subsequently extract the relevant part numbers and part names from the EDS database based on the team leader's selection. In one embodiment, the team leader may highlight the desired part information and click on an "OK" button in the user interface window 800. Subsequently, the selected part information is added to the PQPM project.

Figure 9:
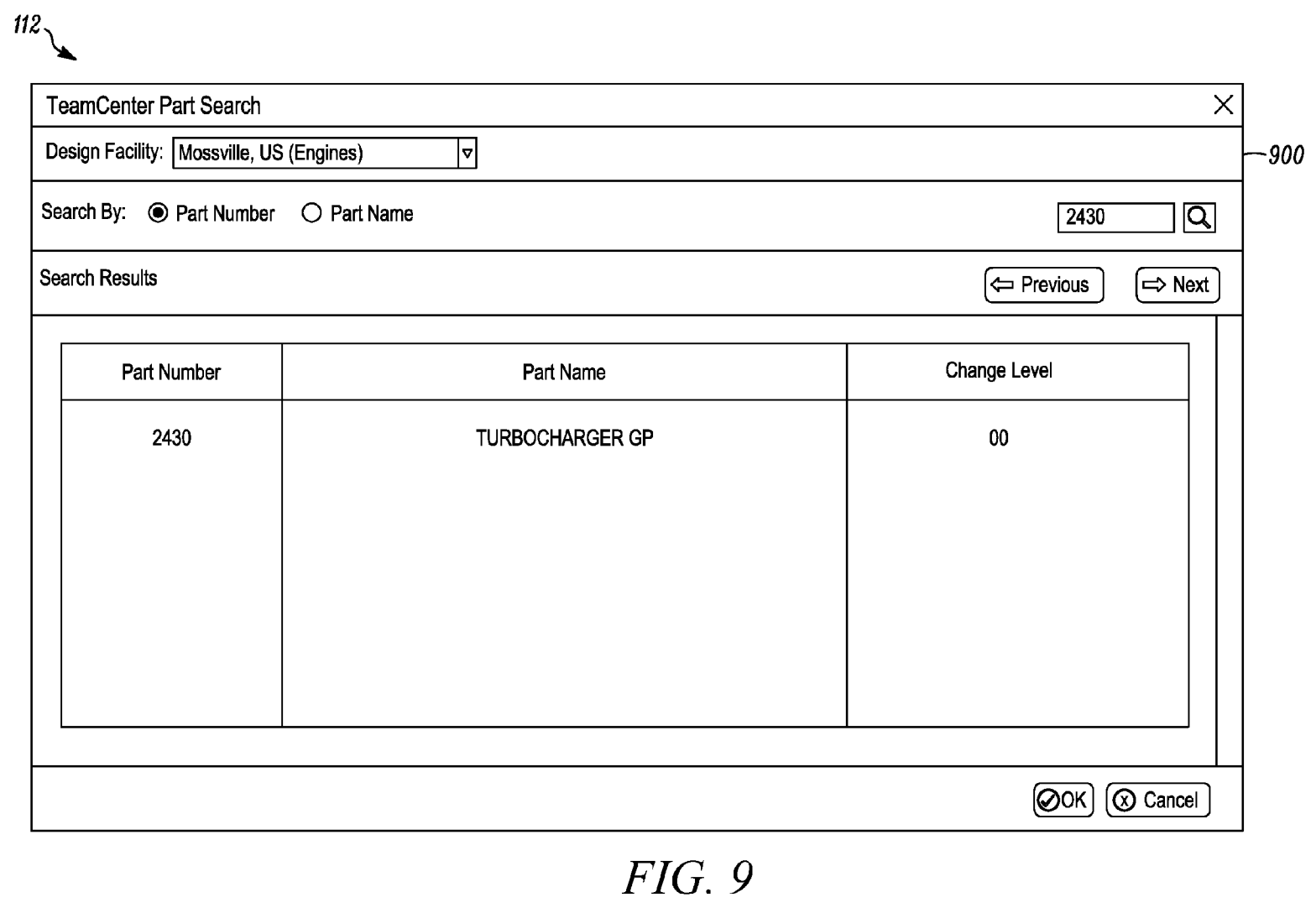

In an alternate embodiment, the team leader may click on the "+Add Team Center Engineering" in the user interface window 700 to import the part information from the team center engineering database. Further, the display module 302 may provide a "Team center Part Search" user interface window 900 for searching the part information from the team center engineering database, as illustrated in FIG. 9. For example, the user interface window 900 may include a "Design Facility" tab, to facilitate the team leader to select a design facility, for importing the part information. Subsequently, the team leader may select the "Part Number Search" or "Part Name search" for searching the desired part information. In a further embodiment, the team leader may enter the part number or a keyword including the desired part name to be searched in the user interface window 900. Subsequently, the GUI module 110 may extract all the relevant part information based on the part number and the part name entered by the team leader. The team leader may subsequently select the desired part information to be added to the PQPM project.

In an embodiment, the display module 302 also provides a path in the user interface 112 for adding supplier information. As will be understood by a person having ordinary skill in the art, a supplier may be an external person or a party for supplying parts to the organization hosting the PQPM project. In one embodiment, a supplier team may be divided into various levels of hierarchy, such as supplier quality contact, supplier design engineer, supplier accounting contact, supplier manager etc.

In one embodiment, the user interface window 700 may include a "+Add" tab adjacent to the supplier information. Subsequent to clicking on the "+Add" tab, the display module 302 may be configured to display a "Supplier Search" user interface window 1000 for facilitating the team leader to add the supplier information to the PQPM project, as illustrated in FIG. 10. In one embodiment, the supplier information may be imported from an external database. For example, the team leader may search supplier information using one of a supplier code or a supplier name. Further, the team leader may enter a desired supplier name or a supplier code in the user interface window 1000. Subsequently, the GUI module 110 may extract and list all the relevant supplier information from the external database. Furthermore, the team leader may select the desired supplier information from the list provided on the user interface window 1000, to add the supplier to the PQPM project.

As illustrated in FIG. 11, the display module 302 may be configured to display a user interface window 1100 to facilitate the team leader to associated New Product Introduction (NPI) programs with the PQPM project. As will be understood by a person having ordinary skill in the art, an NPI program may be defined for an entire product development lifecycle. An NPI program may include various parts and for every part, a new PQPM project may be created. In one embodiment, a PQPM project may be a subset of an NPI program.

In one embodiment, the user interface window 1100 may be accessed by clicking on a "+Add associated NPI programs" tab displayed on the user interface window 700. The NPI database, which may be a part of repository 104 or an external database, may store the NPI program workflow tool, defining the workflow for development of a new product. The display module 302 is further configured to facilitate the team leader to search a related NPI program based on one of an NPI program code and/or an NPI program name. In one embodiment, the team leader may select one of "Program Number" or "Program code" in the user interface window 1100 for searching the NPI programs. Subsequently, the receiving module 304 may receive textual inputs in the form of the Program number, keywords or codes as desired, for searching the relevant NPI programs. Further, the display module 302 may extract and list all the relevant NPI programs available based on the entered keyword or the code. Furthermore, the team leader may select the desired NPI program to be added to the PQPM project. Once the team member clicks on an "OK" tab on the user interface window 1100, the GUI module 110 may add the selected NPI program to the PQPM project.

In one embodiment, on successful addition of the associated NPI program, the GUI module 110 may be configured to automatically extract relevant corresponding gateway dates to be associated with the PQPM project and its activities and sub-activities. For example, the gateway dates may be in a standard MM-DD-YYYY format. In one embodiment, the gateways may be the predefined process milestones and phases to be completed during the entire product development lifecycle. For example, the entire product development lifecycle in an NPI program workflow may be divided into 8 phases. The phases may be strategy, Concept define, Concept measure, Concept Explore, develop design, develop verify, Pilot, and a production phase. In one embodiment, every phase in the NPI workflow may include one or more activities and sub-activities to be executed in that phase. In a further embodiment, at the end of every phase, a gateway review may be conducted by an NPI team, to assess whether an acceptable level of progress has been achieved in that phase. Therefore, the gateway dates may be understood as the target dates for completing the phase and the corresponding gateway review.

Figure 12:
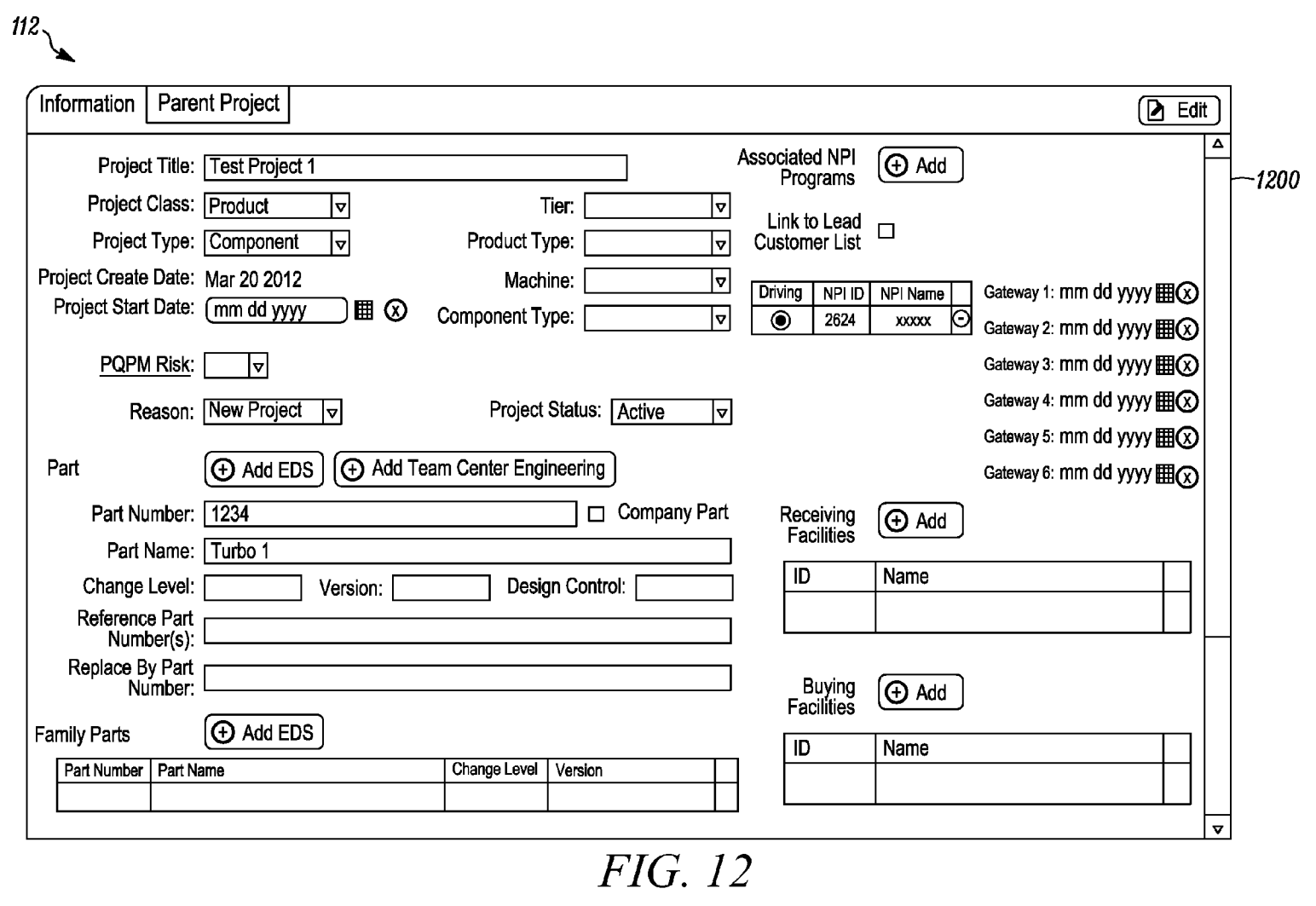

In one embodiment, the display module 302 is further configured to provide a path on the user interface window 700 to view and add relevant gateway dates for the various parts associated with the selected NPI program. For example, once the team leader selects the relevant NPI program from the list of NPI programs presented on the user interface window, the display module 302 may further display all the gateway dates associated with the selected NPI program on a user interface window 1200, as illustrated in FIG. 12. In one embodiment, the gateway dates may be populated for the selected NPI program, and subsequently be selected as the required program dates for the PQPM project. In one embodiment, the gateway dates may also be stored in the NPI database.

In an embodiment, the display module 302 may be configured to facilitate the team leader and/or an administrator for manual editing of the previously stored gateway dates associated with the PQPM project. However, it will be appreciated, that once the previously associated gateway dates are modified, the corresponding previously associated NPI project may be delinked from the PQPM project automatically by the GUI module 110. Furthermore, at the time of subsequent login by the team leader, the display module 302 may display a notification message for the changed gateway dates. In another embodiment, the team leader may also sync the gateway dates with the associated NPI program gateway dates. The display module 302 may be configured to facilitate the team leader and/or the administrator to view an entire history of the changes made to the gateway dates of the PQPM project.

Further, the team leader may select more than one NPI programs to be added to the PQPM project. For example, a single part for which the PQPM may be conducted, may be a part of more than one product, therefore, there may be more than one NPI programs to be associated with the PQPM project. Subsequently, the display module 302 may be configured to facilitate the team leader to select one of the associated NPI projects for selecting the relevant gateway dates for the PQPM project. In an embodiment, the system 100 may automatically select the date of the earliest NPI program for selecting the relevant gateway dates for the PQPM project. Further, the display module 302 is configured to facilitate addition of one or more NPI projects at any later stage of the PQPM project. It will be understood by a person having ordinary skill in the art, that if the gateway dates of the newly added NPI project are earlier than the previously added NPI project, then the system may notify the team leader to change the gateway dates of the PQPM project according to the gateway dates of the newly added NPI program. Once the team leader confirms, the system may update the gateway dates of the PQPM project accordingly. However, the team leader may also reject the changes in the gateway dates based on the newly added NPI programs and retain the gateway dates associated with the previously associated NPI program.

Figure 13:
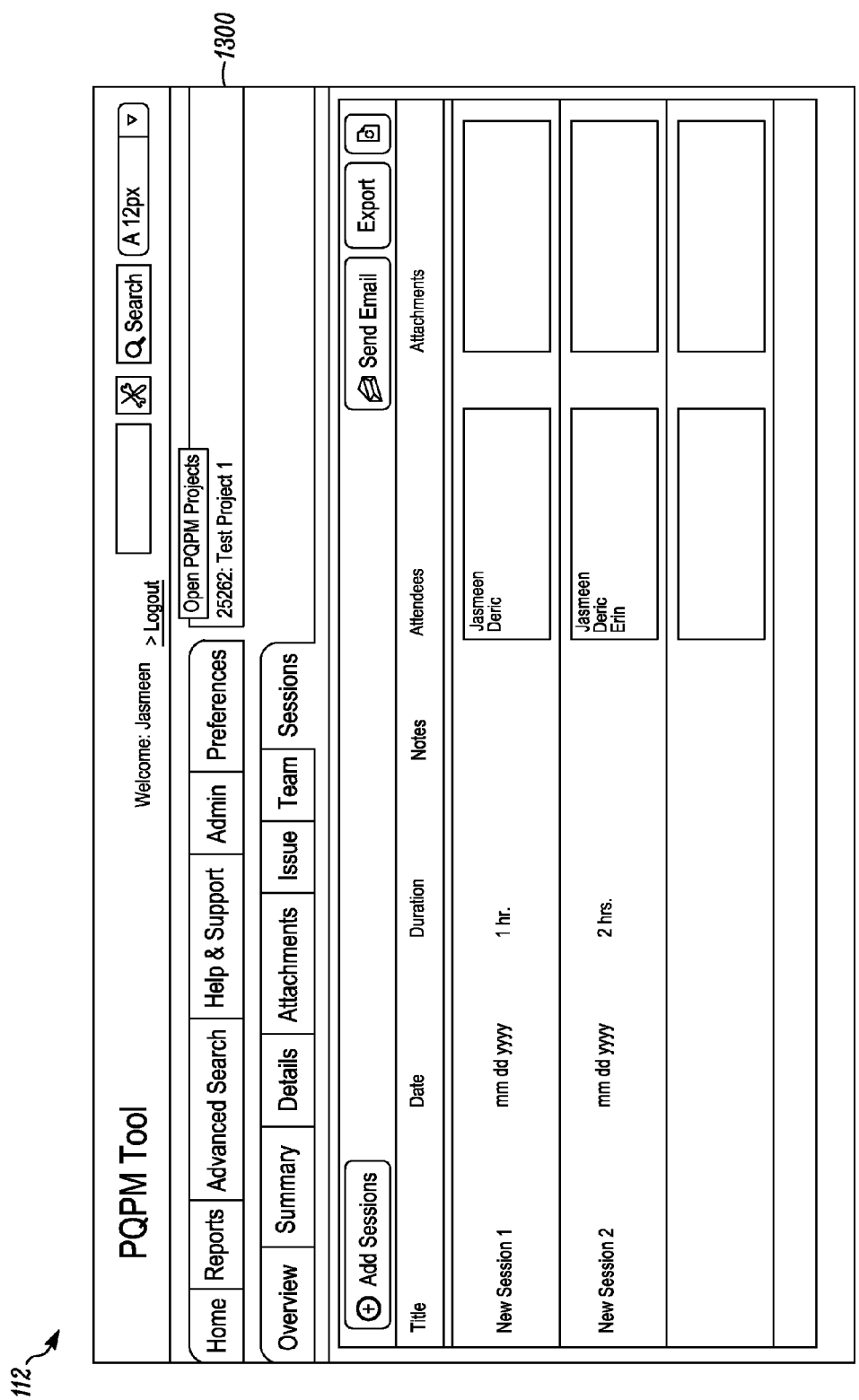
FIG. 13 is an exemplary user interface window for adding a session associated with the PQPM project, according to an example embodiment of the present disclosure.

Once the entire PQPM project is created, the GUI module 110 may provide a path to create an initial session associated with the PQPM project. For example, the initial session may not have any attendees, and may be of zero hour duration. In one embodiment, the display module 302 is further configured to facilitate the team leader in adding a session at any later stage of the PQPM project. For example, the user interface window 600 may include a "Sessions" tab to facilitate the team leader in adding or removing a one or more sessions to the PQPM project. Subsequent to clicking the "Sessions" tab, the display module 110 may be configured to display a session user interface window 1300, as illustrated in FIG. 13. In one embodiment, the team leader may click on a "+Add Session" tab to enable the receiving module 304 to receive textual inputs from the team leader, for the information associated with the session. For example, the information may include a session title, session date, attendees, duration of the session, minutes of the meeting document etc. In one embodiment, the attendees may be selected from a list of team members displayed to the team leader on the user interface 112. In an alternate embodiment, if an attendee is not included in the list of the team members, then the team leader may add notes to the session to indicate the name of the attendee.

Once the PQPM project is created successfully, the display module 302 is configured to facilitate a team leader, and/or a project administrator to view a "Summary" tab on the user interface window 1400 to view the various activities and sub-activities associated with the PQPM project. In one embodiment, the "Summary" tab on the user interface window 1400 may include the project id, project title, team leader, the PQPM activities to be executed, the relevant NPI gateways along with the gateway dates, gateway scores, total gateway scores, percentage gateway scores etc. As will be understood, the gateway scores may indicate the execution status of the PQPM activities and sub-activities. In an embodiment, the team member may select to view either both the activities and the sub-activities in the "Summary" tab or only the activities by collapsing the sub-activities under the corresponding activities, as illustrated in a user interface window 1500 of FIG. 15.

Figure 14:
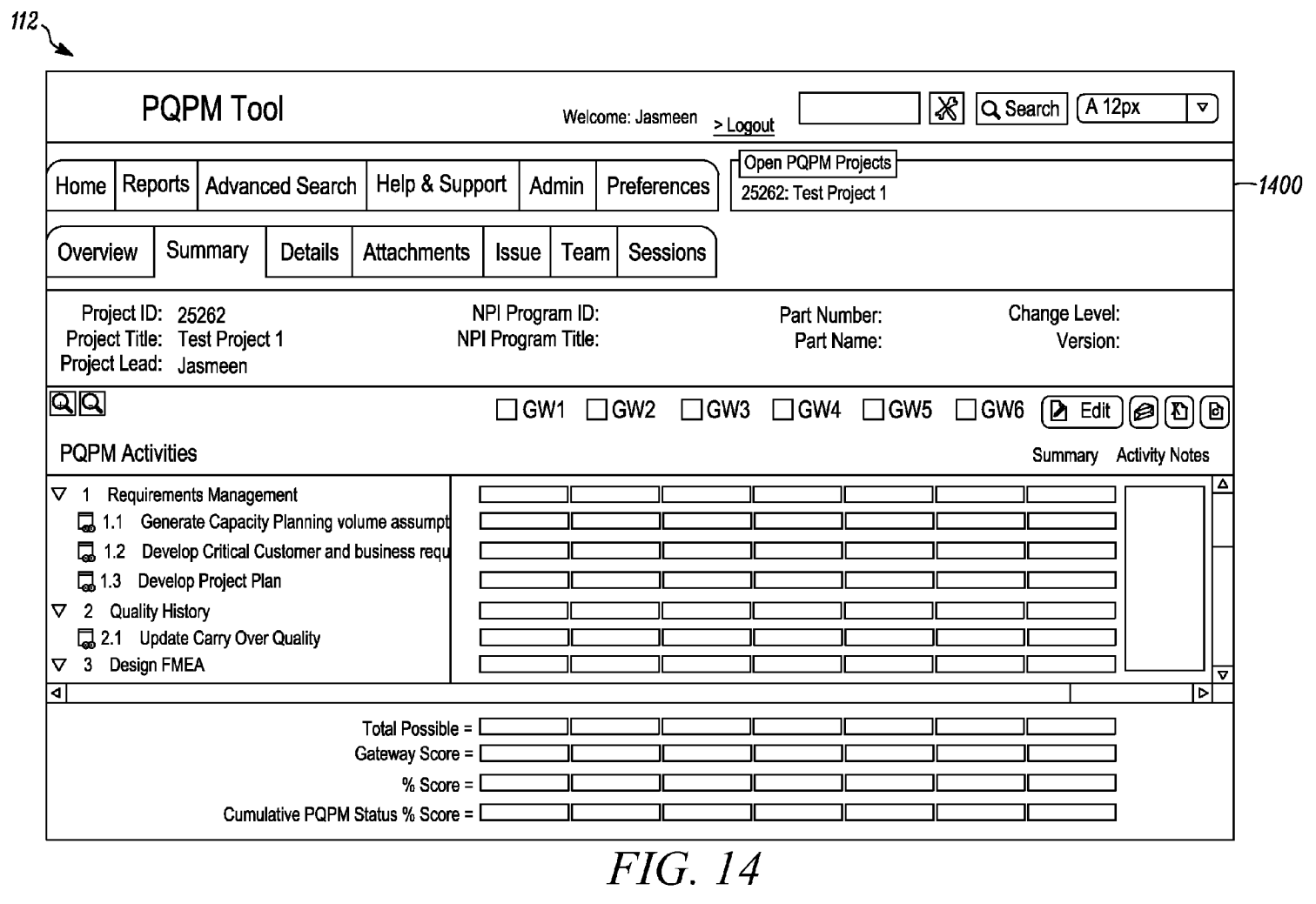

In an embodiment, as illustrated in FIGS. 14 and 15, only the gateways relevant to the activities and the corresponding sub-activities may be accessible on the summary page and rest of the gateways are non-accessible. Also, gateways for a particular activity may be based on the gateways associated with sub-activities within the activity. For example, for activity 3, the display module 302 may be configured to highlight all the gateways associated with the sub-activities within the activity 3 in the "Summary" page. In one embodiment, the activity 3 may include sub-activity 3.1, sub-activity 3.2, sub-activity 3.3 and sub-activity 3.4. Further, sub-activity 3.1 may be associated with gateway 2, sub-activity 3.2 may be associated with gateway 3, sub-activity 3.3 may be associated with gateway 4, and sub-activity 3.4 may be associated with gateway 5. Therefore, in the user interface window 1500, the gateways 2, 3, 4 and 5 may all be highlighted for the activity 3.

Further, the display module 302 may provide a path to the team leader through the user interface window 600 for adding various team member, assigning sub-activities to the team members and related information to the PQPM project. In one exemplary embodiment, team member information may be stored in a global directory of the organization that may include all the information about each employee of the organization across the globe. However, in an alternate embodiment, the team leader may search the team member from an address book associated with the team leader.

Figure 16:
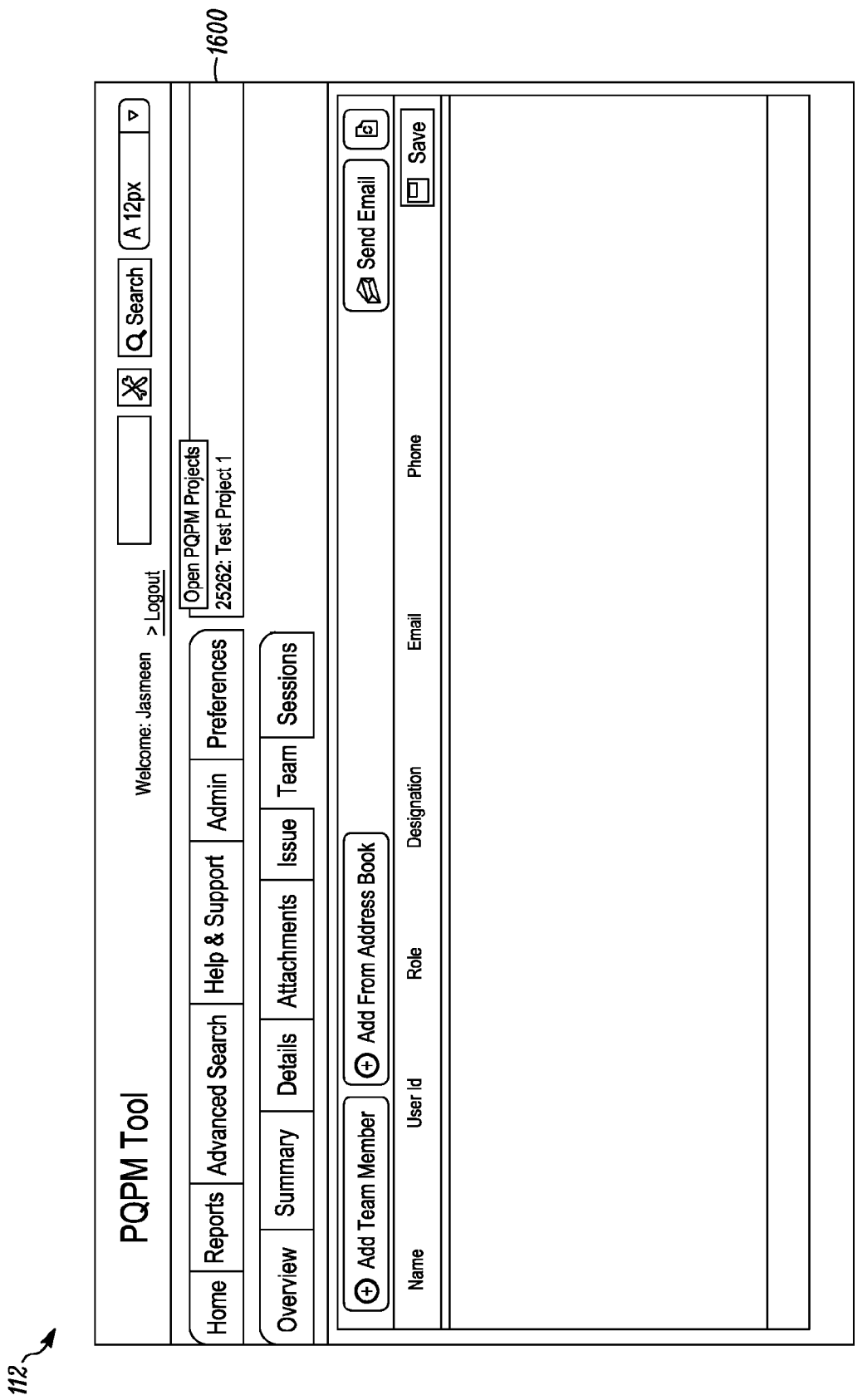
FIG. 16 is an exemplary user interface window for adding a team member to the PQPM project, according to an example embodiment of the present disclosure.

In an exemplary embodiment, the team leader may click on a "+Add Team Member" tab under the "Team" tab displayed on the user interface window 600 to search team members to be added to the PQPM project. Subsequently, as illustrated in FIG. 16, the display module 302 may be configured to display a user interface window 1600 for adding the team member from either the global directory or the address book of the team leader. In one embodiment, the team leader may click on the "+Add team member" tab to search team members from the global directory of the organization. In a further embodiment, the display module 302 may be configured to display a "Search Team Members" user interface window 1700 for adding the team member to the PQPM project, as illustrated in FIG. 17. The user interface window 1700 may include a plurality of options for searching the team members in the directory. For example, the user interface window 1700 may facilitate the team leader to search the team members by names, or employee ids, or login ids etc. As illustrated in FIG. 17 the receiving module 304 may receive the keywords from the team leader for searching the team members. In one embodiment, the display module 302 may subsequently display a list of all the relevant team members, on the user interface window 1700, based on the search keywords. Subsequently, the team leader may select the desired team member to be added to the PQPM project. The display module 302 may display the selected team member's information in the "Team" tab of the PQPM project.

In an alternate embodiment, the team leader may search his/her address book for adding a team member to the PQPM project. For example, the team leader may click on "+Add From Address Book" tab under the "Team" tab, as illustrated in FIG. 16. In an embodiment, the display module 302 may be configured to provide a path to the team leader on the user interface window 1600, for searching and adding a team member to the PQPM project from the address book. Further, the display module 302 may provide the user interface window 1600 including the address book of the team leader. Subsequently, the team leader may select the desired team member to be added to the PQPM project.

Subsequently, as illustrated in FIG. 18, the display module 302 facilitates the team leader through a user interface window 1800 in assigning one or more desired sub-activities to the team members associated with the PQPM project. As will be understood by a person skilled in the art, only a team leader may assign a role along with the sub-activities to a team member in the PQPM project. For example, the user interface may facilitate the team leader to select a desired team member in the "Team" tab and subsequently select the desired sub-activities, from a list of sub-activities displayed on the user interface, to be assigned to the team member. In one embodiment, the team leader may select more than one sub-activities presented on the user interface window 1800 to be assigned to the selected team member, as shown in FIG. 18. In one embodiment, the team leader may assign role based access to the various team member associated with the PQPM project. In a further embodiment, the team leader may change the team member's role and the assigned sub-activities at any time during the PQPM project. In an embodiment, the team member is provided a role based access control in the PQPM project.

Further, the team leader may also delete a team member from the PQPM project. In one embodiment, the display module 302 may display a notification to the team leader, if a team member has been assigned any sub-activities, before the team leader deletes the team member from the PQPM project.

Figure 19:
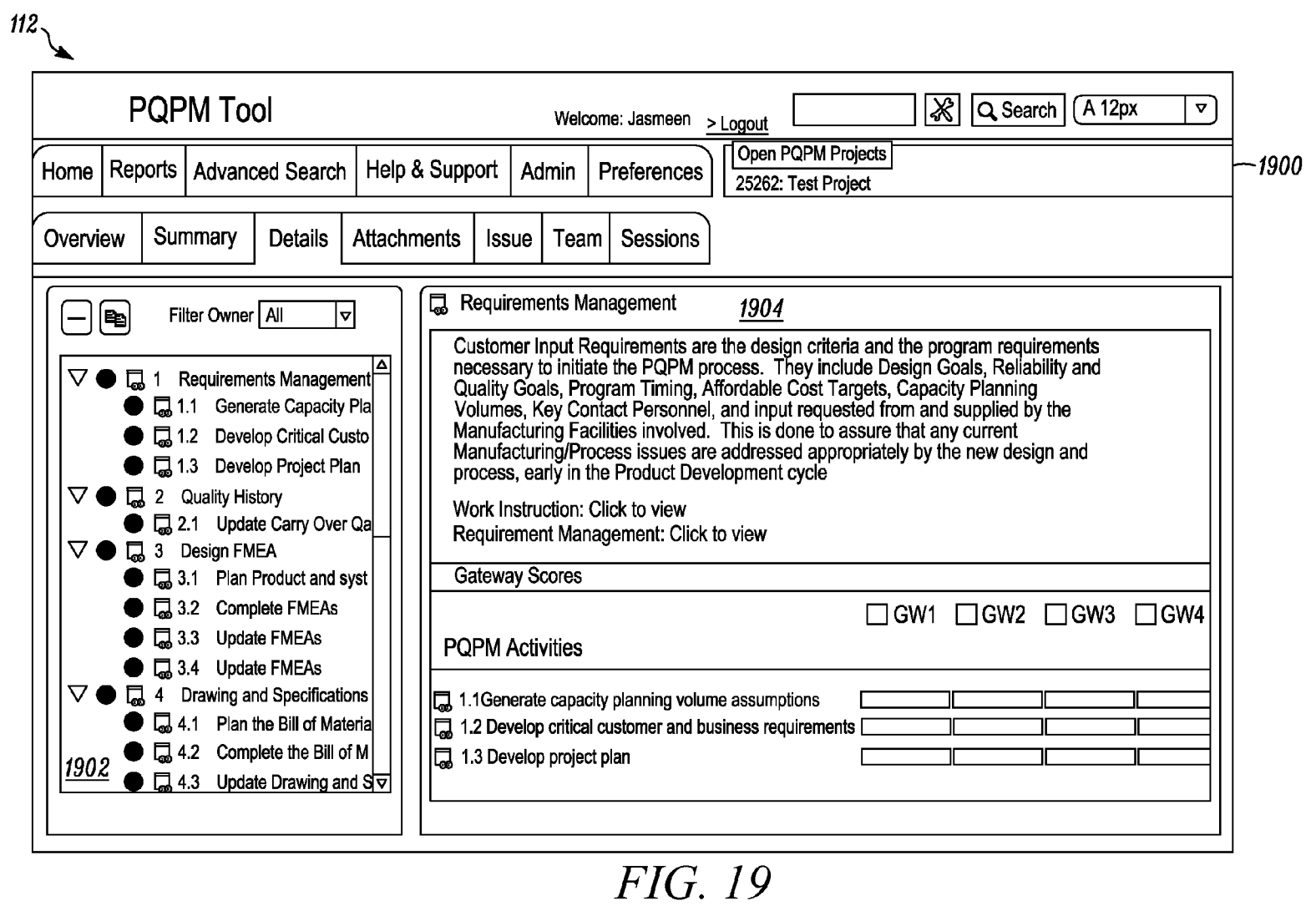

As illustrated in FIG. 19, the display module 302 may be configured to facilitate the team member to view and edit the detailed information associated with every activity and sub-activity of the PQPM project. For example, the team leader may click on a "Details" tab on the user interface window 600, to view the detailed information associated with the activities and the sub-activities associated with the PQPM project. As illustrated in FIG. 19, the "Details" tab may include a first navigation panel 1902 listing the activities and the associated sub-activities. In one embodiment, the activities and the corresponding sub-activities may be arranged in a tree structure organization in the first navigation panel 1902. In one embodiment, a team member may click on a desired activity to view an information page 1904 associated with the activity. For example, the information related to the activity may include but not limited to, the definition of the activity, the associated sub-activities, the associated gateways with the sub-activities, and the status of the sub-activities. Additionally, the team member may also add notes related to the activity for future references.

Figure 20:
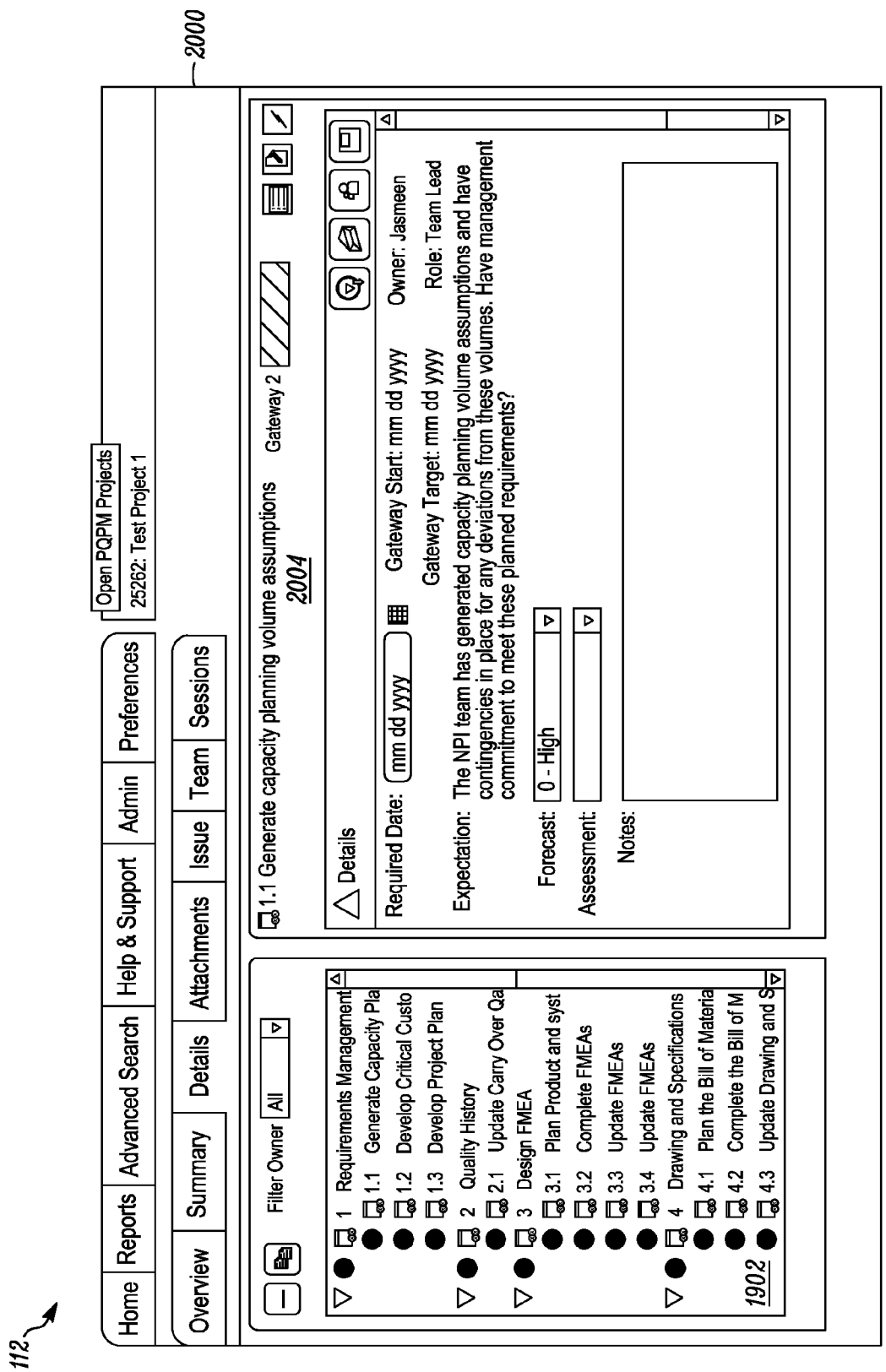

Further, the display module 302 is configured to facilitate the team member in viewing the details associated with each sub-activity within the activities. In one embodiment, the user interface window 1900 may enable the team member to view the details associated with the sub-activity by double clicking on the sub-activity in the tree structure displayed on the first navigation panel 1902. In a further embodiment, the display module 302 is configured to provide a path for viewing the detailed information associated with the sub-activities on a user interface window 2000, as illustrated in FIG. 20. In one embodiment, the user interface window 2000 may include an information page 2004 associated with the selected sub-activity. For example, the information page 2004 may include a plurality of pre-defined information associated with the sub-activity, such as an associated gateway, the required date, gateway start date, gateway target date, the team member responsible for performing the activity, etc.

Further, the user interface window 2000 may enable the receiving module 304 to receive the measurement criterion associated with an execution status of the sub-activities corresponding to the activities. The measurement criterion is based on a forecast execution and an assessment of reaching an expectation associated with the sub-activities. Further, the measurement criterion for the forecasted execution is based on first pre-determined scoring rates. The first pre-determined scoring rates is further based on a probability of meeting a specified target date, a specified quality level and a cost expectation associated with the sub-activity. Similarly, the measurement criterion for the assessment is based on second pre-determined scoring rates. However, the receiving module 304 may only receive the measurement criterion for the assessment only if the forecasted execution is marked as completed.

In an embodiment, the associated gateway may have a gateway indicator visually representing the measurement criterion or an execution status of the sub-activity. The gateway indicator is based at least on either the first pre-determined scoring rate associated with the forecasted execution or the second pre-determined scoring rate associated with the assessment. In an exemplary embodiment, the gateway indicator may be visually represented using color coding, number coding, letter coding, hatch patterns, alphanumeric coding or a combination thereof.

In one embodiment, the receiving module 304 may be configured to receive the forecast value from the team member, based on a forecasted execution status of the sub-activity. As illustrated in FIG. 20, the display module 302 is configured to display a "Forecast" dropdown tab on the user interface window 2000, to facilitate the team member in selecting a desired forecast value for the sub-activity, based on the first pre-determined scoring rates. At the time of creation of the PQPM project, the forecast value is not marked. Subsequently, the team member may update the value of the forecast, based on the forecasted execution of the sub-activity. For example, if the sub-activity is not to be considered for forecast, then the team member may mark "N/A" in the "Forecast" dropdown tab. In a further example, the team member may mark "0" in the "Forecast" tab, if the sub-activity cannot meet the specified target dates, the specified quality level and cost expectations.

Subsequently, as illustrated in FIG. 20, the display module 302 may be configured to update the gateway indicator, such as with a red color or a first hatch pattern, for "0" forecast value. The red color or the first hatch pattern may indicate a high risk associated with the sub-activity and that an immediate program management action needs to be implemented.

Figure 21:
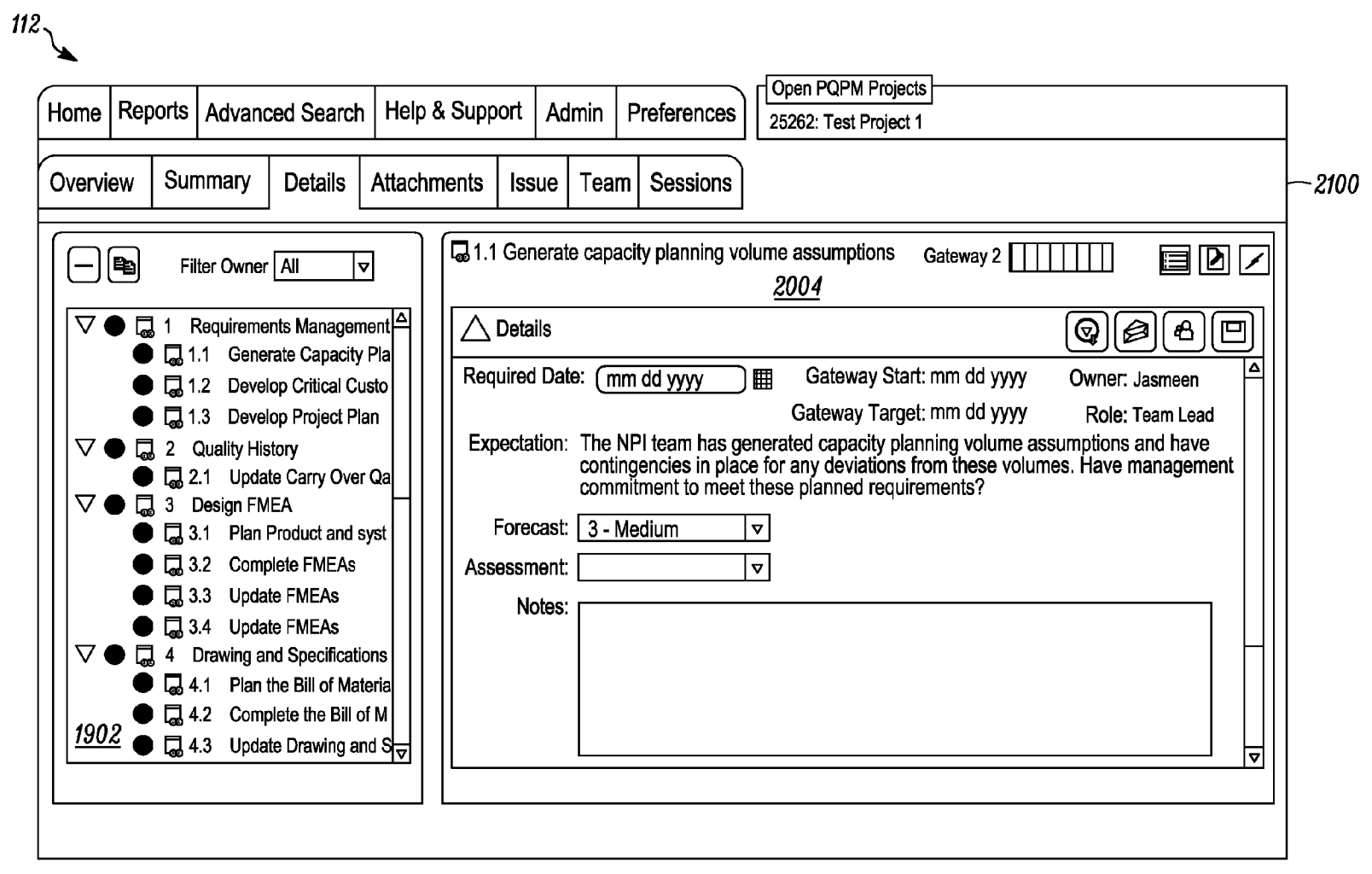
Figure 22:
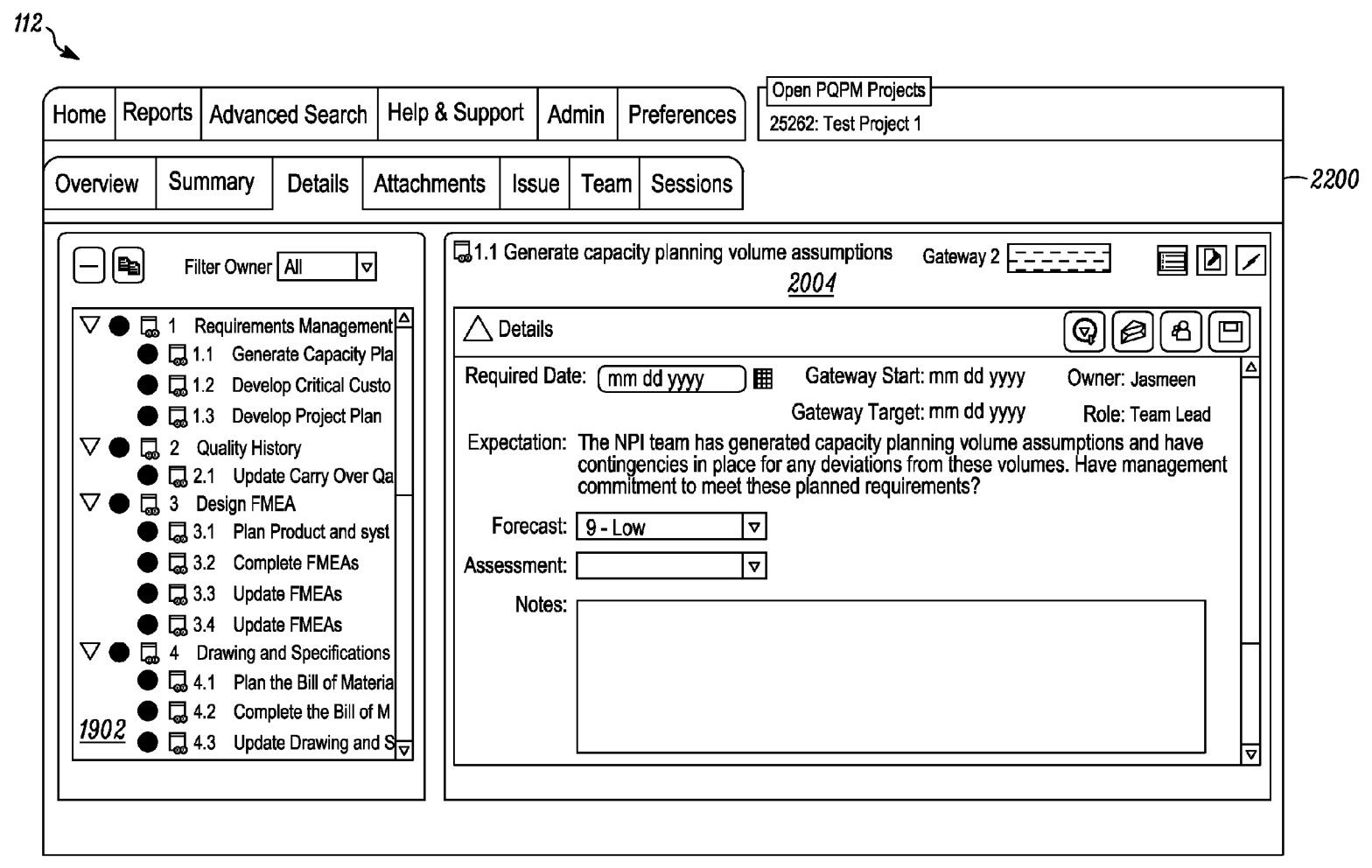

In another exemplary embodiment, the team member may mark the "Forecast" tab as "3", if there is a possibility that the planned sub-activity may not meet the target dates, the specified quality level and cost expectations. Further, as illustrated in FIG. 21, the display module 302 may be configured to update the gateway indicator, such as with yellow color or a second hatch pattern. The yellow color or the second hatch pattern may indicate a medium risk associated with the sub-activity, and that a program management monitoring is required for the sub-activity. In a further embodiment, the team member may mark the "Forecast" tab as "9", if the planned activity will most probably meet the target dates, the specified quality levels as well as the cost expectations. Subsequently, as illustrated in FIG. 22, the display module 302 may be configured to update the gateway indicator, such as with green color or a third hatch pattern, to indicate a low risk associated with the sub-activity.

Figure 23:
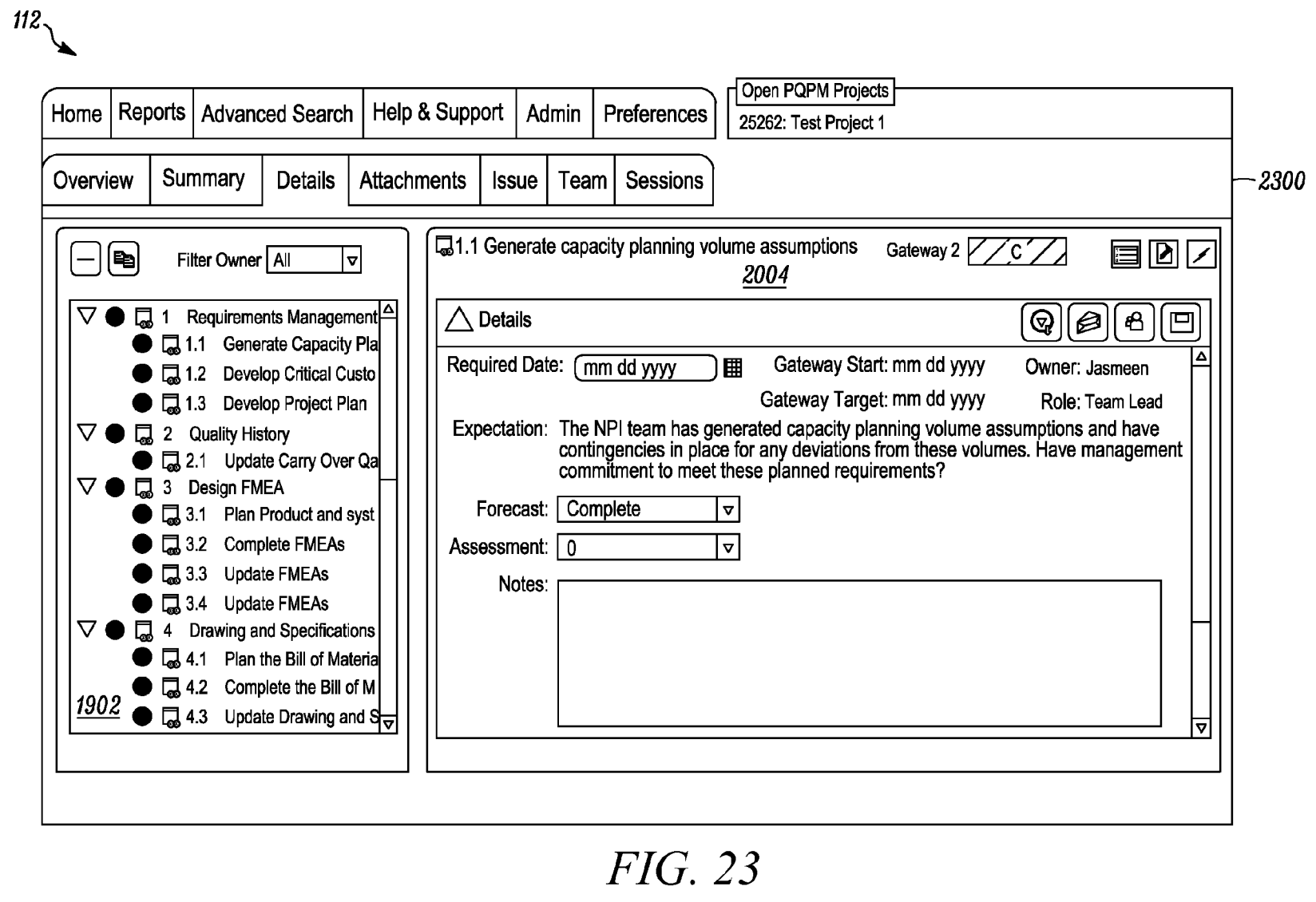

In another embodiment, the team member may mark the "Forecast" tab as "Complete", if the execution of the sub-activity is completed. Once the "Forecast" tab is marked complete, then the team member may provide the assessment of the sub-activity. In one embodiment, the display module 302 may be configured to enable the team member to provide assessment of the sub-activity through a user interface window 2300, as illustrated in FIG. 23. For example, an "Assessment" dropdown tab is enabled for editing, to further facilitate the team member to enter the assessment value for the sub-activity.

In one embodiment, if a detailed profile or a substantial amount of profile information for the finished product is not available for team reference, then the team member may mark the "Assessment" tab as "0". Subsequently, as illustrated in FIG. 23, the display module 302 may update the gateway indicator with a red color or the first hatch pattern along with a "C" mark. The "C" mark may indicate that the sub-activity is completed, however, the red color may indicate that the detailed volume profile of the sub-activity is not available for team reference.

Figure 24:
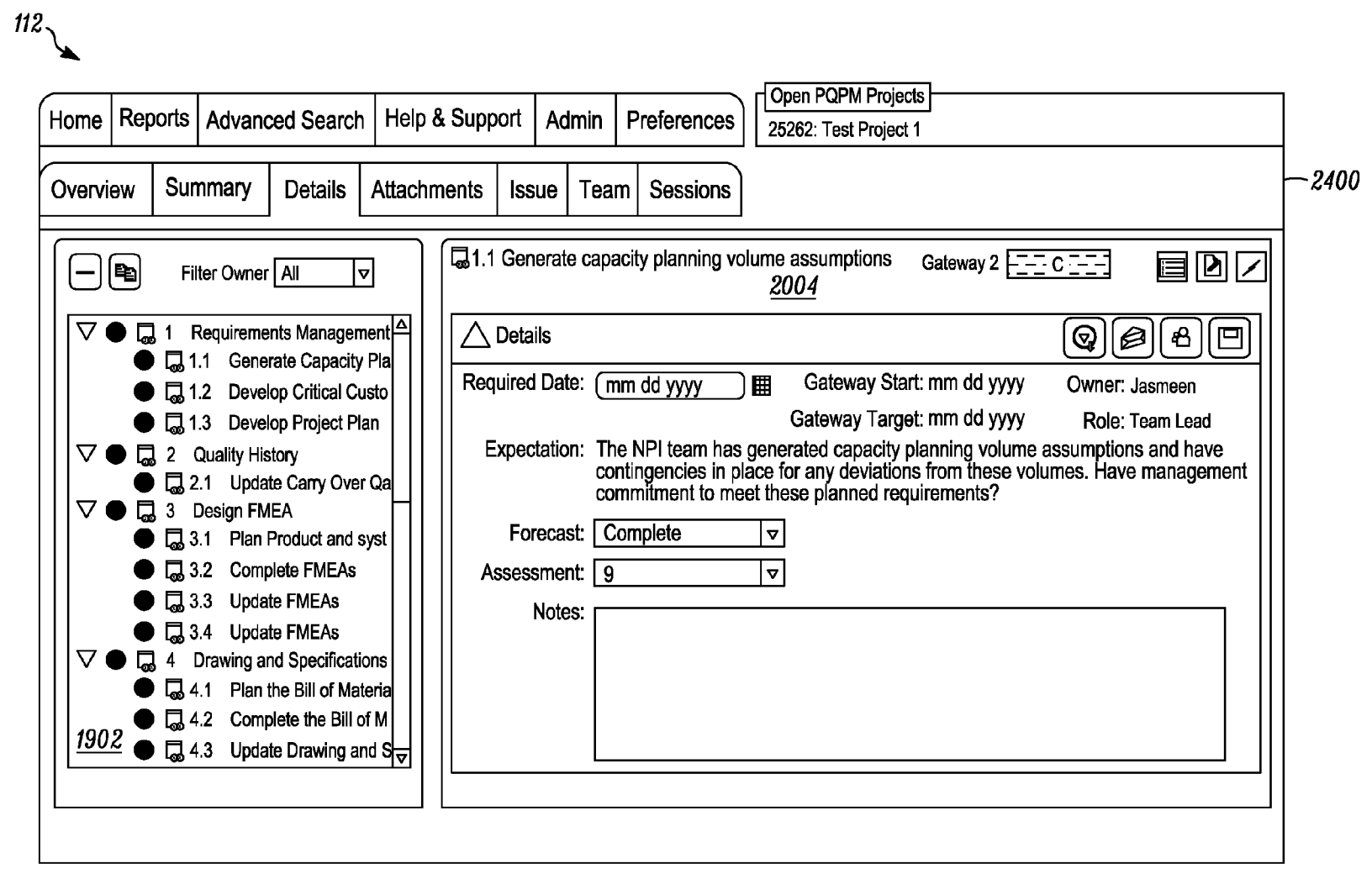

In another embodiment, the team member may mark the "Assessment" tab as "9", if the detailed volume profile and the maximum capacity planning volume for the finished product is available for team reference. Subsequently, as illustrated in FIG. 24, the display module 302 may update the gateway indicator with a green color or the third hatch pattern along with the "C" mark. As will be understood by a person having ordinary skill in the art, the "C" mark may indicate that the sub-activity is completed, and the green color or the third hatch pattern may indicate that the detailed volume profile of the finished product is available for team reference. In one embodiment, the display module 302 may be configured to display an entire history of changes made to the gateway indicators for every sub-activity within the PQPM project.

In a further embodiment, the display module 302 may be configured to update the information page 2004 in the user interface 112 to display the assessment information available for the selected assessment value for each sub-activity in the PQPM project. For example, the assessment information may be based on the predefined expectations of the sub-activity, as well as the assessment value entered by the team member. As will be understood by a person having ordinary skill in the art, the assessment information may be varied based on the associated sub-activity, the associated assessment value and the associated expectations with the sub-activity. In a further embodiment, the assessment information for every sub-activity may be stored in the repository 104, accessible by the entire PQPM team.

In a further embodiment, the team leader may add team member to individual sub-activities. In one embodiment, the display module 302 may provide a path on the user interface 112, through the "Details" tab, for adding team members individually to every sub-activity. For example, the information page 2004 within the user interface window 2000 includes an "Assign User" tab for adding a team member to the sub-activity. Once the team leader clicks on the "Assign user" tab, the display module 302 may subsequently display a list of available team members for the PQPM project. In one embodiment, the display module 302 may display the address book associated with the team leader. In an alternate embodiment, the display module 302 may display the global directory of the employees within the organization. Subsequently, the team leader may select the desired team member to be assigned to the sub-activity.

Figure 25:
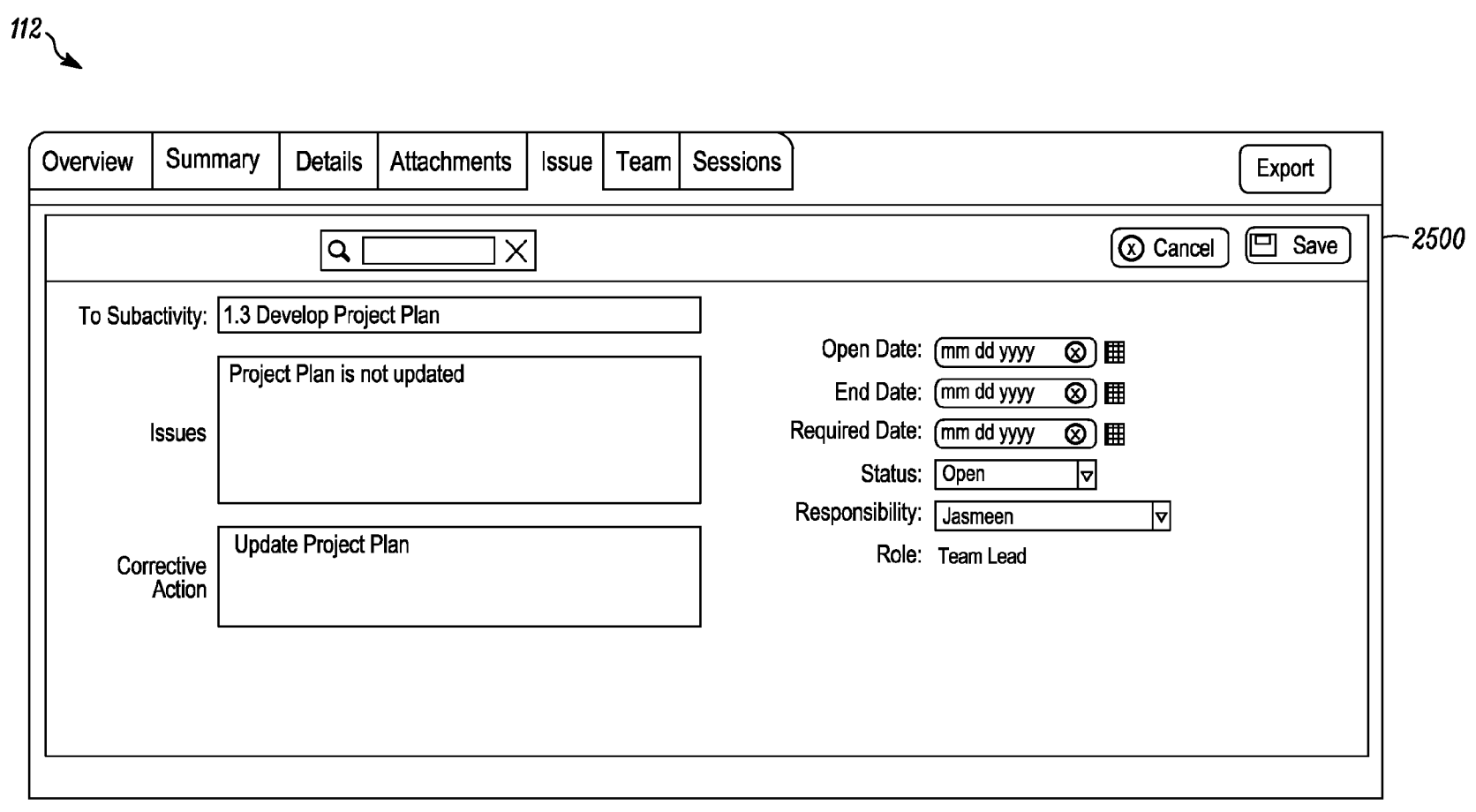

Further, for every incomplete sub-activity, the team member may add one or more issues related to the execution of the sub-activity. In one embodiment, the information page 2004 may include a "+Add issue" tab, to facilitate the team member to add issues related to the execution of the sub-activity. Subsequently, the receiving module 304 may receive information related to the issue to be added to the sub-activity. In one embodiment, the information related to the issue may include an issue description for red or yellow gateway indicators, corrective actions and resolution plans, timing of the issue and the responsible team member for resolving the issue. Subsequently, on clicking an "OK" button, the issue may be added to the sub-activity. In an alternate embodiment, the team member may add an issue to a sub-activity by clicking on an "Issue" tab on the home page displayed on the user interface 400, as illustrated in FIG. 4. Subsequently, the display module 302 may enable the team member to add issue through a user interface window 2500, as illustrated in FIG. 25. Subsequently, the receiving module 304 may receive textual inputs from the team member, for one or more information related to the issue. In a one embodiment, the team member may select the sub-activity from a drop-down tab as displayed on the user interface window 2500. In one embodiment, the team member may enter additional information related to the issue, such as open date of the issue, end date of the issue, required date, status of the issue, responsible team member and the role of the team member. Further, as the team member clicks on the "SAVE" button, the display module 302 adds the issue to the sub-activity. As will be understood by a person ordinarily skilled in the art, the team member may edit or delete the issue at any stage of the PQPM project. Further, the GUI module 110 may be configured to facilitate the team member to export all the issues associated with the PQPM project to an excel file. In one embodiment, the user interface window 2500 may include an "Export" tab, to enable a team member to export the issues to an excel file.

Further, the display module 302 may be configured to provide a path to the team member, through a user interface window 2600, for adding an attachment related to the sub-activity, as illustrated in FIG. 26. Further, the display module 302 may enable the team member to link the attachments to one or more sub-activities. For example, the team member may attach an instruction file to execute a sub-activity. Further, the user interface 2600 may include a "+Add attachment" tab for adding an attachment. Further, the team member may click on a "Browse" button to browse the local system of the team member for uploading the attachment to the PQPM project.

Once the attachment is added to the PQPM project in the "Attachment" tab, then subsequently, the team member may link the uploaded attachment to one or more sub-activities. For example, the team member may click on the sub-activity in the first navigation panel 1902 on the "Details" tab, as illustrated in FIG. 19. Subsequently, the information page 2004 may include a "Link Attachment" tab, to facilitate linking of one of the attachments to the sub-activity. Further, the display module 302 may link the selected attachment to the sub-activity. As will be understood by a person ordinarily skilled in the art, the attachments may be edited or deleted by the team member at any stage during the PQPM project.

Figure 27:
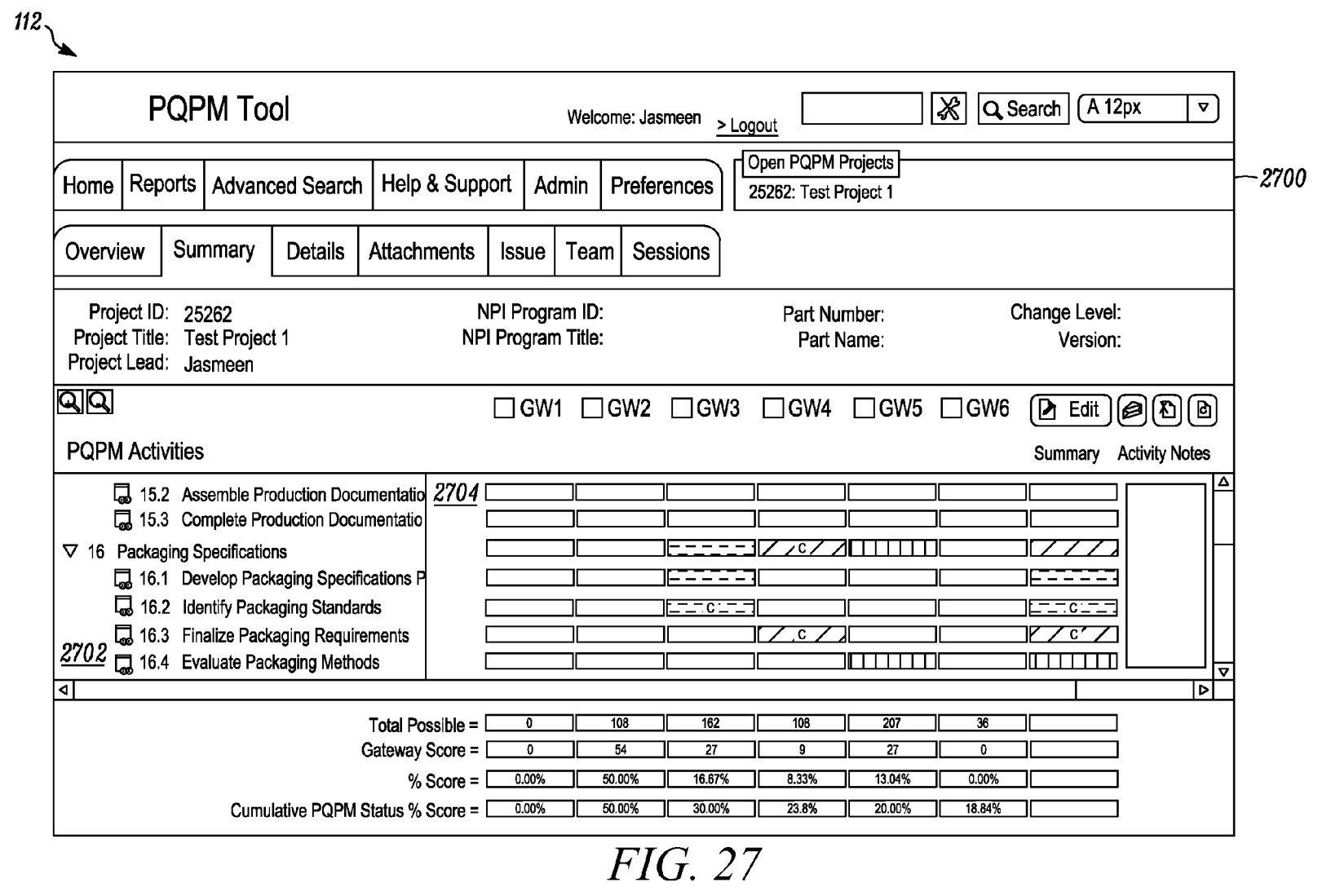

In an embodiment, the display module 302 may be further configured to update the "Summary" tab on the user interface window 2700, as illustrated in FIG. 27, based on the received textual inputs for measurement criterion associated with the execution status of sub-activities. For example, the "Summary" tab may include the gateway indicators as illustrated in the "Details" tab of the PQPM project. In an exemplary embodiment, the PQPM activities and sub-activities may be displayed in a first navigation panel 2702 on the user interface window 2700 as illustrated in FIG. 27. In an exemplary embodiment, the display module 302 may be configured to display the relevant gateways in a second navigation panel 2704 besides the first navigation panel 2702. For example, the relevant gateways in the second navigation panel 2704 may be indicated in similar manner as the gateway indicators in the "Details" tab for every sub-activity in the PQPM project. In a further embodiment, for every sub-activity for which the gateway indicator in the "Details" tab is not updated, the gateway indicator in the second panel 2704 in the "Summary" tab may not be highlighted. As will be understood by a person having ordinary skill the art, the display module 302 may update the non-highlighted gateway indicators on the second panel 2704 on the "Summary" tab, based on the updates in the corresponding gateway indicators in the "Details" tab. For example, initially, when the sub-activity is not executed, the relevant gateway indicator on the second panel 2704 in the "Summary" tab may not be highlighted. In a further example, the display module 302 may update the gateway indicator on the second panel 1704, based on the updates in the corresponding gateway indicator in the "Details" tab of the corresponding sub-activity. For example, on completion of the sub-activity, and based on the forecast and the assessment value of that sub-activity in the "Details" tab, the gateway indicator in the second panel 2704 of the "Summary" tab may be updated to red, yellow or green color, or with the "C" indicator along with different color coding or hatch pattern.

In an embodiment, for all the activities, the second navigation panel 2704 may include all the gateway indicators relevant to the corresponding sub-activities within the activity. For example, for the activity 16 "packaging specifications", the second navigation panel 2704 may include all the gateways related to all the sub-activities within the activity 16. In a further embodiment, the gateways that are not relevant to a sub-activity may be non-accessible or darkened or blackened.

Further, as illustrated in FIG. 27, the second panel 2704 may include a summary status indicator for each activity and sub-activity. In one embodiment, the display module 302 may be configured to update the summary status indicator based on the forecast and the assessment value associated with the sub-activities within an activity. In a further embodiment, the summary status indicator for an activity indicates the overall execution status of the activity. For example, if all the sub-activities within the activity are completed with the assessment value 9, i.e., the third hatch pattern or green color with "C" mark, then only the summary status indicator for the activity indicates Green or third hatch pattern along with "C" mark. As will be understood by a person skilled in the art, Green or third hatch pattern with "C" indicates that the activity is completed with the desired target date, quality level and cost expectations. However, if even a single sub-activity within the activity is incomplete, then the summary status of the activity indicates the lowest execution status and/or the highest risk status associated with the sub-activity. As shown in FIG. 27, for sub-activity 16.1, the gateway indicator shows that the sub-activity is completed with desired target date, quality level and cost expectations, therefore indicator with green or third hatch pattern with "C" mark. Further, for sub-activity 16.2, the gateway indicator shows that the sub-activity has a forecast value of 9, therefore green or third hatch pattern. For sub-activity 16.3, the gateway indicator shows that the sub-activity is completed with an assessment value of 0, which means that there is risk associated with the sub-activity, therefore indicator with red or first hatch pattern with "C" mark. Furthermore, for sub-activity 16.4, the gateway indicator shows that the sub-activity has a forecast value of 3, which means that the sub-activity may not be completed with the desired target date, quality level and cost expectations, therefore indicator with yellow or second hatch pattern. Therefore, the summary status indicator for the activity 16 may indicate a red or first hatch pattern showing that the activity on a whole is not completed and has a risk associated with it.

Further, the display module 302 may provide a path through the "Summary" tab, to enable the team member to update the forecast and the assessment values associated with each sub-activities. For example, the team member may click on the gateway indicator displayed on the second navigation panel 2704 to update the forecast and the assessment values associated with the sub-activity. In one embodiment, the gateway indicator on the second panel 2704 may be updated to reflect the updated assessment and forecast values of the sub-activity.

In an embodiment, the tracking module 306 may enable the team members/team leader to track a progress of the PQPM project based on the received textual inputs for the measurement criterion associated with the execution of the activities. The tracking module 306 may provide a "total possible gateway score" and a "gateway score" in the "Summary" tab on the user interface window 2700. In one embodiment, the "total possible gateway score" may be the total score possible for every gateway. For example, the "total possible gateway score" may be determined by identifying the total number of sub-activities relevant to that gateway and taking a product of the total number with the highest assessment value, i.e., 9. For example, if the total number of sub-activities relevant to a gateway, such as gateway 2, is equal to 12, then the total possible gateway scores is the product of 12 and 9, i.e., 108.

In a further embodiment, the display module 302 may be configured to display the gateway score associated with every gateway. The gateway score may be based on the number of completed sub-activities with the desired target dates, quality levels and cost expectations, i.e., all the sub-activities with Green or third hatch pattern along with "C" mark, relevant to the particular gateway. For example, if for a gateway, such as gateway 3, the total number of sub-activities is 15, and out of 15 sub-activities, only 8 are completed with the desired target date, quality level and the cost expectations, then only the completed sub-activities may be considered for evaluating the gateway score in a similar manner as done for total possible gateway score. Therefore, in the above example, the gateway score may be equal to the product of 8 and 9, i.e. 72.

In a further embodiment, the display module 302 may evaluate the percentage of gateway score by comparing the total possible gateway score and the gateway score. In a further embodiment, the GUI module 110 may also evaluate a cumulative PQPM project status percentage score for the entire project to enable the team member to evaluate the total percentage of the completed PQPM project. In one embodiment, the cumulative score for every gateway may be evaluated by a formula of (cumulative gateway score for a gateway)/(cumulative total possible gateway score)*100. For example, for gateway 1, the cumulative total possible score is 0 and the cumulative gateway score is also 0, therefore the cumulative PQPM status percentage score is also 0. Further, for gateway 2, the cumulative total possible gateway score is a sum of 108 and 0, i.e., 108, and the cumulative gateway score is the sum of 54 and 0, i.e., 54. Therefore the cumulative PQPM status percentage score for gateway 2 is 54/108*100, i.e., 50%. Similarly, the cumulative total possible gateway score is the sum of 108, 162, 108 and 0, i.e., 378, and the cumulative gateway score is the sum of 9, 27, 54 and 0, i.e., 90. Therefore, the cumulative PQPM status percentage score for gateway 4 is 90/378*100, i.e., 23.81%. Similarly, the display module 302 may be configured to display the cumulative PQPM project status percentage score for every gateway, to enable the team member to track a progress of the PQPM project based on the execution status of the PQPM project.

In one embodiment, the display module 302 may display a visual indicator along with an activity and associated sub-activities in the first navigation panel 2702, to indicate a linkage of the activity and associated sub-activities with another PQPM project (herein after referred to as parent PQPM project). In one embodiment, sub-activities within the activity may include similar execution characteristics with another PQPM project. Therefore, the execution of the sub-activity within the PQPM project may be linked to the parent PQPM project. As will be understood by a person skilled in the art, for similar parts, the sub-activities and activities execution characteristics may be similar, therefore, one of the PQPM project may be made a parent project and the sub-activities that are common to the child project may be linked.

Figure 30:
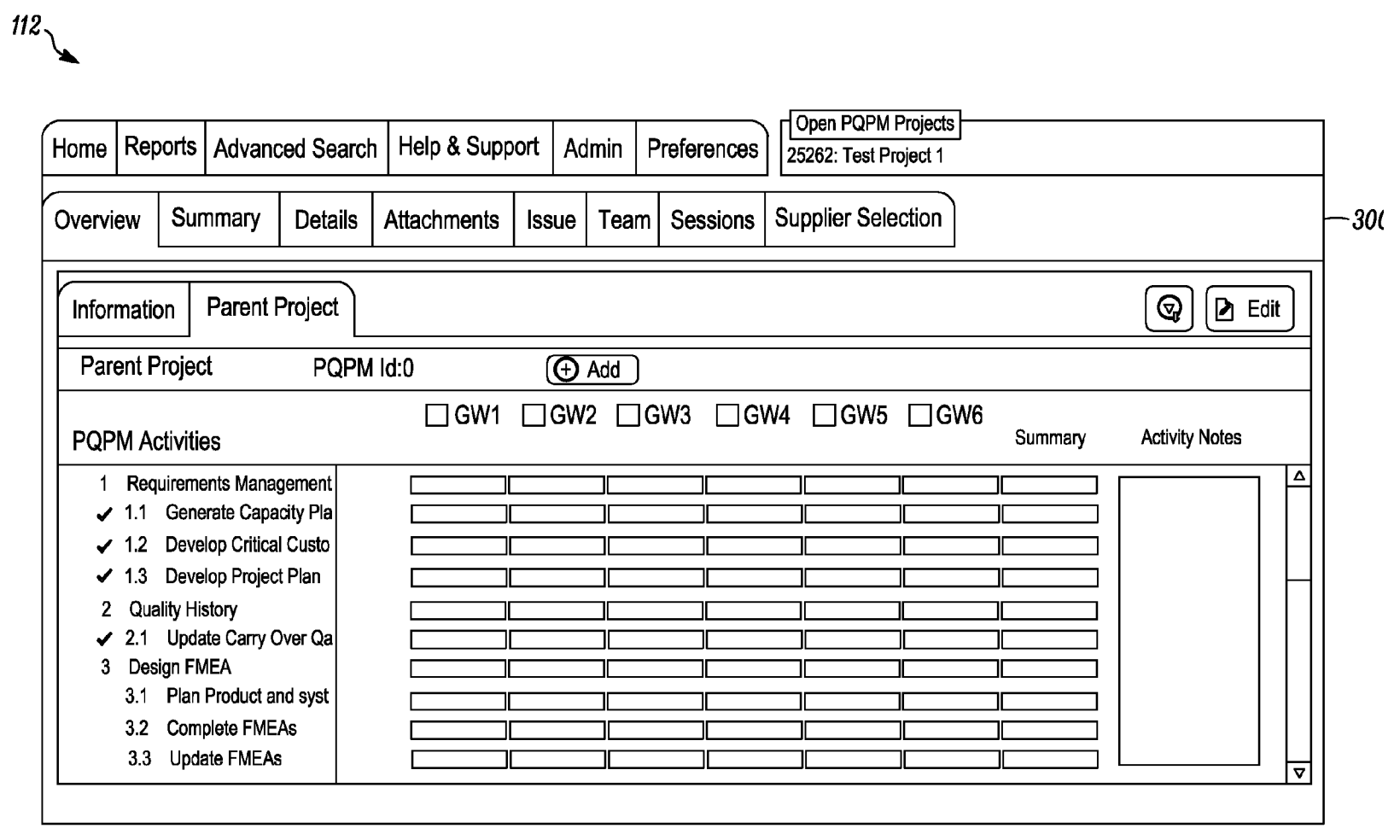

In one embodiment, a team leader may link activities to a parent PQPM project. For example, if a sub-activity is executed for a parent PQPM project, then the GUI module 110 automatically updates the execution status of the child PQPM projects similar to the execution status in the parent PQPM project. In an embodiment, the user interface window 600 may include a "Parent Project" tab, to facilitate the team leader to link activities of the PQPM project with the parent PQPM project. The team leader may click on the "Parent Project" tab to subsequently add a parent PQPM project for the PQPM project. The display module 302 may be configured to display a "Parent Project" user interface window 2800 to facilitate addition of a parent PQPM project and linking of activities to the parent PQPM project. For example, the user interface window 2800 may include an "Edit" button to facilitate searching of a PQPM project to be added as a parent PQPM project. As illustrated in FIG. 29, the display module 302 may be configured to display a user interface window 2900 to facilitate searching of the PQPM projects by the project title and/or a project id. Further, the display module 302 may display a list of all the related PQPM projects based on the keywords. Subsequently, the team leader may select the desired PQPM project to be added as the parent PQPM project. Further, as illustrated in FIG. 30, the team leader may select activities to be linked to the parent PQPM project, through the user interface window 3000.

Figure 31:
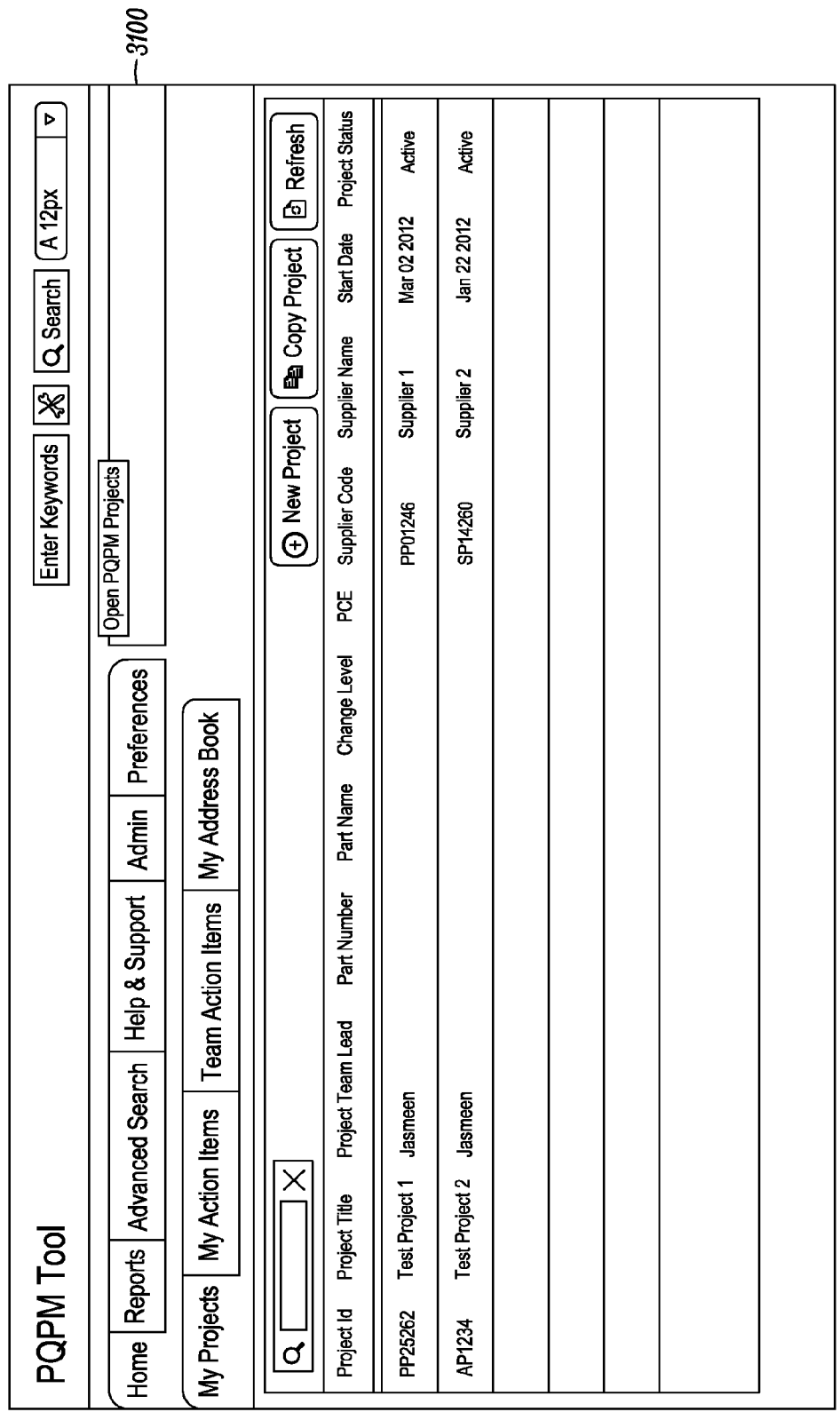
FIG. 31 is an exemplary user interface window for displaying one or more PQPM projects associated with a team member, according to an example embodiment of the present disclosure.

In a further embodiment, the display module 302 may provide a path to the team members to view the PQPM projects assigned to them in a "My Projects" tab on the Home page in a user interface window 3100, as illustrated in FIG. 31. The display module 302 may further facilitate the team leader and/or any other team member to navigate the PQPM project through the user interface window 3100 to view the information associated with the PQPM project. For example, the team member may navigate the PQPM project through the user interface window 3100 by double clicking on the desired PQPM project.

In a further embodiment, the display module 302 may provide a path on the user interface 112 to the team member for viewing all the sub-activities assigned to him/her through a "My Action Items" tab displayed on a user interface window 3200, as shown in FIG. 32. In one embodiment, the window 3200 may include information associated with the various sub-activities associated with the team member. For example, the information may include the project id of the PQPM project, supplier name associated with the project, sub-activity number, description of the sub-activity and the corresponding activity, and the desired target date for completing the sub-activity. In one embodiment, the GUI module 110 may also send alerts to the team member on arrival of a target for completing the sub-activity. In another embodiment, the team member may define alert preferences in the user interface 112 for receiving alerts near to a target date for any of the assigned sub-activities.

In an embodiment, the developing module 306 may be configured to generate risk charts and reports for the PQPM project and associated NPI programs. The reports are developed based on the measurement criterion indicative of the execution status of the activities. Thus, the reports may enable the team members to monitor the risk associated with the various activities and sub-activities within the PQPM project and further within the NPI program.

In an embodiment, the developing module 306 may develop four types of reports, namely, an NPI project report for PQPM conformance, an NPI program view report, a PQPM risk report and a PQPM NPI gateway conformance report. However, it will be understood by a person ordinarily skilled in the art, that the number of reports and the types of the reports are exemplary and may be varied to include similar functionalities.

Figure 33:
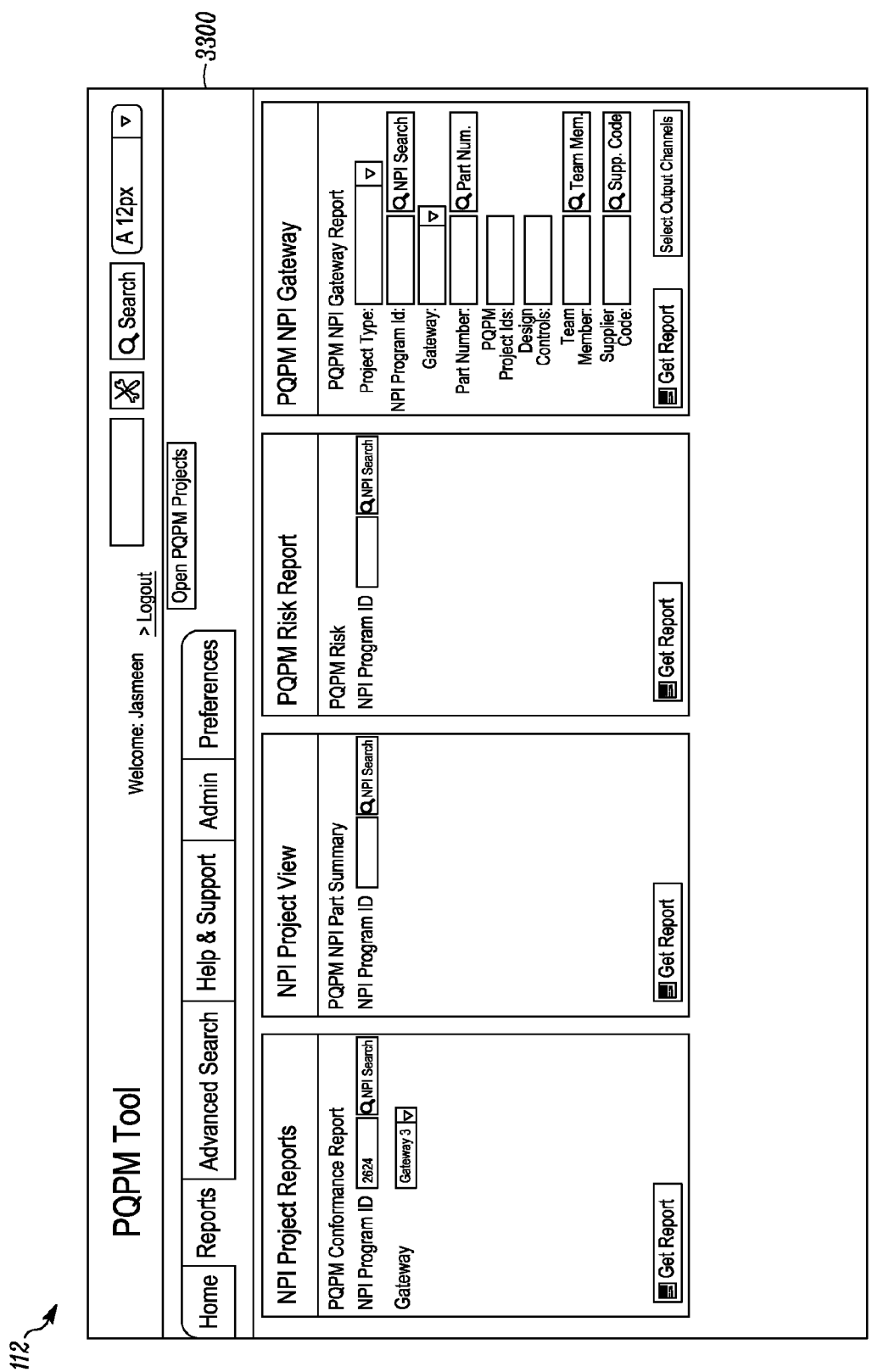
FIG. 33 is an exemplary user interface window for receiving information from the team member to generate an NPI project report for PQPM conformance for one or more PQPM projects within an NPI program, in accordance with an example embodiment of the disclosure.

In an embodiment, the developing module 306 may develop the NPI project report for PQPM conformance, to facilitate the team member to view all the PQPM projects within an NPI program and the risk associated with every PQPM project within the NPI program. The display module 302 may provide a path to the team member through a user interface window 3300 to get the NPI program view report. For example, the user interface window 3300 may include an "NPI project reports" tab, as illustrated in FIG. 33, to enable the receiving module 304 to receive NPI program ID and a gateway number as a search term from the team member. Subsequently, the team member may click on a "Get Report" tab to view all the APQP projects and the risk associated with the APQP projects within the NPI project.

Figure 34:
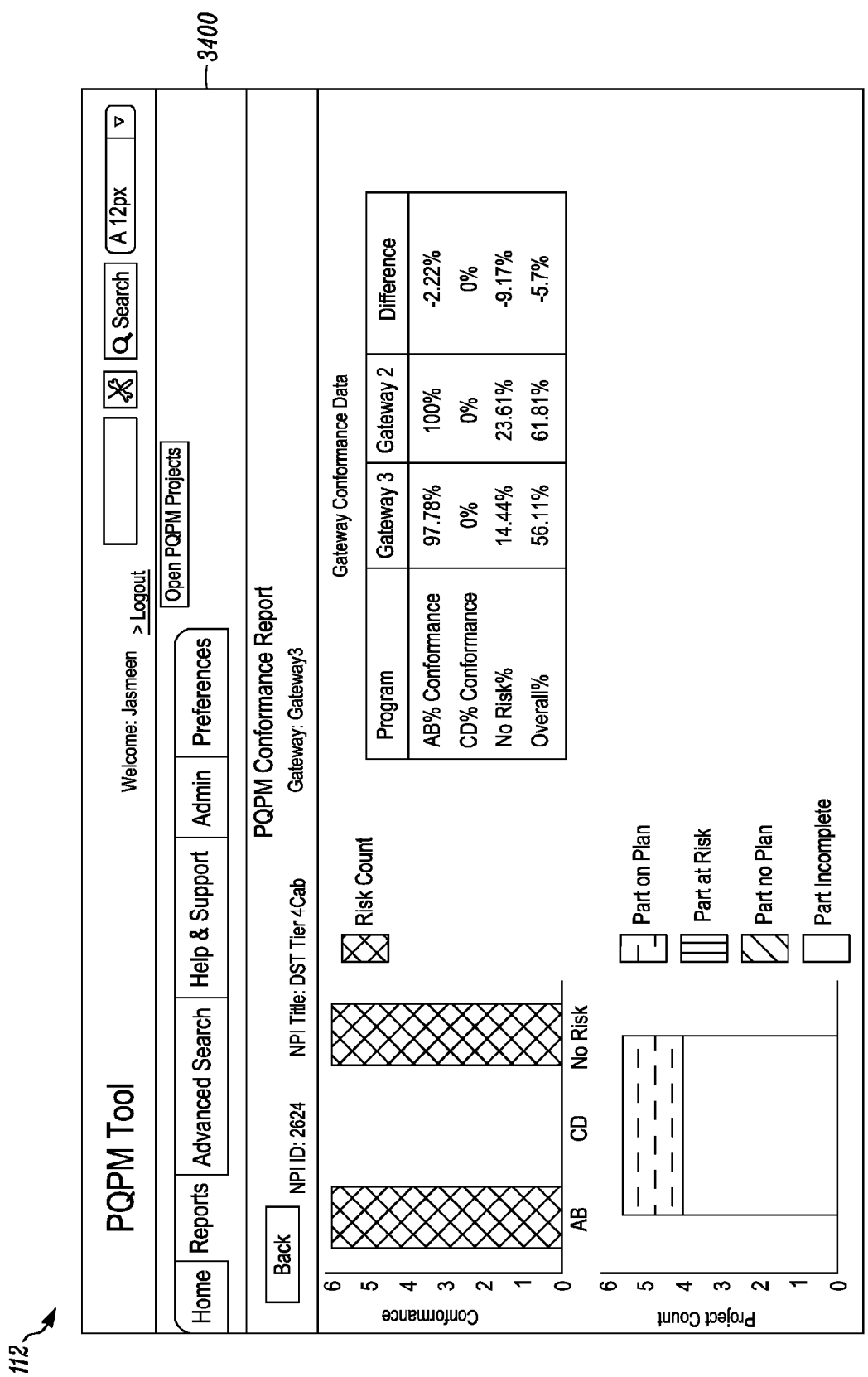
FIGS. 34-35 are exemplary user interface windows to display the NPI project report for PQPM conformance, in accordance with an example embodiment of the disclosure.

In an embodiment, the display module 302 may display the NPI project report for PQPM conformance in a user interface 3400, as illustrated in FIG. 34. As will be understood by a person having ordinary skill in the art, the NPI project report for PQPM conformance may illustrate all the PQPM projects within the selected NPI project. Further, the report may illustrate the risk associated with the APQP projects within the NPI program. In one embodiment, the NPI projects report for APQP conformance as shown in FIG. 34, may include a bar chart for illustrating the number of PQPM projects within the NPI program that may be categorized into different categories of risk associated with the projects. For example, the categories may A-category, B-category, C-category and D-category. In one embodiment, the A-category risk is the highest risk and requires highest amount of supply chain, and D is the lowest risk associated with the APQP project and requires the least amount of supply chain collaboration.

Further, the report on the user interface 3400, may include a second bar chart illustrating the total number of projects showing completed PQPM projects and their status with respect to meeting desired target dates, quality levels and the cost expectations, along with number of PQPM projects completed with a medium risk and high risk associated with them and the total number of incomplete projects. In one embodiment, the report also includes a table indicative of the gateway conformance scores for the total number of APQP projects categorized with respect to the A, B, C, and D category of risk.

Figure 35:
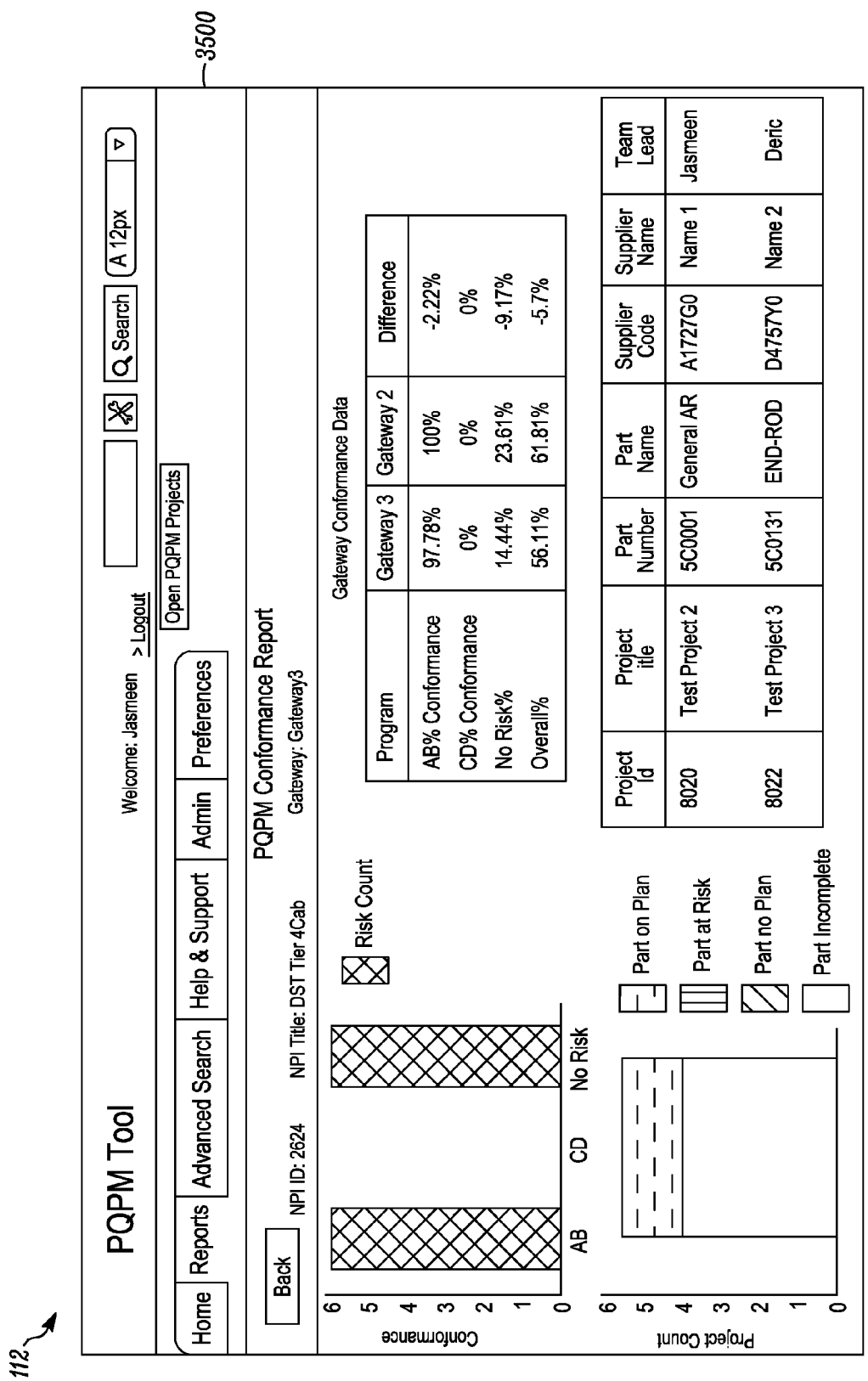

Further, the display module 302 may enable the team member to view the associated PQPM projects, as illustrated in FIG. 35. For example, if the team member clicks on the AB bar on the chart, the display module 302 may display all the APQP projects falling under the AB risk category, in a table as illustrated in FIG. 35. As will be appreciated by a person having ordinary skill in the art, the display module 302 may create a hyperlink in the bar charts to link to a table illustrating the information associated with the PQPM projects associated with the category of the bar.

Figure 36:
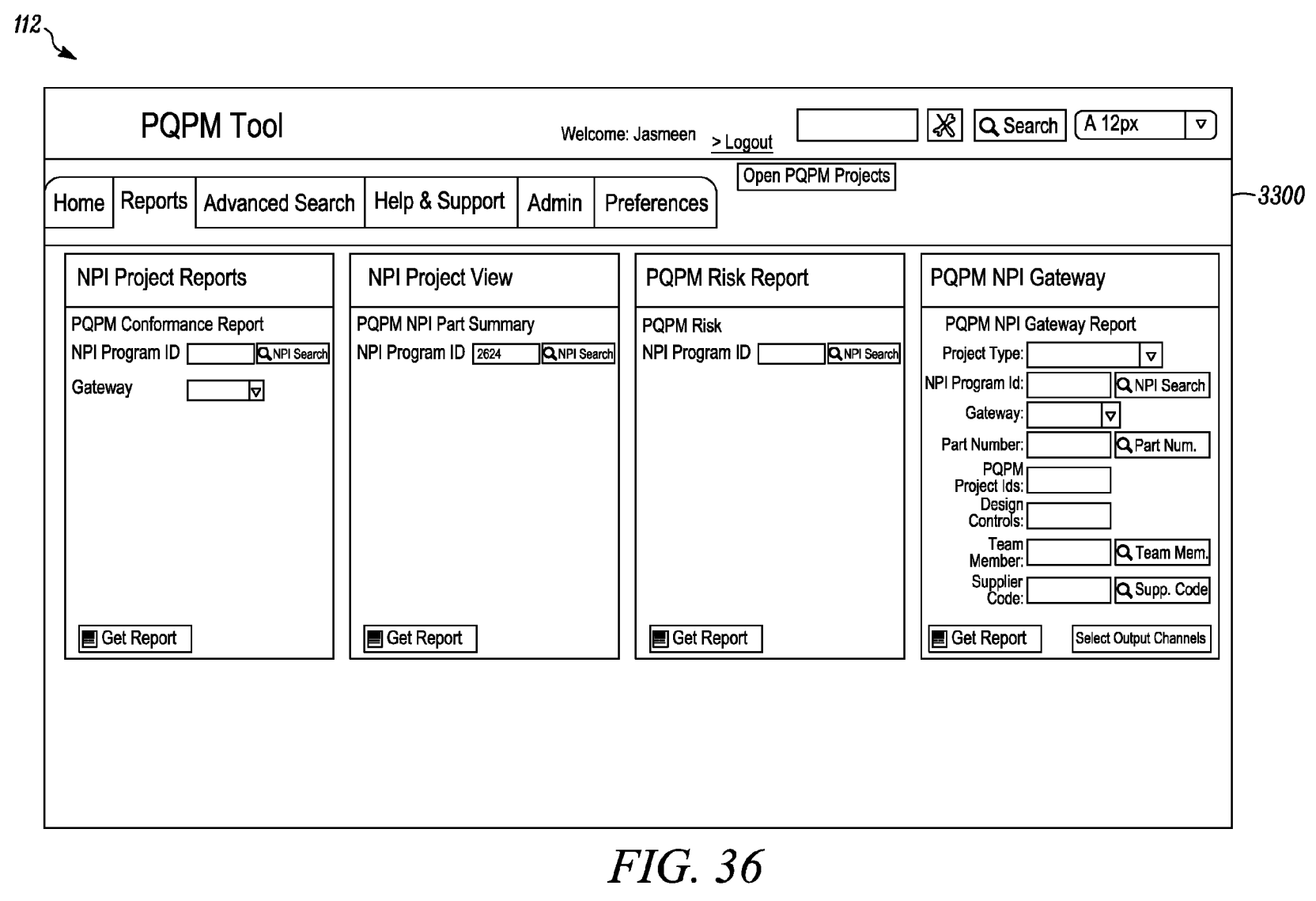

The developing module 306 may develop an NPI program view report, to facilitate the team member to view all the PQPM projects within an NPI program and corresponding gateway conformance scores for each PQPM project. In one embodiment, the display module 302 may be configured to provide a path to the team member through the user interface window 3300 to get the NPI program view report. For example, the user interface window 3300 may include an "NPI project View" tab, as illustrated in FIG. 36, to enable the receiving module 304 to receive NPI program ID as a search term from the team member. Subsequently, the team member may click on a "Get Report" tab to view all the PQPM projects and the corresponding gateway conformance scores for the NPI project.

Further, the display module 302 may be configured to display a user interface window 3700 including the "PQPM NPI part summary report", as illustrated in FIG. 37. As illustrated in the user interface window 3700 the NPI program view report is formed in a tabular form. In one embodiment, the report may include PQPM projects for parts within the NPI program. As will be understood by a person ordinarily skilled in the art, the NPI program is executed for a product that includes a plurality of parts. Further, the PQPM project is executed for a single part of the product. Therefore, a single NPI program may include multiple PQPM projects. In one embodiment, the report may include the PQPM project ID, the part name and part number for which the PQPM project is executed, the NPI id of the associated NPI program, PQPM project title, team leader for the PQPM project, corresponding supplier name and code, along with the corresponding gateway status. For example, the first row of the table in the report, may indicate a PQPM project 1. For the PQPM project 1, the gateway status may be based on the gateway conformance score, associated with the PQPM project 1. In a further embodiment, the display module 302 may provide a path for the team member to view the details of every PQPM project in the report by clicking on desired PQPM project. Subsequently, as the team member clicks on the PQPM project within the report, the display module 302 may display the "Summary" tab of the selected PQPM project.

Figure 38:
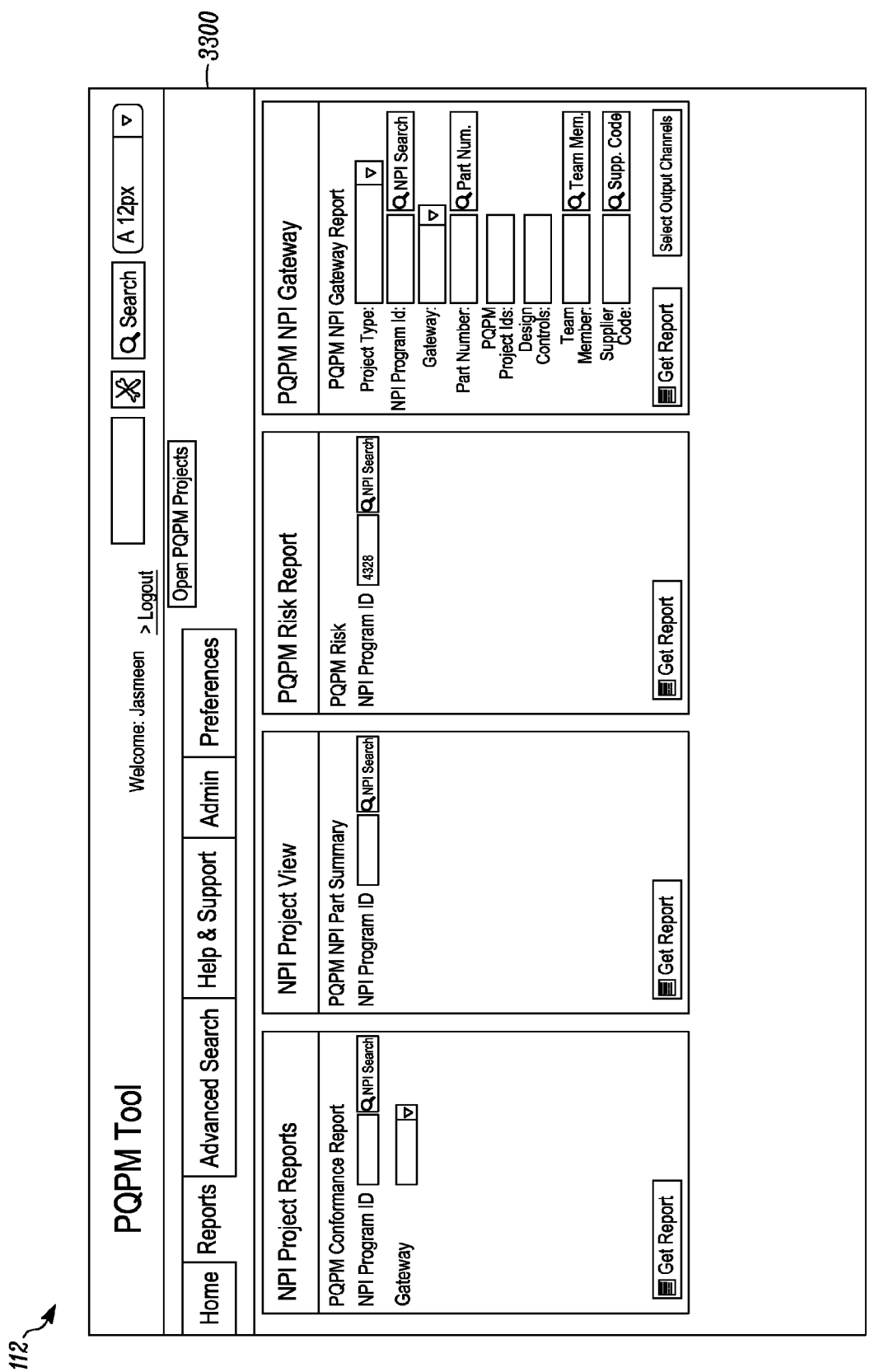
FIG. 38 is an exemplary user interface window for receiving information from the team member to generate a PQPM risk report for one or more PQPM projects within an NPI program, in accordance with an example embodiment of the disclosure.

In an embodiment, the developing module 306 may provide a path to the team member through a user interface window 3300 to develop a PQPM risk report as illustrated in FIG. 38. The PQPM risk report may indicate all the sub-activities that are at a risk for a given NPI program. As will be understood by a person skilled in the art, the sub-activities may be executed for more than one PQPM projects within the NPI program. In one embodiment, the user interface window 3300 may include a "PQPM risk report" tab. Subsequently, the receiving module 304 may receive textual input from the team member for searching an NPI program by the NPI program id. Further, the team member may click on the "Get report" tab to subsequently enable the development module 306 to generate a PQPM risk report in a user interface window 3900, as shown in FIG. 39.

In an embodiment, the PQPM risk report, as illustrated in FIG. 39 may include the sub-activities that may have a gateway indicator indicating a red and/or yellow color. In an alternate embodiment, the report may include the sub-activities having gateway indicators indicating a first hatch pattern and/or a second hatch pattern. As explained previously, the red color or the first hatch pattern of the gateway indicator indicates a high risk associated with the sub-activity. The yellow color or the second hatch pattern of the gateway indicator indicates a medium risk associated with the corresponding sub-activity.

In an embodiment, the report may include the PQPM project id associated with the sub-activity at risk. In addition, the report includes the part name, part number associated with the PQPM project, project title, supplier name and code, the description of the sub-activity at risk, description of the corresponding activity, and the corresponding relevant gateway associated with the sub-activity at risk. For example, if a sub-activity associated with gateway 3 is at risk, then the report may include only that sub-activity and the associated gateway 3 with the corresponding differentiator, such as red or yellow color, and/or first or second hatch pattern respectively. In one embodiment, the report enables the team member, and/or the team leader to monitor risk mitigation activities for the NPI program. Further, the display module 302 may enable the team member to view the details associated with the sub-activity and the PQPM project listed in the report by clicking on the desired project. In one embodiment, the PQPM project listed in the report may include a hyperlink to the "Details" tab of the corresponding project and the sub-activity.

Figure 40:
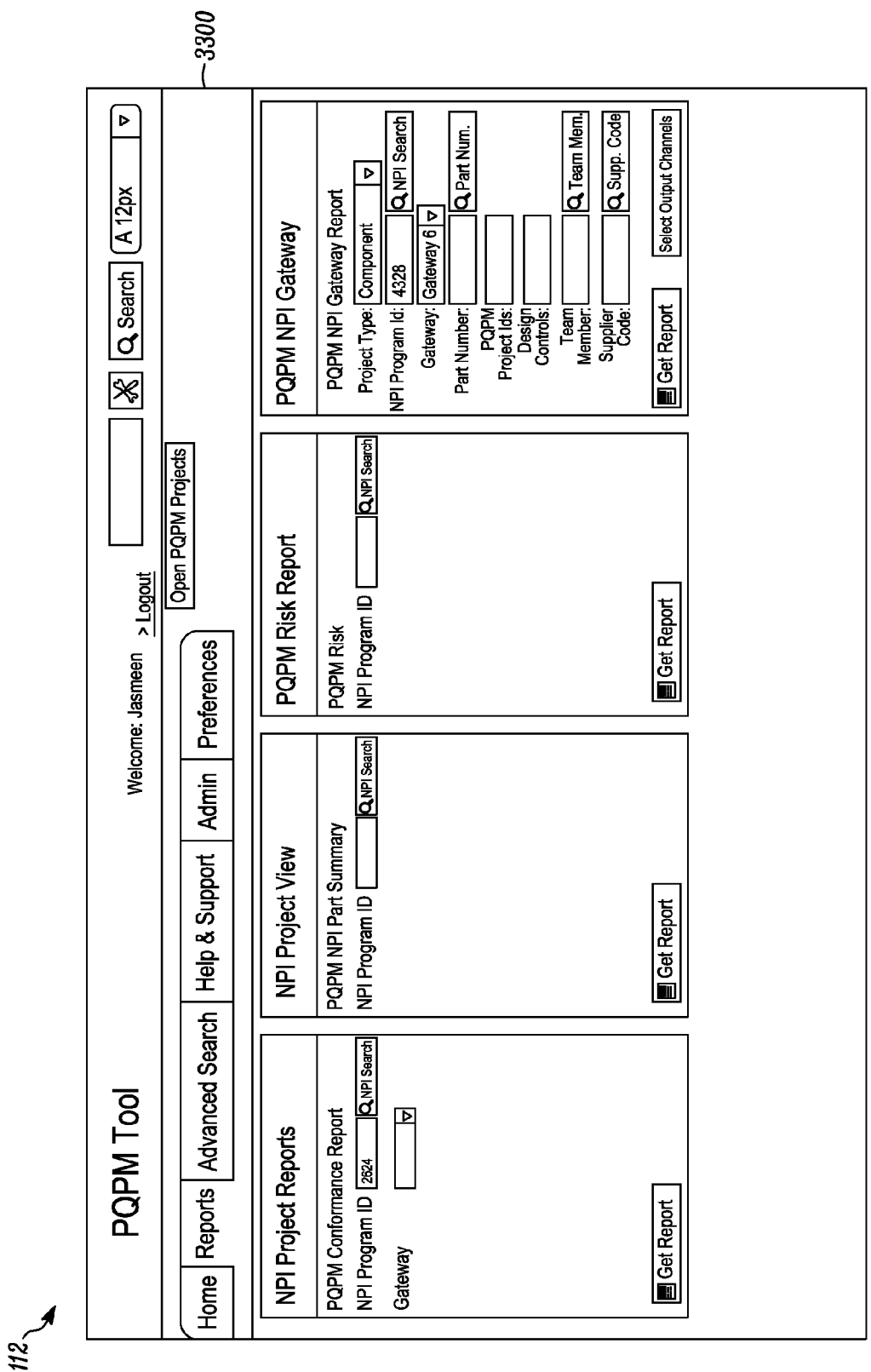
FIG. 40 is an exemplary user interface window for receiving information from the team member to generate a PQPM NPI gateway report for one or more PQPM projects within an NPI program, in accordance with an example embodiment of the disclosure.
Figure 43:
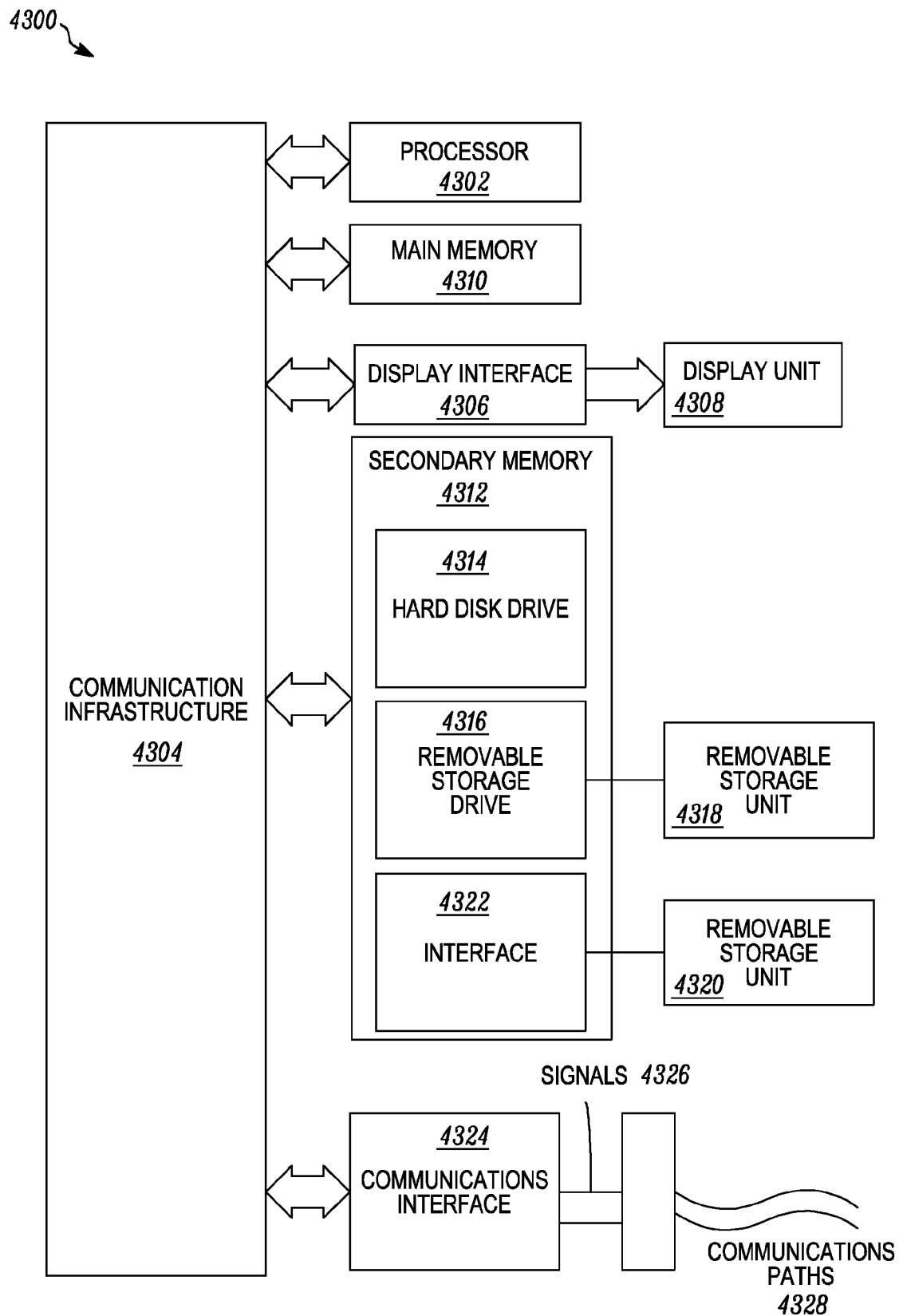
FIG. 43 is a block diagram of an exemplary computer-based system, according to an example embodiment of the present disclosure.

In an embodiment, the developing module 306 may provide a path to the team member on a user interface window 3300 to develop a PQPM NPI Gateway conformance Report, as illustrated in FIG. 40. The PQPM NPI Gateway conformance Report may indicate all the PQPM projects and the sub-activities associated with a NPI program for a plurality of user defined fields, such as gateway, component type etc. In one embodiment, the display module 302 may be configured to display a "PQPM NPI gateway conformance report" tab, on the user interface window 3300. In one embodiment, PQPM NPI gateway conformance report" tab may facilitate the receiving module 304 to receive textual inputs from the team member for generating the PQPM NPI gateway conformance report. In one embodiment, the textual inputs may include one or more fields for restricting the report, such as a project type, NPI program id, gateway, part number, PQPM project ids, team member, supplier code etc. Subsequently, the team member may select the data columns desired to be viewed in the report. For example, the display module 302 may provide a path on a user interface 4100, as shown in FIG. 41, to the team member for selecting the data columns to be viewed in the report.

In an embodiment, the developing module 306 may generate the PQPM NPI gateway conformance report based on the received inputs from the team member, as shown in FIG. 42. For example, for the input fields NPI program id, gateway selected as gateway 6, and project type selected as a component project type, the developing module 306 may generate the report based on only the entered fields. Therefore, the report, on a user interface window 4200 may include all the PQPM projects of components type under the NPI program id along with the status of all sub-activities associated with the gateway 6 for all the PQPM projects. In one embodiment, the PQPM NPI gateway conformance report may facilitate the team member in tracking the execution status of all the sub-activities associated with all the PQPM projects within an NPI program. Also, the report enables the team member to track the sub-activities associated with one or more gateways.

The present disclosure (i.e., Graphic User Module 110, any part(s) or function(s) thereof) may be implemented using hardware, software or a combination thereof, and may be implemented in one or more computer systems or other processing systems. However, the manipulations performed by the present disclosure were often referred to in terms, such as comparing or checking, which are commonly associated with mental operations performed by a human operator. No such capability of a human operator is necessary, or desirable in most cases, in any of the operations described herein, which form a part of the system. Rather, the operations are machine operations. Useful machines for performing the operations in the system may include general-purpose digital computers or similar devices.

In an embodiment of the present disclosure, the present system is directed towards one or more computer systems capable of carrying out the functionality described herein.

The computer system 4300 includes at least one processor, such as a processor 4302. The processor 4302 is connected to a communication infrastructure 4304, for example, a communications bus, a cross over bar, a communication network, and the like. Various software embodiments are described in terms of this exemplary computer system 4300. After reading this description, it will become apparent to a person skilled in the relevant art(s) how to implement the system using other computer systems and/or architectures.

The computer system 4300 includes a display interface 4306 that forwards graphics, text, and other data from the communication infrastructure 4304 for display on a display unit 4308.

The computer system 4300 further includes a main memory 4310, such as random access memory (RAM), and may also include a secondary memory 4312. The secondary memory 4312 may further include, for example, a hard disk drive 4314 and/or a removable storage drive 4316, representing a floppy disk drive, a magnetic tape drive, an optical disk drive, etc. The removable storage drive 4316 reads from and/or writes to a removable storage unit 4318 in a well-known manner. The removable storage unit 4318 may represent a floppy disk, magnetic tape or an optical disk, and may be read by and written to by the removable storage drive 4316. As will be appreciated, the removable storage unit 4318 includes a computer usable storage medium having stored therein, computer software and/or data.

In accordance with various embodiments of the system, the secondary memory 4312 may include other similar devices for allowing computer programs or other instructions to be loaded into the computer system 4300. Such devices may include, for example, a removable storage unit 4320, and an interface 4322. Examples of such may include a program cartridge and cartridge interface (such as that found in video game devices), a removable memory chip (such as an erasable programmable read only memory (EPROM), or programmable read only memory (PROM)) and associated socket, and other removable storage units 4320 and interfaces 4322, which allow software and data to be transferred from the removable storage unit 4320 to the computer system 4300.

The computer system 4300 may further include a communication interface 4324. The communication interface 4324 allows software and data to be transferred between the computer system 4300 and external devices. Examples of the communication interface 4324 include, but may not be limited to a modem, a communication network interface (such as an Ethernet card), a communications port, a Personal Computer Memory Card International Association (PCMCIA) slot and card, and the like. Software and data transferred via the communication interface 4324 are in the form of a plurality of signals, hereinafter referred to as signals 4326, which may be electronic, electromagnetic, optical or other signals capable of being received by the communication interface 4324. The signals 4326 are provided to the communication interface 4324 via a communication path (e.g., channel) 4328. The communication path 4328 carries the signals 4326 and may be implemented using wire or cable, fiber optics, a telephone line, a cellular link, a radio frequency (RF) link and other communication channels.

In this document, the terms "computer program medium" and "computer usable medium" are used to generally refer to media such as the removable storage drive 4316, a hard disk installed in hard disk drive 4314, the signals 4326, and the like. These computer program products provide software to the computer system 4300. The disclosure is directed to such computer program products.

Computer programs (also referred to as computer control logic) are stored in the main memory 4310 and/or the secondary memory 4312. Computer programs may also be received via the communication interface 4304. Such computer programs, when executed, enable the computer system 4300 to perform the features of the present disclosure, as discussed herein. In particular, the computer programs, when executed, enable the processor 4302 to perform the features of the present disclosure. Accordingly, such computer programs represent controllers of the computer system 4300.

In accordance with an embodiment, where the system is implemented using a software, the software may be stored in a computer program product and loaded into the computer system 4300 using the removable storage drive 4316, the hard disk drive 4314 or the communication interface 4324. The control logic (software), when executed by the processor 4302, causes the processor 4302 to perform the functions of the system as described herein.

In another embodiment, the system may be implemented primarily in hardware using, for example, hardware components such as application specific integrated circuits (ASIC). Implementation of the hardware state machine so as to perform the functions described herein will be apparent to persons skilled in the relevant art(s). In yet another embodiment, the system is implemented using a combination of both the hardware and the software.

INDUSTRIAL APPLICABILITY

Generally, organizations utilize various Product Quality Planning and Management (PQPM) process to ensure that new parts meet the quality standards needed for New Product Introduction (NPI) programs. However, the way the organization manages the PQPM process is very inefficient, where the team members utilize various forms of spreadsheets to collaborate and track PQPM progress with internal partners as well as external suppliers. This project provides a significant opportunity to standardize how PQPM process is organized and executed in organizations. This project will ensure that there is a tool available to promote collaboration and enable teams to execute the PQPM process efficiently. The user interface 112 provides a collaborative environment for tracking the execution status of the activities of the PQPM processes throughout the organization. The user interface 112 further enables the team members to track the progress of the PQPM project efficiently and thus, saving time and cost and at the same time maintaining the quality of the products. Further, the user interface 112 enables to standardize the various activities that need to be executed during the product development cycle.

In an embodiment, the PQPM projects and the associated activities may be linked to various New Product Introduction (NPI) programs, which enables the team members and the organizations to monitor a risk associated at the product level as well as at the component level. The team members may simultaneously take necessary steps, based on the monitored risk, to perform risk mitigation for the PQPM projects associated with the NPI programs.

Figure 44:
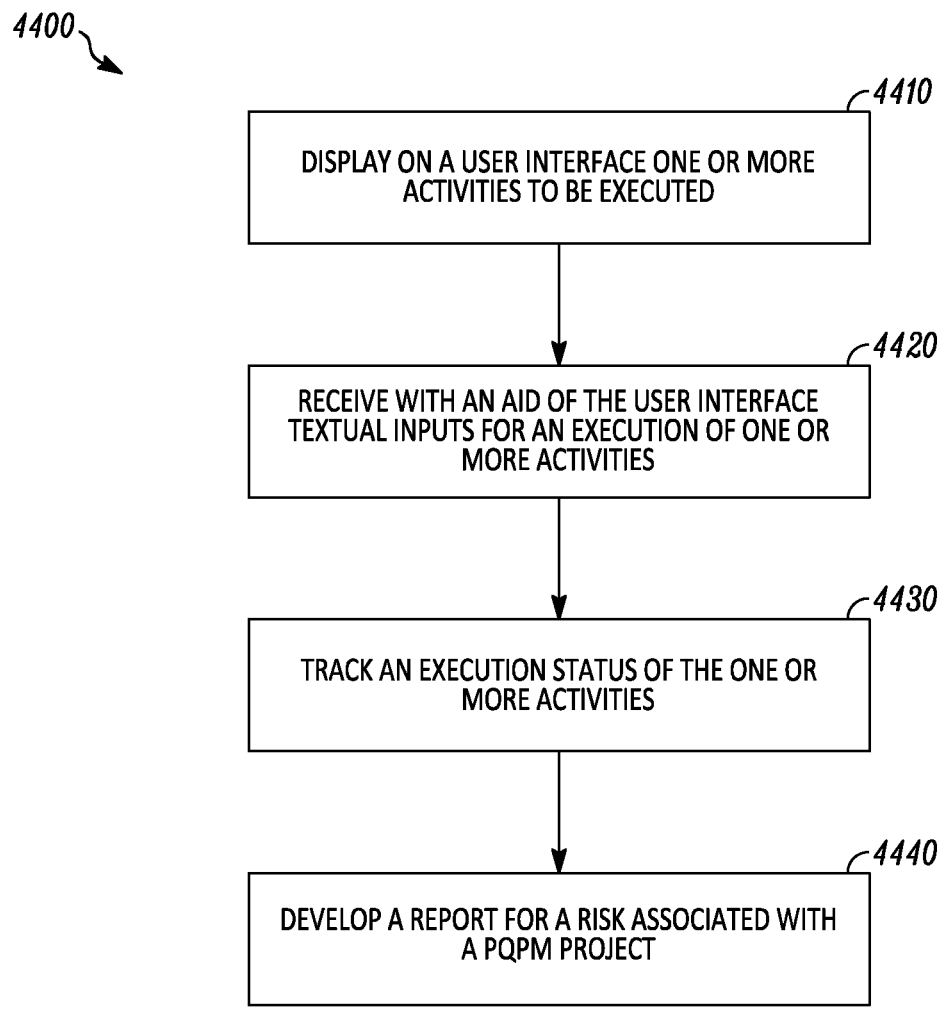
FIG. 44 is an exemplary process flow for facilitating the PQPM project, according to an example embodiment of the present disclosure.

In an embodiment, the user interface 112 provides a solution to the team members to track the progress of PQPM project during the product development cycle. As illustrated in FIG. 44, process 4400 details out the steps of facilitating the PQPM project.

At step 4410, the GUI module 110 displays various activities that need to be executed by the team members for a successful completion of the PQPM project. These activities include the organization standard activities or industry standard activities that need to be executed before a successful launch of the part is done.

At step 4420, the GUI module 110 receives textual inputs for measurement criterion that are indicative of an execution status of the activities and the corresponding sub-activities. In an embodiment, the sub-activities has an associated expectation based on which the measurement criterion is defined for the sub-activities. Further, the sub-activities have an associated gateway based on a phase of execution of each of the sub-activities. The phase of execution includes concept define phase, concept measure phase, concept explore phase, develop design phase, develop verify phase and pilot phase. Further, the user interface 112 may receive the measurement criterion based on a forecasted execution and assessment of reaching an expectation associated with the sub-activities corresponding to each of the activities. In an embodiment, the measurement criterion for the forecasted execution is based on first pre-determined scoring rates. The first pre-determined scoring rates is based on a probability of meeting a specified target date, a specified quality level and a cost expectation associated with the one or more sub-activities. Further, the user interface 112 receives the measurement criterion for the assessment if the forecasted execution is scored as completed. The computer implemented method of claim 23, wherein the measurement criterion for the assessment is based on second pre-determined scoring rates. The user interface 112 visually represents the measurement criterion as gateway indicator. The gateway indicator is based on one of first pre-determined scoring rates associated with the forecasted execution and second pre-determined scoring rates associated with the assessment. In an embodiment, the visual representation in the gateway indicator is at least one of a color based indicator, a number based indicator, a letter based indicator, a hatch pattern based indicator, an alphanumeric based indicator.

The user interface 112 further enables to link the activities, associated with the PQPM project, with a parent PQPM project. Subsequently, the user interface 112 automatically receives the measurement criterion for the linked activities from the parent PQPM project.

At step 4430, the team members may track the progress of the PQPM project based on the measurement criterion indicative of the execution status of the activities. In an embodiment, the user interface 112 displays a real time summary of the PQPM project. The real time summary includes the gateway indicator for the sub-activities corresponding to the one or more activities. The gateway indicator provides an indication of the execution status of the sub-activities and thus, the progress of the activities. Basically, the gateway indicator provides an indication of the execution status of the activities based on the associated gateway indicators of the corresponding sub-activities. In an embodiment, the gateway indicator provides an indication of the risk associated with the one or more sub-activities. Further, the user interface 112 enables the team members to track the progress based on scoring at the different gateways associated with the activities and the corresponding sub-activities. The real time summary includes the scoring parameter to track the progress of the PQPM project. The scoring parameter is based on a gateway indicator corresponding to one or more sub-activities associated with the one or more activities.

At an independent step 4440, the user interface 112 may develop reports to monitor a risk associated with the PQPM project, the report is based on the measurement criterion associated with the execution status of the one or more activities. In an embodiment, as the PQPM projects may be rolled up to the NPI programs, the user interface 112 may enable the team members to monitor the risk both at the component level and at the product level. The user interface 112 may provide various reports such as a NPI project report, PQPM risk report, PQPM NPI gateway conformance report and NPI program view report.

The NPI project report displays a risk and gateway conformance scores associated with the PQPM projects in the NPI program. The NPI project report further displays a risk status for the parts associated with the various PQPM projects in the NPI program. The NPI program view report displays gateway conformance scores associated with the PQPM projects in an NPI program. The NPI program view report further displays information associated with the PQPM projects in the NPI program. The PQPM risk report displays a risk associated with sub-activities, associated with the activities, for an NPI program. The PQPM risk report displays the measurement criterion associated with the sub-activities associated with the activities. The PQPM NPI gateway conformance report displays gateway indicators associated with the activities. The user interface further enables the team members to export the summary and the reports in XML format.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method, comprising:
   creating, via a computer, a plurality of projects associated with a product development cycle and a plurality of programmatically linked gateways;
   categorizing, via the computer, the plurality of projects into different categories of risk associated with the plurality of projects wherein the categories of risk indicate a level of project risk;
   generating, via the computer, a summary report that compiles a total number of completed projects among the plurality of projects, a status of the completed projects with respect to meeting objectives and expectation, a number of the completed projects within each of the different categories of risk, and gateway scores for the completed projects within each of the categories of risk;
   associating, via the computer, one or more activities with the gateways;
   creating gateway indicators for the gateways based on the gateway scores for the completed projects within each of the categories of risk and a forecasted execution of one or more activities of the plurality of projects;
   configuring the computer to track an entire history of changes made to the gateway indicators for every sub-activity of the one or more activities within the plurality of projects;
   tracking, via the computer, an execution status of the every sub-activity and receiving an execution status of the one or more activities based on a measurement criterion, wherein the measurement criterion is the product of gateway scores for the every sub-activity associated with each gateway; and
   generating, via the computer, an alert and a risk report that indicates all the activities that are at risk for the plurality of projects based on the measurement criterion and on the level of project risk associated with a corresponding activity.

2. The method of claim 1, wherein the one or more activities comprise at least one of:
   a. requirements management;
   b. quality history;
   c. design Failure Mode and Effects Analysis (FMEA);
   d. drawings and specifications;
   e. design verification plan and report;
   f. design and manufacturing reviews;
   g. team feasibility and management commitment;
   h. special characteristics;
   i. facilities, tools and gauges;
   j. prototype build control plan;
   k. prototype build;
   l. manufacturing process flowchart;
   m. process FMEA;
   n. pre-launch control plan;
   o. operator process instructions;
   p. packaging specifications;
   q. measurement systems analysis;
   r. production trial run;
   s. preliminary process capability study;
   t. production control plan;
   u. production validation testing;
   v. external supplier Production Part Approval Process (PPAP); and
   w. PPAP status.

3. The method of claim 2, wherein each of the one or more activities comprise one or more sub-activities.

4. The method of claim 3, comprising:
   associating, via the computer, each of the one or more sub-activities with an expectation based on which the measurement criterion is defined for each of the one or more sub-activities.

5. The method of claim 3, comprising:
   associating, via the computer, each of the one or more sub-activities with a gateway based on a phase of execution of each of the one or more sub-activities.

6. The method of claim 1, further comprising:
   providing, via the computer, a path on a graphic user interface module in the computer to associate at least one New Product Introduction (NPI) program with a Product Quality Planning Management (PQPM) project.

7. The method of claim 6, wherein the NPI program comprises one or more PQPM projects created for various parts during the product development cycle.

8. The method of claim 1, further comprising:
   basing, via the computer, the gateway indicator on at least one of first pre-determined scoring rates associated with a forecasted execution of the one or more activities and second pre-determined scoring rates associated with an assessment of the one or more activities.

9. The method of claim 1, further comprising:
   configuring a graphic user interface module in the computer to produce a New Product Introduction (NPI) project report, Product Quality Planning Management (PQPM) risk report, PQPM NPI gateway conformance report and NPI program view report.

10. The method of claim 9, further comprising:
assigning, via the graphic user interface module, a categorized risk to each of a plurality of PQPM projects, and
configuring the graphic user interface module to produce the NPI project report displaying the categorized risk and gateway conformance scores associated with the PQPM projects in an NPI program.

11. The method of claim 10, further comprising:
configuring the graphic user interface module to produce the NPI project report displaying a risk status for parts associated with one or more products in the PQPM projects.

12. The method of claim 9, further comprising:
configuring the graphic user interface module to produce the NPI project report displaying gateway conformance scores associated with the PQPM projects in an NPI program; and
further configuring the graphic user interface module to display a bar chart illustrating a number of PQPM projects within an NPI program.

13. The method of claim 12, further comprising:
configuring the graphic user interface module to produce the NPI program review report displaying information associated with the PQPM projects in the NPI program, wherein the information comprises at least one of project title, project class, project type, project creation date and start date.

14. The method of claim 9, further comprising:
configuring the graphic user interface module to produce the PQPM risk report displaying a risk associated with sub-activities and the activities for an NPI program; and
further configuring the graphic user interface module to display the every sub-activity and the one or more activities in a tree structure organization.

15. The method of claim 14, further comprising:
configuring the graphic user interface module to produce the PQPM risk report displaying the measurement criterion associated with the every sub-activity associated with the one or more activities, wherein the measurement criterion is based on a forecast execution and an assessment of reaching an expectation associated with the every sub-activity.

16. The method of claim 9, further comprising:
configuring the graphic user interface module to produce the PQPM NPI gateway conformance report displaying gateway indicators associated with the one or more activities; and
further configuring the graphic user interface module to display an entire history of changes made to the gateway indicators for every sub-activity within a PQPM project.

17. The method of claim 1, further comprising:
configuring a graphic user interface module in the computer to provide a path to export the report in XML format.

18. The method according to claim 1, further comprising:
monitoring, via the computer, a risk of the one or more activities based on the execution status of the one or more activities based on first predetermined scoring rates, wherein the first pre-determined scoring rates are based on a probability of meeting one or more of a specified target date, a specified quality level and a cost expectation of the one or more activities.

19. The method according to claim 1, further comprising:
visually representing the gateway indicators on a graphic user interface module in the computer by color coding, number coding, letter coding, hatch patterns, alphanumeric coding or a combination thereof.

20. The method according to claim 19, wherein the graphic user interface module comprises a display module, a receiving module, a tracking module and a developing module.

21. A system comprising:
a processor for facilitating a plurality of projects associated with a product development cycle; and
a tangible, non-transitory memory configured to communicate with the processor, the tangible, non-transitory memory having instructions stored thereon that, in response to execution by the processor, cause the processor to perform operations comprising:
categorizing, via the processor, the plurality of projects into different categories of risk associated with the plurality of projects wherein the categories of risk indicate a level of project risk;
generating, via the processor, a summary report that compiles a total number of completed projects among the plurality of projects, a status of the completed projects with respect to meeting objectives and expectation, a number of the completed projects within each of the different categories of risk, and gateway scores for the completed projects within each of the categories of risk;
associating, via the processor, one or more activities with the gateways;
creating gateway indicators for the gateways based on the gateway scores for the completed projects within each of the categories of risk and a forecasted execution of one or more activities of the plurality of projects;
configuring the processor to track an entire history of changes made to the gateway indicators for every sub-activity of the one or more activities within the plurality of projects;
tracking, via the processor, an execution status of the every sub-activity and receiving an execution status of the one or more activities based on a measurement criterion, wherein the measurement criterion is the product of gateway scores for the every sub-activity associated with each gateway; and
generating, via the processor, an alert and a risk report that indicates all the activities that are at risk for the plurality of projects based on the measurement criterion and on the level of project risk associated with a corresponding activity.

22. A non-transitory computer readable medium comprising instructions stored thereon, when executed by a computer executes steps for:
creating a plurality of projects associated with a product development cycle and a plurality of programmatically linked gateways;
categorizing the plurality of projects into different categories of risk associated with the plurality of projects wherein the categories of risk indicate a level of project risk;
generating a summary report that compiles a total number of completed projects among the plurality of projects, a status of the completed projects with respect to meeting objectives and expectation, a number of the completed projects within each of the different categories of risk, and gateway scores for the completed projects within each of the categories of risk;
associating one or more activities with the gateways;
creating gateway indicators for the gateways based on the gateway scores for the completed projects within each of the categories of risk and a forecasted execution of one or more activities of the plurality of projects;

tracking an entire history of changes made to the gateway indicators for every sub-activity of the one or more activities within the plurality of projects;

tracking the execution status of the every sub-activity and receiving an execution status of the one or more activities based on a measurement criterion, wherein the measurement criterion is the product of gateway scores for the every sub-activity associated with each gateway; and generating an alert and a risk report that indicates all the activities that are at risk for the plurality of projects based on the measurement criterion and on the level of risk associated with a corresponding activity.

* * * * *